US008684885B2

(12) United States Patent
Ichikawa et al.

(10) Patent No.: US 8,684,885 B2
(45) Date of Patent: *Apr. 1, 2014

(54) VEHICLE DRIVING SYSTEM

(75) Inventors: Kazuki Ichikawa, Saitama (JP);
Fumiyasu Suga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/704,501

(22) PCT Filed: May 10, 2011

(86) PCT No.: PCT/JP2011/060787
§ 371 (c)(1),
(2), (4) Date: Dec. 14, 2012

(87) PCT Pub. No.: WO2011/158577
PCT Pub. Date: Dec. 22, 2011

(65) Prior Publication Data
US 2013/0090207 A1 Apr. 11, 2013

(30) Foreign Application Priority Data

Jun. 15, 2010 (JP) ................. 2010-136542
Jun. 15, 2010 (JP) ................. 2010-136544
Jun. 15, 2010 (JP) ................. 2010-136549

(51) Int. Cl.
*F16H 37/06* (2006.01)
*B60W 10/02* (2006.01)
*B60W 10/04* (2006.01)
*B60W 10/06* (2006.01)
*B60W 20/00* (2006.01)
*H02P 15/00* (2006.01)
*H02P 15/02* (2006.01)

(52) U.S. Cl.
USPC ............ 477/6; 477/5; 477/8; 477/14; 74/661; 180/65.275; 180/65.28; 180/65.285

(58) Field of Classification Search
USPC ........ 477/5, 6, 3, 8, 14, 15; 74/661; 180/65.1, 180/65.225, 65.265, 65.27, 65.275, 65.28, 180/65.285
See application file for complete search history.

(56) References Cited

U.S. PATENT DOCUMENTS 4,361,059 A * 11/1982 Kronogard .................... 475/276
4,481,841 A * 11/1984 Abthoff et al. ................. 74/661
(Continued)

FOREIGN PATENT DOCUMENTS

CH        256151       7/1948
JP        55-022523 A  2/1980
(Continued)

OTHER PUBLICATIONS

Poliakov S.V. et al., "Reference Book for Clutches", Leningrad, Machinebuilding, Leninggradskoe Otdelenie, 1979, p. 214, Fig. VI.1, p. 239, Fig.VI.26.

(Continued)

*Primary Examiner* — Tisha Lewis
(74) *Attorney, Agent, or Firm* — Arent Fox LLP

(57) ABSTRACT

First and second engines ENG1 and ENG2; first and second transmissions TM1 and TM2 shifting the output of the first and second engines; first and second one-way clutches OWC1 and OWC2 that are provided in each output portion of the first and second transmissions; a driving target member 11 commonly connected to the output members 121 of the first and second one-way clutches via clutch mechanisms CL1 and CL2 and transmits the rotational power transmitted to the output members of the one-way clutches to the driving wheel 2; a main motor/generator MG1 connected to the member 11; a sub motor/generator MG2 connected to the output shaft S1 of the first engine; a battery 8 sending/receiving the electric power between both motor/generators; a synchronization mechanism 20 connecting/disconnecting the member 11 and the output shaft S2 of the second engine; and a controller 5.

17 Claims, 40 Drawing Sheets

(56) References Cited

U.S. PATENT DOCUMENTS

| | | | |
|---|---|---|---|
| 4,566,279 A * | 1/1986 | Kronogard et al. | 60/718 |
| 7,317,259 B2 * | 1/2008 | Yamauchi | 290/40 C |
| 8,337,359 B2 * | 12/2012 | Hofbauer | 477/5 |
| 2005/0039572 A1 | 2/2005 | Friedmann | |
| 2008/0103679 A1 * | 5/2008 | Ruiz | 701/106 |

FOREIGN PATENT DOCUMENTS

| | | |
|---|---|---|
| JP | 57-108432 | 7/1982 |
| JP | 62-143721 A | 6/1987 |
| JP | 63-35822 B2 | 7/1988 |
| JP | 11-311137 A | 11/1999 |
| JP | 2003-083105 A | 3/2003 |
| JP | 2005-502543 A | 1/2005 |

OTHER PUBLICATIONS

Russian Office Action, Application No. 2013101592/11(002085) issued on Dec. 17, 2013.

* cited by examiner

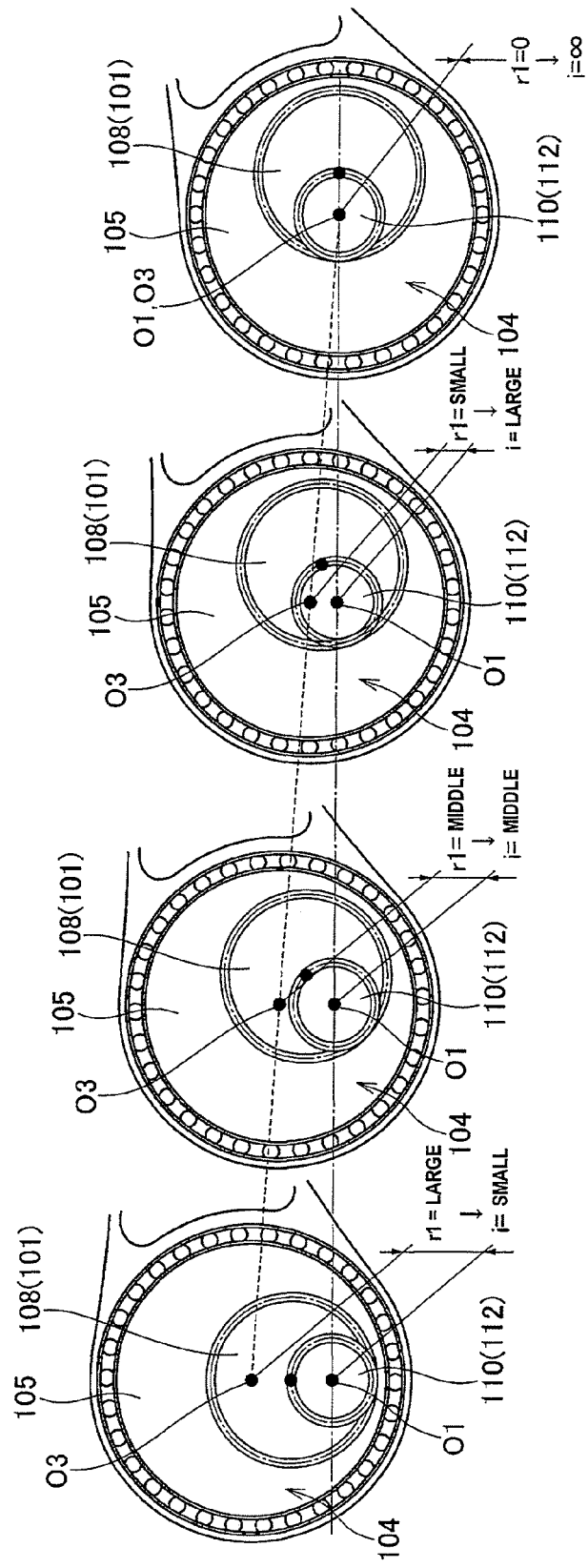

VEHICLE DRIVING SYSTEM

CROSS-REFERENCE TO RELATED APPLICATION

This application is a National Stage entry of International Application No. PCT/JP2011/060787 filed May 10, 2011, which claims priority to Japanese Patent Application Nos. 2010-136542, 2010-136544 and 2010-136549 filed Jun. 15, 2010, the disclosure of the prior applications are hereby incorporated in their entirety by reference.

TECHNICAL FIELD

The present invention relates to a vehicle driving system that includes plural internal combustion engines.

BACKGROUND ART

As a vehicle driving system of the related art, various systems are known (e.g., see PTLs 1 to 3). Among them, a system in PTL 1 is configured such that two engines, a first engine and a second engine, are mounted as a driving source. When the necessary torque is small, only the first engine is operated, an output thereof is input into a transmission, and when the necessary torque is large, by additionally operating the second engine section, the outputs of both engines are synthesized and input into the transmission, whereby the necessary torque is produced under an optimal condition depending on the load situation to improve the fuel efficiency of a vehicle.

A system in PTL 2 is configured such that power of an engine (substantially, considered as two engines) having two pistons of different strokes is input into the transmission in parallel via a one-way clutch and is transmitted to an output shaft.

PRIOR ART LITERATURE

Patent Literature

[PTL 1] JP-S63-035822-B
[PTL 2] JP-2003-083105-A
[PTL 3] JP-2005-502543-A

SUMMARY OF INVENTION

Problem to be Solved by Invention

Since the driving devices in PTLs 1 and 2 are configured such that the powers of two independent engines or substantially two engines are synthesized and input into the transmission, it is impossible to individually change the rotation number or the like of each engine in respect to the required output. For that reason, it is not possible to operate the engine in a high efficiency point, and there is a limitation on improving fuel efficiency.

The present invention was made in view of the above circumstances, and an object thereof is to provide a vehicle driving system which can reduce fuel consumption with higher efficiency.

Means for Solving Problem

Claim 1 defines a vehicle driving system (e.g., a driving system 1 in embodiment) including:

a first internal combustion engine section (e.g., a first engine ENG1 in embodiment) and a second internal combustion engine section (e.g., a second engine ENG2 in embodiment) that generate rotational powers, respectively;

a first transmission mechanism (e.g., a first transmission TM1 in embodiment) and a second transmission mechanism (e.g., a second transmission TM2 in embodiment) that output the generated rotational powers of the first internal combustion engine section and the second internal combustion engine section while changing speeds thereof, respectively;

a first one-way clutch (e.g., a first one-way clutch OWC1 in embodiment) and a second one-way clutch (e.g., a second one-way clutch OWC2 in embodiment) that are provided in the output portions of the first transmission mechanism and the second transmission mechanism, respectively, each one-way clutch having:

an input member (e.g., an input member 122 in embodiment) that receives the rotational powers from the first transmission mechanism and the second transmission mechanism;

an output member (e.g., an output member 121 in embodiment); and an engagement member (e.g., a roller 123 in embodiment) that makes the input member and the output member enter a locked state or an unlocked state with each other, so that the input member and the output member enter the locked state when a rotational speed of a positive direction of the input member exceeds a rotational speed of a positive direction of the output member, thereby transmitting the rotational power from the input member to the output member; and a driving target member (e.g., a driving target member 11 in embodiment) that is commonly connected to the output members of the first one-way clutch and the second one-way clutch and transmits the rotational power to be transmitted to the output members of each one-way clutch to a driving wheel (e.g., a driving wheel 2 in embodiment), wherein the generated rotational powers of the first internal combustion engine section and the second internal combustion engine section are input to the first one-way clutch and the second one-way clutch via the first transmission mechanism and the second transmission mechanism, respectively, and the rotational powers are input to the driving target member via the first one-way clutch and the second one-way clutch, respectively.

Claim 2 defines, based on claim 1, the system, wherein the first transmission mechanism and the second transmission mechanism are constituted by continuously variable transmission mechanisms (e.g., continuously variable transmission mechanisms BD1 and BD2 in embodiment) that can be changed in a non-step manner.

Claim 3 defines, based on claim 2, the system, wherein the continuously variable transmission mechanism includes:

an input shaft (e.g., an input shaft 101 in embodiment) that rotates around an input center axis (e.g., an input center axis O1 in embodiment) by receiving the rotational power;

plural first fulcrums (e.g., a first fulcrum O3 in embodiment) that are provided in a circumferential direction of the input shaft at equal intervals, are able to change an eccentricity (e.g., an eccentricity r1 in embodiment) with respect to the input center axis, respectively, and rotate together with the input shaft around the input center axis while maintaining the eccentricity;

plural eccentric disks (e.g., an eccentric disk 104 in embodiment) that hold the first fulcrums as the centers, respectively, and rotate around the input center axis;

a one-way clutch (e.g., a one-way clutch 120 in embodiment) that has an output member (e.g., an output member 121 in embodiment) that rotates around an output center axis (e.g., an output center axis O2 in embodiment) separated from the input center axis, an input member (e.g., an input member 122 in embodiment) that is oscillated around the output center axis by receiving the power of a rotational direction from the outside, and an engagement member (e.g., a roller 123 in embodiment) that makes the input member and the output member enter a locked state or an unlocked state with each other, and when the rotational speed of the positive direction of the input member exceeds the rotational speed of the positive direction of the output member, the one-way clutch transmits the rotational power, which was input into the input member, to the output member, thereby converting an oscillation movement of the input member to a rotational movement of the output member;

a second fulcrum (e.g., a second fulcrum O4 in embodiment) that is positioned separately from the output center axis of the input member;

plural connection members (e.g., a connection member 130 in embodiment) that have one ends (e.g., a ring portion 131 in embodiment) connected to the outer peripheries of the eccentric disks so as to be rotatable around the first fulcrum and the other ends (e.g., the other end portion 132 in embodiment) connected to the second fulcrum provided on the input member of the one-way clutch so as to be rotatable, thereby transmitting the rotational movement, which is given from the input shaft to the eccentric disk, to the input member of the one-way clutch as an oscillation movement of the input member; and a transmission ratio variable mechanism (e.g., a transmission ratio variable mechanism 112 in embodiment) that changes an oscillation angle of the oscillation movement to be transmitted from the eccentric disk to the input member of the one-way clutch by adjusting the eccentricity of the first fulcrum with respect to the input center axis, thereby changing the transmission ratio when the rotational power to be input into the input shaft is transmitted to the output member of the one-way clutch via the eccentric disk and the connection member as the rotational power, and wherein the continuously variable transmission mechanism is configured as a four bar linkage mechanism type of continuously variable transmission mechanism that can set the transmission ratio to infinity by setting the eccentricity to be zero, the output shaft (e.g., output shafts S1 and S2 in embodiment) of the internal combustion engine section is connected to the input shaft of the continuously variable transmission mechanism, and the one-way clutch which is a component of the continuously variable transmission mechanism also serves as the first one-way clutch and the second one-way clutch provided between the first transmission mechanism, the second transmission mechanism, and the driving target member, respectively.

Claim 4 defines, based on claim 3, the system, further including:

clutch mechanisms (e.g., clutch mechanisms CL1 and CL2 in embodiment) that can transmit/disconnect the power between the output members of the first one-way clutch and the second one-way clutch and the driving target member.

Claim 5 defines, based on claim 1, the system, further including:

a main motor/generator (e.g., a main motor/generator MG1 in embodiment) connected to the driving target member.

Claim 6 defines, based on claim 1, the system, further including:

a sub motor/generator (e.g., a sub motor/generator MG 2 in embodiment) connected to the output shaft of the first internal combustion engine section.

Claim 7 defines, based on claim 1, the system, further including:

a main motor/generator connected to the driving target member; and a sub motor/generator connected to the output shaft of the first internal combustion engine section.

Claim 8 defines, based on claim 1, the system, further including:

clutch mechanisms that can transmit/disconnect the power between the output members of the first one-way clutch and the second one-way clutch and the driving target member.

Claim 9 defines, based on claim 1, the system, wherein the first and second internal combustion engine sections have high efficiency operation points different from each other.

Claim 10 defines, based on claim 1, the system, further including:

a controller (e.g., a controller 5 in embodiment) configured to perform a synchronization control which controls the rotation number of the first and second internal combustion engine sections and/or the transmission ratios of the first and second transmission mechanisms so that the rotational speed to be input into both input members of the first one-way clutch and the second one-way clutch exceeds the rotational speed of the output member, wherein the controller controls the first internal combustion engine section and/or the first transmission mechanism in the state of fixing an operation condition to a certain range so that the rotation number and/or the torque of the first internal combustion engine section enters a high efficiency operation region when performing the synchronization control, and controls the second internal combustion engine section and the second transmission mechanism depending on the output request exceeding the output to be obtained by the fixed operation condition.

Claim 11 defines, based on claim 10, the system, wherein a displacement of the first internal combustion engine section, to which the operation condition is fixed, is smaller than a displacement of the second internal combustion engine section.

Claim 12 defines, based on claim 10, the system, wherein a displacement of the first internal combustion engine section, to which the operation condition is fixed, is greater than a displacement of the second internal combustion engine section.

Claim 13 defines, based on claim 10, the system, wherein one of the first internal combustion engine section and the second internal combustion engine section is set to have a large displacement, and the other thereof is set to have a small displacement, and wherein the controller performs the control so that, when the request output is equal to or greater than a predetermined value, the internal combustion engine section of the small displacement is set in the operation condition fixing side, and when the request output is equal to or less than a predetermined value, the internal combustion engine section of the large displacement is set in the operation condition fixing side.

Claim 14 defines, based on claim 10, the system, wherein the continuously variable transmission mechanism includes:

an input shaft that rotates around the input center axis by receiving the rotational power;

plural first fulcrums that are provided in a circumferential direction of the input shaft at equal intervals, are able to change an eccentricity with respect to the input center axis, respectively, and rotate together with the input shaft around the input center axis while maintaining the eccentricity;

plural eccentric disks that hold the first fulcrums as the centers, respectively, and rotate around the input center axis;

a one-way clutch that has an output member that rotates around an output center axis separated from the input center axis, an input member that is oscillated around the output center axis by receiving the power of a rotational direction from the outside, and an engagement member that makes the input member and the output member enter a locked state or an unlocked state with each other, and when the rotational speed of the positive direction of the input member exceeds the rotational speed of the positive direction of the output member, the one-way clutch transmits the rotational power, which was input into the input member, to the output member, thereby converting an oscillation movement of the input member to a rotational movement of the output member;

a second fulcrum that is positioned separately from the output center axis on the input member;

plural connection members that have one ends connected to the outer peripheries of the eccentric disks so as to be rotatable around the first fulcrum, and the other ends connected to the second fulcrum provided on the input member of the one-way clutch so as to be rotatable, thereby transmitting the rotational movement, which is given from the input shaft to the eccentric disk, to the input member of the one-way clutch as an oscillation movement of the input member; and a transmission ratio variable mechanism that changes an oscillation angle of the oscillation movement to be transmitted from the eccentric disk to the input member of the one-way clutch by adjusting the eccentricity of the first fulcrum with respect to the input center axis, thereby changing the transmission ratio when the rotational power to be input into the input shaft is transmitted to the output member of the one-way clutch via the eccentric disk and the connection member as the rotational power, and wherein the continuously variable transmission mechanism is configured as a four bar linkage mechanism type of continuously variable transmission mechanism that can set the transmission ratio to infinity by setting the eccentricity to be zero, the output shaft of the internal combustion engine section is connected to the input shaft of the continuously variable transmission mechanism, and the one-way clutch which is a component of the continuously variable transmission mechanism also serves as the first one-way clutch mechanism and the second one-way clutch mechanism provided between the first transmission, the second transmission, and the driving target member, respectively.

Claim 15 defines, based on claim 1, the system, further including:

a controller configured to perform a synchronization control which controls the rotation number of the first and second internal combustion engine sections and/or the transmission ratios of the first and second transmission mechanisms so that the rotational speed to be input into both input members of the first one-way clutch and the second one-way clutch exceeds the rotational speed of the output member.

Claim 16 defines, based on claim 15, the system, wherein the first transmission mechanism and the second transmission mechanism are constituted by continuously variable transmission mechanisms capable of changing the transmission ratio in a non-step manner.

Claim 17 defines, based on claim 16, the system, wherein the continuously variable transmission mechanism includes:

an input shaft that rotates around the input center axis by receiving the rotational power;

plural first fulcrums that are provided in a circumferential direction of the input shaft at equal intervals, are able to change an eccentricity with respect to the input center axis, respectively, and rotate together with the input shaft around the input center axis while maintaining the eccentricity;

plural eccentric disks that hold the first fulcrums as the centers, respectively, and rotate around the input center axis;

a one-way clutch that has an output member that rotates around an output center axis separated from the input center axis, an input member that is oscillated around the output center axis by receiving the power of a rotational direction from the outside, and an engagement member that makes the input member and the output member enter a locked state or an unlocked state with each other, and when the rotational speed of the positive direction of the input member exceeds the rotational speed of the positive direction of the output member, the one-way clutch transmits the rotational power, which was input into the input member, to the output member, thereby converting an oscillation movement of the input member to a rotational movement of the output member;

a second fulcrum that is positioned separately from the output center axis on the input member;

plural connection members that have one ends connected to the outer peripheries of the eccentric disks so as to be rotatable around the first fulcrum, and the other ends connected to the second fulcrum provided on the input member of the one-way clutch so as to be rotatable, thereby transmitting the rotational movement, which is given from the input shaft to the eccentric disk, to the input member of the one-way clutch as an oscillation movement of the input member; and a transmission ratio variable mechanism that changes an oscillation angle of the oscillation movement to be transmitted from the eccentric disk to the input member of the one-way clutch by adjusting the eccentricity of the first fulcrum with respect to the input center axis, thereby changing the transmission ratio when the rotational power to be input into the input shaft is transmitted to the output member of the one-way clutch mechanism via the eccentric disk and the connection member as the rotational power, and wherein the continuously variable transmission mechanism is configured as a four bar linkage mechanism type of continuously variable transmission mechanism that can set the transmission ratio to infinity by setting the eccentricity to be zero, the output shaft of the internal combustion engine section is connected to the input shaft of the continuously variable transmission mechanism, and the one-way clutch which is a component of the continuously variable transmission mechanism also serves as the first one-way clutch and the second one-way clutch provided between the first transmission mechanism, the second transmission mechanism, and the driving target member, respectively.

Advantages of Invention

According to Claim 1, since the respective first and second internal combustion engine portions are individually equipped with the transmission mechanisms, by combining the rotation number of the internal combustion engine section with the setting of the transmission ratio of the transmission mechanism, the output rotation number (the input rotation number of the input member of the one-way clutch) from the transmission mechanism can be controlled. Thus, the rotation number of each internal combustion engine section can be independently controlled depending on the setting of the transmission ratio of the transmission mechanism, and it is possible to operate each internal combustion engine section with effective movement point, respectively, which can contribute to improved fuel efficiency.

When the combination of "the internal combustion engine section and "the transmission mechanism" is called "a power mechanism", since two sets of power mechanisms are connected to the same driving target member via the one-way clutch mechanism, respectively, the selective switch-over of the power mechanism to be used as a driving source or the synthesis of the driving forces from two power mechanisms can be executed only by performing the control of the input rotation number (the rotation number to be output from the power mechanism) with respect to each one-way clutch.

According to Claim 2, since the continuously variable transmission mechanism shiftable in a non-step manner is used as the first and second transmission mechanisms, only by changing the transmission ratio of the transmission mechanism in a non-step manner while keeping the running state in a high efficiency operation point without changing the rotation number of the internal combustion engine section, it is possible to smoothly control ON/OFF of the power transmission from each power mechanism to the driving target member ("the connection and disconnection" of a power transmission path due to the locked state or the unlocked state of the one-way clutch are called "ON/OFF" for the sake of convenience).

In this regard, in the case of a step transmission mechanism, in order to smoothly control ON/OFF of the one-way clutch by changing the output rotation number of the power mechanism, there is a need to adjust the rotation number of the internal combustion engine portion to meet the transmission gear step. Meanwhile, in the case of the continuously variable transmission mechanism, since the output rotation number of the power mechanism can be smoothly changed only by adjusting the transmission ratio of the transmission mechanism in a non-step manner without changing the rotation number of the internal combustion engine section, it is possible to smoothly perform the switch-over of the driving source (the internal combustion engine section) due to ON/OFF of the power transmission between the power mechanism and the driving target member via the one-way clutch. Thus, it is possible to keep the operation of the internal combustion engine section in a running state having a satisfactory BSFC (Brake Specific Fuel Consumption).

According to Claims 3, 14, and 17, by adopting the continuously variable transmission mechanism configured such that the rotational movement of the input shaft is converted to the eccentric rotational movement of the eccentric disk with the variable eccentricity, the eccentric rotational movement of the eccentric disk is transmitted to the input member of the one-way clutch via the connection member as the oscillation movement, and the oscillation movement of the input member is converted to the rotational movement of the output member of the one-way clutch, the transmission ratio can be increased to infinity only by changing the eccentricity. Thus, even if there is no clutch which separates the internal combustion engine section as the driving source from an inertial mass portion of a downstream side (output side), by setting the transmission ratio to infinity, when the internal combustion engine portion is started or the like, the inertial mass portion of the downstream side can be substantially separated from the internal combustion engine section. For that reason, the inertial mass portion of the downstream side (the output side) does not amount to resistance when the internal combustion engine section is started, but the starting of the internal combustion engine section can be smoothly performed.

By setting the transmission ratio to infinity, even if there is no clutch, substantially separating the internal combustion engine section from the inertial mass portion of the downstream side is particularly effective when connecting the main motor/generator to the driving target member to become hybrid. For example, in the case of shifting from an EV running, in which only the driving force of the main motor/generator is used, to a series running, in which the first internal combustion engine section is started, the sub motor/generator provided separately is driven by the driving force of the first internal combustion engine section, the electric power generated in the sub motor/generator is supplied to the main motor/generator, and the running is performed by the driving force of the main motor/generator, there is a need for the starting of the first internal combustion engine in the state of the EV running. However, since the resistance during starting internal combustion engine portion can be reduced as mentioned above, the shifting from the EV running to the series running can be smoothly performed without shock. By substantially separating the internal combustion engine section from the inertial mass portion of the downstream side, since the rotational resistance when executing the series running can be reduced, it is possible to reduce energy loss during series running and contribute to improved fuel efficiency.

In the case of adopting this type of continuously variable transmission mechanism, since the number of gears used can be reduced, energy loss due to engagement abrasion of the gears can be reduced.

According to Claims 4 and 8, by causing the clutch mechanism to enter the disconnection state (called cutting state or OFF state), it is possible to separate the power transmission path of the upstream side from the power transmission path of the downstream side by the clutch mechanism. Thus, it is possible to prevent the drag of the one-way clutch which is not used in the wheel driving, whereby unnecessary energy loss can be reduced.

According to Claim 5, since the main motor/generator is connected to the driving target member as the power source different from the internal combustion engine section, it is possible to perform the EV running only using the driving force of the main motor/generator. During EV running, the rotational speed of the positive direction of the output member exceeds the rotational speed of the positive direction of the input member in the first and second one-way clutches, the state of clutch OFF (unlocked state) is generated, and the power mechanism is separated from the driving target member.

When shifting from the EV running to the engine running using the driving force of the internal combustion engine section, the control is performed so that the input rotation number of the one-way clutch annexed to the internal combustion engine section using the driving force exceeds the rotation number of the driving target member that is driven by the main motor/generator. As a result, it is possible to easily switch over the running mode from the EV running to the engine running.

By synchronizing the rotation number to be input from the internal combustion engine section to the one-way clutch with the rotation number to be given from the main motor/generator to the driving target member, it is also possible to perform a parallel running which uses both the driving force of the internal combustion engine section and the driving force of the main motor/generator. Since it is also possible to start the internal combustion engine section by the use of the driving force of the main motor/generator, a separate starter device (e.g., a starter motor or the like) for the internal combustion engine can be omitted. By causing the main motor/generator to function as a generator when a vehicle is decelerated, since it is possible to cause a regeneration braking force to act on the driving wheel and obtain the regeneration braking power, an improvement in energy efficiency is also promoted.

According to Claim 6, since the sub motor/generator is connected to the output shaft of the first internal combustion engine section, the sub motor/generator can be used as the starter of the first internal combustion engine section, and there is no need to provide a separate starter device for the internal combustion engine section. By using the sub motor/generator as a generator that generates electricity by the driving force of the first internal combustion engine section and supplying the generated electric power to the main motor/generator provided separately, the series running can also be performed.

According to Claim 7, as the power source different from the internal combustion engine section, after the main motor/generator is connected to the driving target member, the sub motor/generator is connected to the output shaft of the first internal combustion engine section. Thus, besides the engine running using only the driving force of the internal combustion engine section, it is possible to select and execute various running modes such as the EV running that uses the driving force of the main motor/generator, the parallel running that uses the driving forces of both the internal combustion engine section and the main motor/generator in parallel, and the series running which supplies the electric power generated in the sub motor/generator to the main motor/generator using the driving force of the first internal combustion engine section and performs the running by the driving force of the main motor/generator.

According to Claim 9, since the high efficiency operation points of the first and second internal combustion engine sections are different from each other, by preferentially selecting the internal combustion engine section having a high efficiency as the driving source, an overall improvement in energy efficiency can be promoted. To make the high efficiency operation points of the internal combustion engine portion different from each other, magnitudes of the displacement of the internal combustion engine section may be made different.

According to Claim 10, when performing the synchronization control that synthesizes the driving forces of two internal combustion engine sections to drive the driving target member such as during high speed running, since at least one internal combustion engine section side (the first internal combustion engine section side) is operated in the high efficiency operation region, it is possible to contribute to improved fuel efficiency.

According to Claim 11, even when there is a great fluctuation in the request output, since the internal combustion engine section side of high displacement copes with the great fluctuation, it is possible to reduce the delay depending on the request.

According to Claim 12, since the internal combustion engine section of the large displacement is operated in the high efficiency operation scope, it is possible to further contribute to improved fuel efficiency.

According to Claim 13, when the request output is great, the internal combustion engine section of the small displacement is set in the operation condition fixing side, and the internal combustion engine section side of the large displacement copes with the fluctuation in the request output. Thus, it is possible to reduce the delay depending on the request. When the request output is small, the internal combustion engine section of the large displacement is set in the operation condition fixing side, and the internal combustion engine section side of the small displacement copes with the fluctuation in the request output. Thus, it is possible to further contribute to improved fuel efficiency.

According to Claim 15, when performing the engine running by the power synthesis of two internal combustion engine sections, only by performing the control so that the input rotation number of both the first one-way clutch and the second one-way clutch exceed the output rotation number, it is possible to easily input the great driving force, in which the outputs of two internal combustion engine sections are synthesized, into the driving target member to perform the running, without performing a special clutch operation.

According to Claim 16, since the continuously variable transmission shiftable in the non-step manner is used as the first and second transmission mechanisms, it is possible to smoothly control ON/OFF of the power transmission from each driving mechanism to the driving target member ("the connection and disconnection" of a power transmission path due to the locked state or the unlocked state of the one-way clutch are called "ON/OFF" for the sake of convenience), only by changing the transmission ratio of the transmission mechanism in a non-step manner while keeping the running state in a high efficiency operation point without changing the rotation number of the internal combustion engine section. Thus, only by changing the transmission ratio of the transmission mechanism in the non-step manner, is it possible to smoothly perform the switch-over from the running using the driving force of the one internal combustion engine section to the running using the synthetic driving force of two internal combustion engine sections without shock.

In this regard, in the case of a step transmission mechanism, in order to smoothly control ON/OFF of the one-way clutch by changing the output rotation number of the power mechanism, there is a need to adjust the rotation number of the internal combustion engine portion to meet the transmission gear step. Meanwhile, in the case of the continuously variable transmission mechanism, since the output rotation number of the power mechanism can be smoothly changed only by adjusting the transmission ratio of the transmission mechanism in a non-step manner without changing the rotation number of the internal combustion engine section, it is possible to smoothly perform the switch-over of the driving source (the internal combustion engine section) due to ON/OFF of the power transmission between the power mechanism and the driving target member via the one-way clutch. Thus, it is possible to keep the operation of the internal combustion engine section in a running state having a satisfactory BSFC (Brake Specific Fuel Consumption).

BRIEF DESCRIPTION OF DRAWINGS

FIGS. 4A to 4D show a first half of a transmission principal by a transmission ratio variable mechanism in the transmission mechanism, FIG. 4A shows the state where an eccentricity r1 with respect to an input center axis O1 as a rotation center of a first fulcrum O3, which is a center point of an eccentric disk 140, is set to be "large", and a transmission ratio i is set to be "small", FIG. 4B shows the state where the eccentricity r1 is set to be "middle" and the transmission ratio i is set to be "middle", FIG. 4C shows the state where the eccentricity r1 is set to be "small" and the transmission ratio i is set to be "small", and FIG. 4D shows the state where the eccentricity r1 is set to "zero" and the transmission ratio i is set to "infinity (∞)".

FIG. 5A shows the state where an oscillation angle θ2 of the input member 122 is "large" by setting the eccentricity r1 to be "large" and the transmission ratio i to be "small", FIG. 5B shows the state where an oscillation angle θ2 of the input member 122 is "middle" by setting the eccentricity r1 to be "middle" and the transmission ratio i to be "middle", and FIG. 5C shows the state where an oscillation angle θ2 of the input member 122 is "small" by setting the eccentricity r1 to be "small" and the transmission ratio i to be "large".

DESCRIPTION OF EMBODIMENTS

Hereinafter, an embodiment of the present invention will be described based on the drawings.

Figure 1:
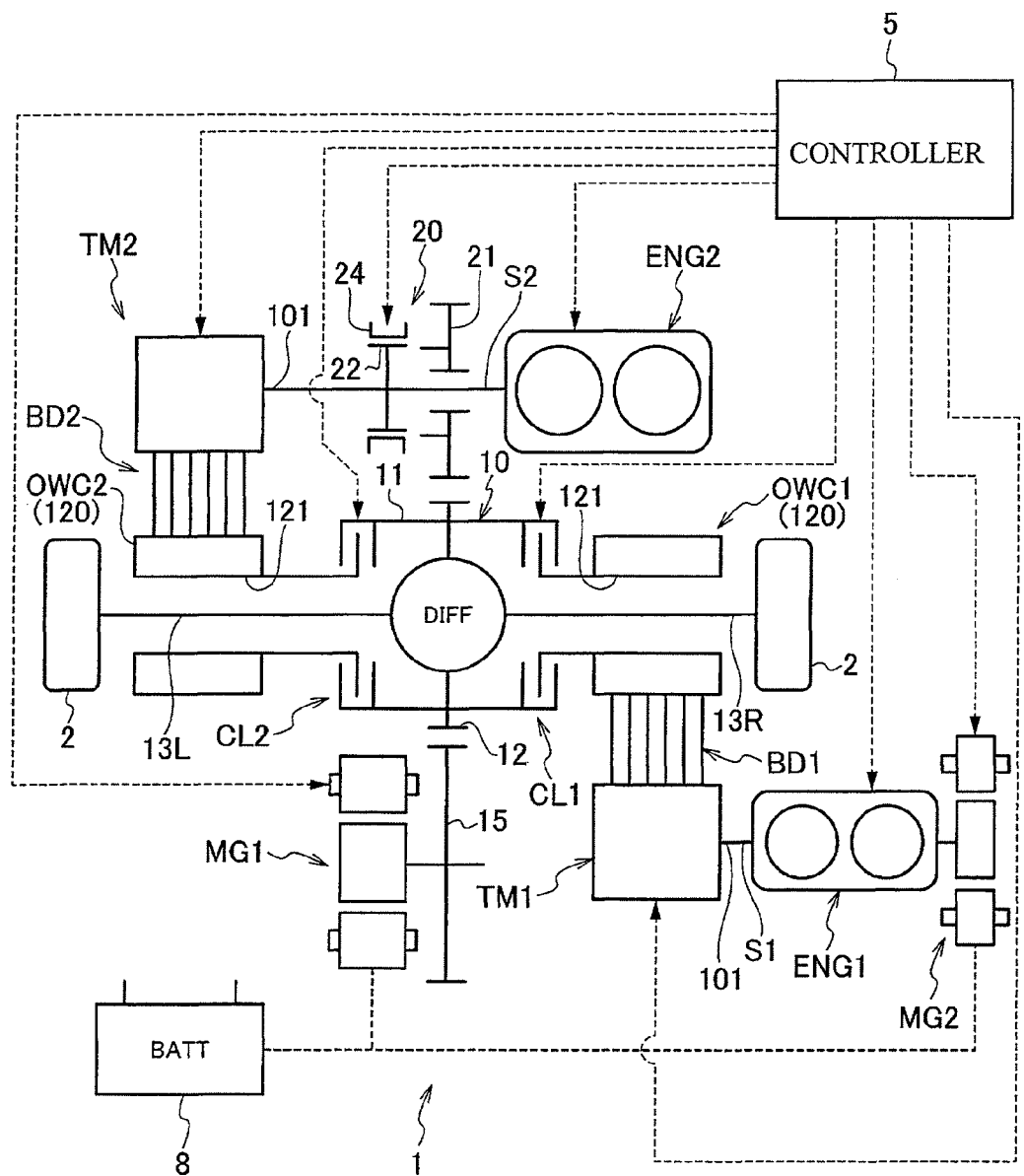
FIG. 1 shows a vehicle driving system of an embodiment of the present invention in a skeleton manner.
Figure 2:
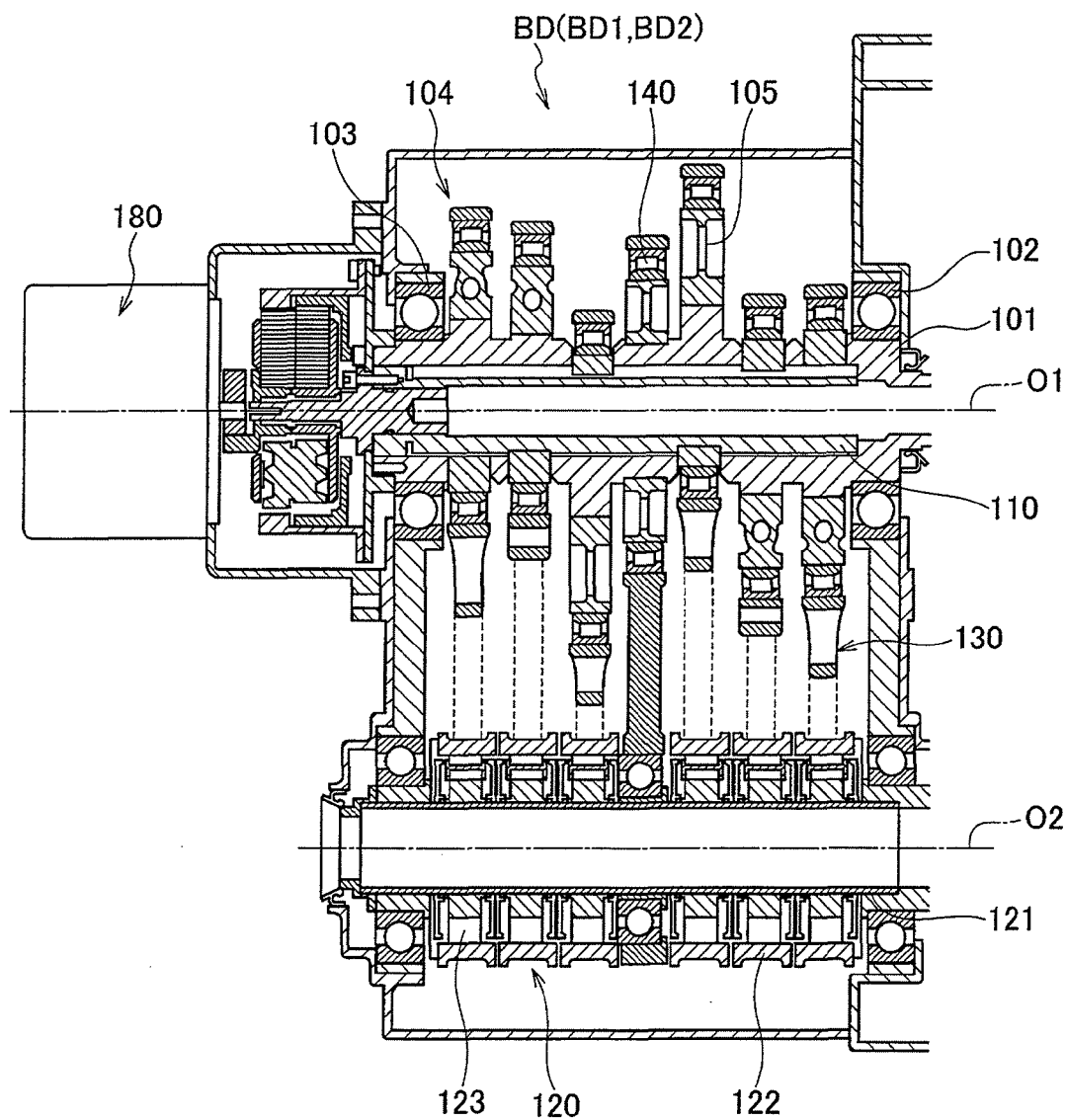
FIG. 2 cross-sectionally shows an infinite continuously variable transmission mechanism which is a major portion of the driving system.
Figure 3:
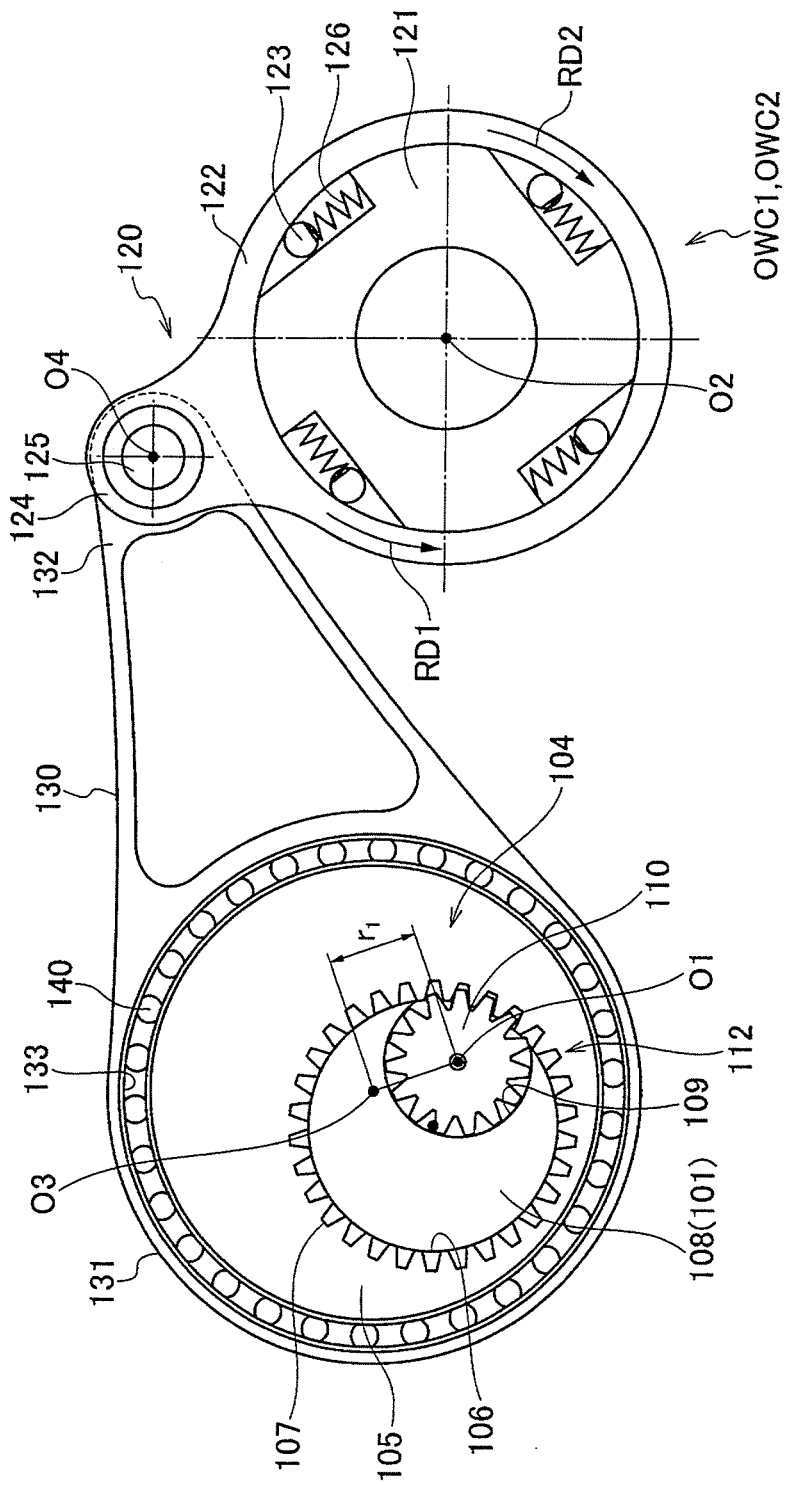
FIG. 3 cross-sectionally shows a part of the transmission mechanism from an axial direction.

FIG. 1 shows a vehicle driving system of an embodiment of the present invention in a skeleton manner. FIG. 2 cross-sectionally shows an infinite continuously variable transmission mechanism that is a major portion of the driving system. FIG. 3 cross-sectionally shows a part of the infinite continuously variable transmission mechanism from an axial direction.

Overall Configuration

The vehicle driving system 1 includes two engines ENG1 and ENG2 as first and second internal combustion engine sections that generate the rotational power, respectively; first and second transmissions (transmission mechanism) TM1 and TM2 that are provided in each downstream side of the first and second engines ENG1 and ENG2; first and second one-way clutches OWC1 and OWC2 that are provided in the output portions of the respective transmissions TM1 and TM2; a driving target member 11 that receives the output rotation transmitted via the one-way clutches OWC1 and OWC2; a main motor/generator MG1 that is connected to the driving target member 11; a sub motor/generator MG2 that is connected to the output shaft S1 of the first engine ENG1; a battery (storage) 8 that can send and receive the electric power between the main and/or sub motor/generators MG1 and MG2; and a controller 5 that performs the control of the running pattern or the like by controlling various elements.

The respective one-way clutches OWC1 and OWC2 have an input member (an outer clutch) 122, an output member (an inner clutch) 121, plural rollers (engagement members) 123 that are disposed between the input member 122 and the output member 121 and make both members 122 and 121 enter a locked state or an unlocked state with each other, and a biasing member 126 that biases the rollers 123 in a direction giving the locked state. When the rotational speed of the positive direction (an arrow RD1 direction) of the input member 122 receiving each rotational power from the first transmission TM1 and the second transmission TM2 exceeds the rotational speed of the positive direction of the output member 121, the input member 122 and the output member 121 enter the locked state with each other, whereby the rotational power input to the input member 122 is transmitted to the output member 121.

The first and second one-way clutches OWC1 and OWC2 are disposed in the left and the right sides with a differential device 10 interposed therebetween, and each output member 121 of the first and second one-way clutches OWC1 and OWC2 is connected to the driving target member 11 via separate clutch mechanisms CL1 and CL2, respectively. The clutch mechanisms CL1 and CL2 are provided so as to control the transmission/disconnection of the power between each output member 121 of the first and second one-way clutches OWC1 and OWC2 and the driving target member 11.

The driving target member 11 is configured by a differential case of the differential device 10, and the rotational force transmitted to the output members 121 of the respective one-way clutches OWC1 and OWC2 is transmitted to the left and right driving wheels 2 via the differential device 10 and left and right accelerator shafts 13L and 13R. A differential pinion and a side gear (not shown) are attached to the differential case (the driving target member 11) of the differential device 10, the left and right accelerator shafts 13L and 13R are connected to the left and right side gears, and the left and right accelerator shafts 13L and 13R are subjected to a differential rotation.

In the first and second engines ENG1 and ENG2, engines of high efficiency operation point different from each other are used, the first engine ENG1 is an engine of a small displacement, and the second engine ENG2 is an engine of the displacement greater than that of the first engine ENG1. For example, the displacement of the first engine ENG1 is 500 cc, the displacement of the second engine ENG2 is 1,000 cc, and the total displacement is 1,500 cc. Of course, the combination of the displacement is arbitrary.

The drive gear 15 attached to the output shaft of the main motor/generator MG1 is engaged with the drive gear 12 provided in the driving target member 11, whereby the main motor/generator MG1 and the driving target member 11 are connected to each other in a power transmittable manner. For example, the main motor/generator MG1 functions as the motor, the driving force is transmitted from the main motor/generator MG1 to the driving target member 11. When causing the main motor/generator MG1 to function as the generator, the power is input from the driving target member 11 to the main motor/generator MG1, and the mechanical energy is converted to the electric energy. Simultaneously, the regeneration braking power acts on the driving target member 11 from the main motor/generator MG1.

The sub motor/generator MG2 is directly connected to the output shaft S1 of the first engine ENG1, and performs the mutual transmission of the power between the sub motor/generator MG2 and the output shaft S1. Even in this case, when the sub motor/generator MG2 functions as the motor, the driving force is transmitted from the sub motor/generator MG2 to the output shaft S1 of the first engine ENG1. When the sub motor/generator MG2 functions as the generator, the power is transmitted from the output shaft S1 of the first engine ENG1 to the sub motor/generator MG2.

In the driving system 1 including the above elements, the rotational power generated in the first engine ENG1 and the second engine ENG2 is input to the first one-way clutches OWC1 and the second one-way clutch OWC2 via the first transmission TM1 and the second transmission TM2, and the rotational power is input to the driving target member 11 via the first one-way clutches OWC1 and the second one-way clutch OWC2.

In the driving system 1, between the output shaft S2 of the second engine ENG2 and the driving target member 11, a synchronization mechanism (clutch, starter clutch) 20 is provided which can connect and disconnect the power transmission between the output shaft S2 and the driving target member 11 different from the power transmission via the second transmission TM2. The synchronization mechanism 20 includes a first gear 21 that is always engaged with the drive gear 12 provided in the driving target member 11 and is provided around the output shaft S2 of the second engine ENG2 in a rotatable manner; a second gear 22 that is provided so as to rotate integrally with the output shaft S2 around the output shaft S2 of the second engine ENG2; and a sleeve 24 that joins or releases the first gear 21 and the second gear 22 by being subjected to the slide operation in the axial direction. That is, the synchronization mechanism 20 configures a power transmission path different from the power transmission path via the second transmission TM2 and the clutch mechanism CL2, and connects and disconnects the power transmission in the power transmission path.

Configuration of Transmission

Next, the first and second transmissions TM1 and TM2 used in the driving system 1 will be described.

The first and second transmissions TM1 and TN2 are configured by the continuously variable transmission mechanism of approximately the same configuration. This continuously variable transmission mechanism is a kind of a mechanism called IVT (Infinity Variable Transmission=a transmission mechanism of a type that sets the transmission ratio to infinity without using the clutch and can set the output rotation number to zero), is able to change the transmission ratio (ratio=i) in a non-step manner and can set the maximum value of the transmission ratio to infinity ($\infty$). The continuously variable transmission mechanism is configured by the infinite continuously variable transmission mechanism BD (BD1 and BD2).

As shown in FIGS. 2 and 3, the infinite continuously variable transmission mechanism BD includes an input shaft 101 that rotates around the input center axis O1 by receiving the rotational power from the engines ENG1 and ENG2, plural eccentric disks 104 that rotate integrally with the input shaft 101, connection members 130 of the same number as that of the eccentric disks 104 for connecting the input shaft with the output shaft, and a one-way clutch 120 that is provided in the output side.

The eccentric disks 104 are formed in a circular shape around the first fulcrums O3, respectively. The first fulcrums O3 are provided in a circumferential direction of the input shaft 101 at equal intervals, is able to change the eccentricity r1 with respect to the input center axis O1, respectively, and are set so as to rotate with the input shaft 101 around the input center axis O1 while maintaining the eccentricity r1. Thus, the eccentric disks 104 are provided so as to eccentrically rotate around the input center axis O1 along with the rotation of the input shaft 101 in the state of maintaining the eccentricity r1, respectively.

As shown in FIG. 3, the eccentric disks 104 are configured by an outer peripheral side disk 105, and an inner peripheral side disk 108 formed integrally with the input shaft 101. The inner peripheral side disk 108 is formed as a thick disk in which the center thereof is biased to the input center axis O1, which is the center axis of the input shaft 101, by a certain eccentric distance. The outer peripheral side disk 105 is formed as a thick disk around the first fulcrum O3, and has a first circular hole 106 having a center deviated from the center (the first fulcrum O3). The outer periphery of the inner peripheral side disk 108 is rotatably fitted into the inner periphery of the first circular hole 106.

In the inner peripheral side disk 108, a second circular hole 109 is provided which sets the input center axis O1 as a center, a part of a circumferential direction thereof is opened to the outer periphery of the inner peripheral side disk 108, and the pinion 110 is accommodated in the inner portion of the second circular hole 109 in a rotatable manner. The teeth of the pinion 110 is engaged with the inner toothed hear 107 formed in the inner periphery of the first circular hole 106 of the outer peripheral side disk 105b through the opening of the outer periphery of the second circular hole 109.

The pinion 110 is provided so as to rotate concentrically with the input center axis O1 that is the center axis of the input shaft 101. That is, the rotation center of the pinion 110 coincides with the input center axis O1 that is the center axis of the input shaft 101. As shown in FIG. 2, the pinion 110 rotates in the inner portion of the second circular hole 109 by an actuator 180 configured by a direct current motor and a deceleration mechanism. During normal times, the pinion 110 rotates in synchronicity with the rotation of the input shaft 101, and by giving the pinion 110 the rotation number exceeding or falling below the rotation number of the input shaft 101 based on the rotation number of the synchronization, the pinion 110 rotates relatively to the input shaft 101. For example, when the output shafts of the pinion 110 and the actuator 180 are disposed so as to be connected to each other and a rotation difference of the rotation of the actuator 180 is generated to the rotation of the input shaft 101, it is possible to be realized by the use of a deceleration mechanism (e.g., a planetary gear) in which a relative angle between the input shaft 101 and the pinion 110 is changed by applying the deceleration ratio to the rotation difference. At this time, when the actuator 180 is synchronized with the input shaft 101 without the rotation difference therebetween, the eccentricity r1 is not changed.

Thus, by rotating the pinion 110, an inner teeth gear 107 with which the pinion 110 is engaged, that is, the outer peripheral side disk 105 rotates relatively to the inner peripheral side disk 108, whereby a distance (that is, the eccentricity r1 of the eccentric disk 104) between the center (input center axis O1) of the pinion 110 and the center (the first fulcrum O3) of the outer peripheral side disk 105 is changed.

In this case, it is set so that the center (the first fulcrum O3) of the outer peripheral side disk 105 coincides with the center (the input center axis O1) of the pinion 110 by the rotation of the pinion 110, and the eccentricity r1 of the eccentric disk 104 can be set to "zero" by causing both centers to coincide with each other.

The one-way clutch 120 has an output member (an inner clutch) 121 that rotates around the output center axis O2 separated from the input center axis O1; a ring-shaped input member (an outer clutch) 122 that is oscillated around the output center axis O2 by receiving the power of the rotational direction from the outside; plural rollers (engagement members) 123 that are inserted between the input member 122 and the output member 121 so as to cause the input member 122 and the output member 121 to enter the locked state or the unlocked state with each other; and a biasing member 126 that biases the roller 123 in a direction giving the locked state. When the rotational power of the positive direction (e.g., a direction shown by an arrow RD1 in FIG. 3) of the input member 122 exceeds the rotational speed of the positive direction of the output member 121, the one-way clutch 120 transmits the rotational power input to the input member 122 to the output member 121, whereby the oscillation movement of the input member 122 can be converted to the rotation movement of the output member 121.

As shown in FIG. 2, the output member 121 of the one-way clutch 120 is configured as a member integrally connected in the axial direction, but the input members 122 are divided into plural members in the axial direction and are arranged so that the members can be independently oscillated in the axial direction, respectively. The roller 123 is inserted between the input member 122 and the output member 121 per each input member 122 by the number of the eccentric disk 104 and the connection member 130a.

An overhang member 124 is provided in a place of the circumferential direction on each ring-shaped input member 122, and a second fulcrum O4 separated from the output center axis O2 is provided in the overhang member 124. A pin 125 is disposed on the second fulcrum O4 of each input member 122, and a tip (the other end portion) 132 of the connection member 130 is rotatably connected to the input member 122 by the pin 125.

The connection member 130 has a ring portion 131 in one end side thereof, and an inner periphery of a circular opening 133 of the ring portion 131 is rotatably fitted into the outer periphery of the eccentric disk 104 via the bearing 140. Thus, in this manner, the one end of the connection member 130 is rotatably connected to the outer periphery of the eccentric disk 104, and the other end of the connection member 130 is rotatably connected to the second fulcrum O4 provided on the input member 122 of the one-way clutch 120, whereby a four bar linkage mechanism is configured which forms four bars of the input center axis O1, the first fulcrum O3, the output center axis O2, and the second fulcrum O4 as rotation points, the rotational movement to be given from the input shaft 101 to the eccentric disk 104 is transmitted to the input member 122 of the one-way clutch 120 as the oscillation movement of the input member 122, and the oscillation movement of the input member 122 is converted to the rotational movement of the output member 121.

At that time, by moving the pinion 110 of the transmission ratio variable mechanism 112, which is configured by the pinion 110, the inner peripheral side disk 108 including the second circular hole 109 accommodating the pinion 110, the outer peripheral side disk 105 including the first circular hole 106 rotatably accommodating the inner peripheral side disk 108, the actuator 180 or the like, by the actuator 180, the eccentricity r1 of the eccentric disk 104 can be changed. By changing the eccentricity r1, the oscillation angle θ2 of the input member 122 of the one-way clutch 120, whereby it is possible to change the ratio (transmission ratio: ratio i) of the rotation number of the output member 121 with respect to the rotation number of the input shaft 101. That is, by adjusting the eccentricity r1 of the first fulcrum O3 with respect to the input center axis O1, the oscillation angle θ2 of the oscillation movement to be transmitted from the eccentric disk 104 to the input member 122 of the one-way clutch 120 is changed, whereby it is possible to change the transmission ratio when the rotational movement to be input to the input shaft 101 is transmitted to the output member 121 of the one-way clutch 120 via the eccentric disk 104 and the connection member 130 as the rotational power.

In this case, the output shafts S1 and S2 of the first and second engines ENG1 and ENG2 are integrally connected to the input shaft 101 of the infinite continuously variable transmission mechanism BD (BD1 and BD2). The one-way clutch 120 as a component of the infinite continuously variable transmission mechanism BD (BD1 and BD2) also functions as the first one-way clutch OWC1 and the second one-way clutch OWC2 provided between the first transmission M1 and the second transmission TM2 and the driving target member 11, respectively.

FIGS. 4 and 5 show a transmission principal by the transmission ratio variable mechanism 112 in the infinite continuously variable transmission mechanism BD (BD1 and BD2). As shown in FIGS. 4 and 5, by rotating the pinion 110 of the transmission ratio variable mechanism 112 to rotate the outer peripheral side disk 105 with respect to the inner peripheral side disk 108, it is possible to control the eccentricity r1 with respect to the input center axis O1 (the rotation center of the pinion 110) of the eccentric disk 104.

Figure 5A:
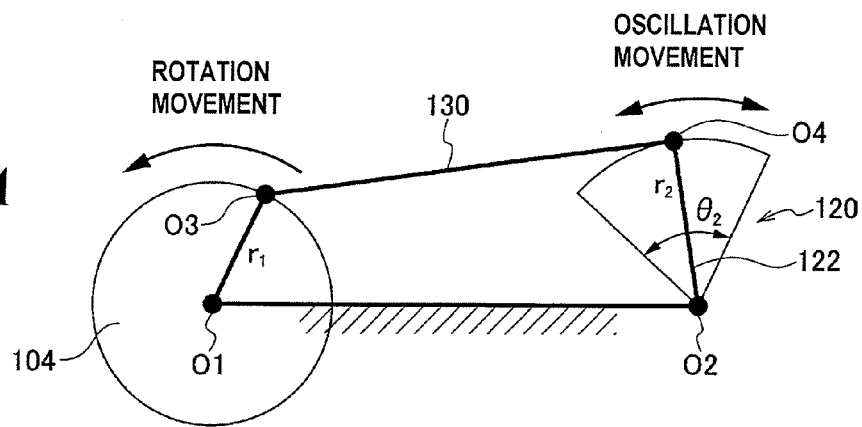
FIGS. 5A to 5C show a change of an oscillation angle θ2 of an input member 122 of a one-way clutch 120 when altering the eccentricity r1 of the eccentric disk and changing the transmission ratio i, as a second half of the transmission principal.
Figure 5B:
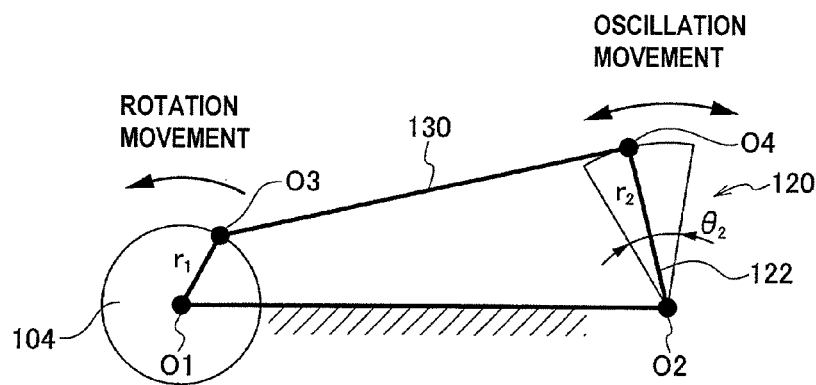
Figure 5C:
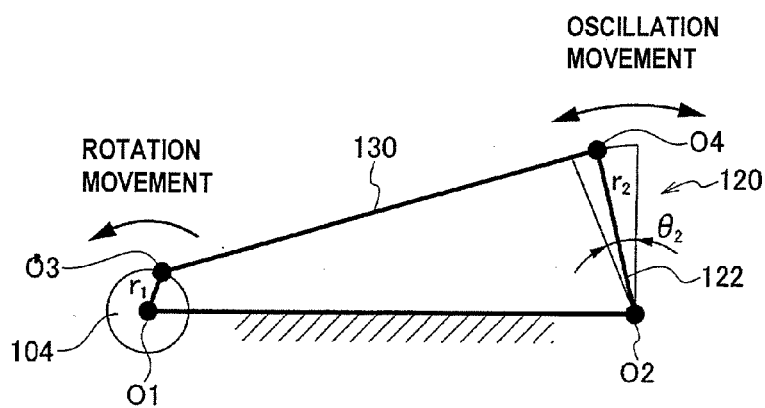

For example, as shown in FIGS. 4A and 5A, when the eccentricity r1 of the eccentric disk 104 is "large", the oscillation angle θ2 of the input member 122 of the one-way clutch 120 can be increased, and thus the small transmission ratio i can be realized. As shown in FIGS. 4B and 5B, when the eccentricity r1 of the eccentric disk 104 is "middle", the oscillation angle θ2 of the input member 122 of the one-way clutch 120 can be set to the "middle", and thus the middle transmission ratio i can be realized. As shown in FIGS. 4C and 5C, when the eccentricity r1 of the eccentric disk 104 is "small", the oscillation angle θ2 of the input member 122 of the one-way clutch 120 can be decreased, and thus the large transmission ratio i can be realized. As shown in FIG. 4D, when the eccentricity r1 of the eccentric disk 104 is "zero", the oscillation angle θ2 of the input member 122 of the one-way clutch 120 can be set to "zero", and thus the transmission ratio i can be set to "infinity (∞)".

Figure 6:
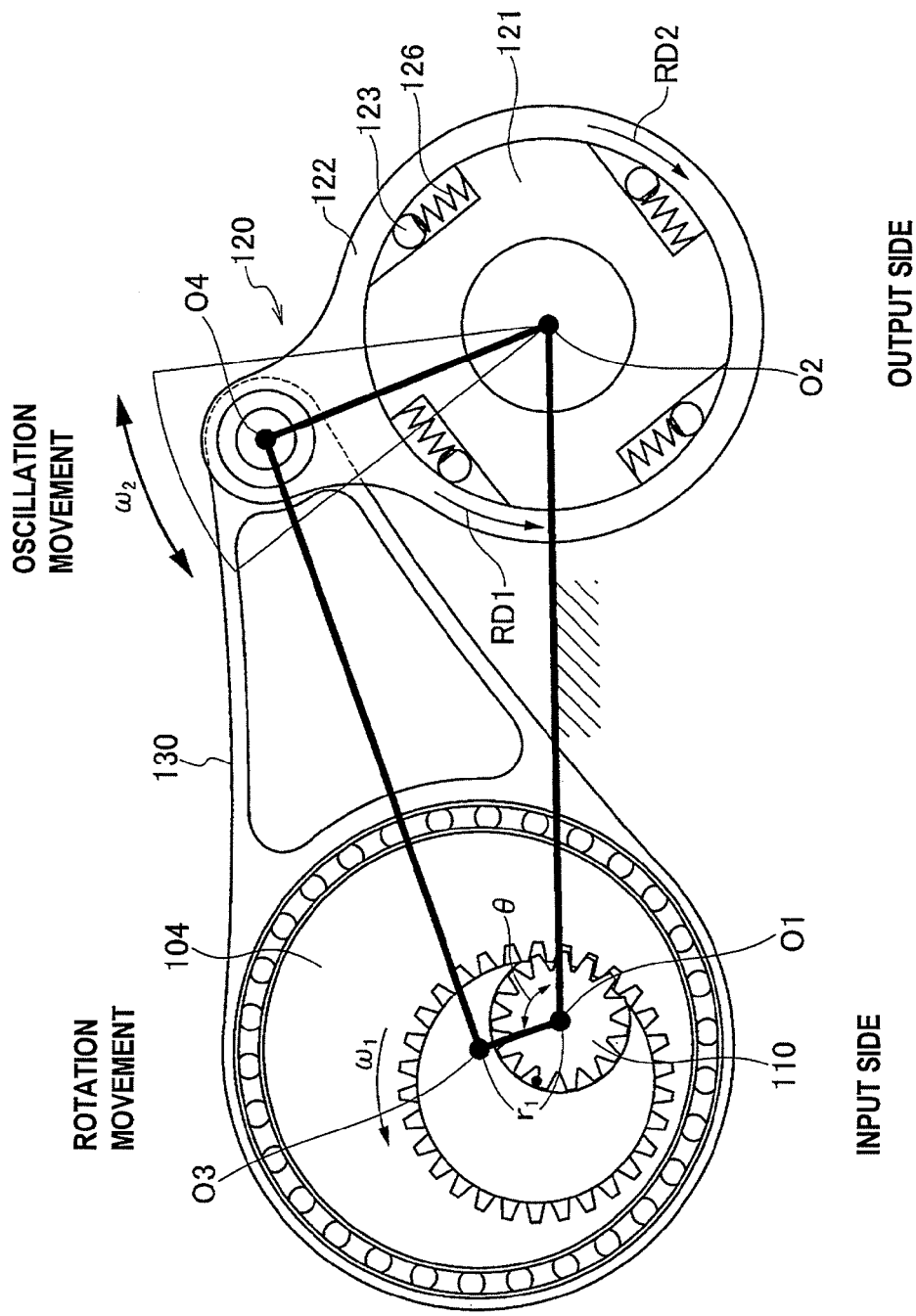
FIG. 6 shows a driving force transmission principal of the infinite continuously variable transmission mechanism configured as four bar linkage mechanism.
Figure 7:
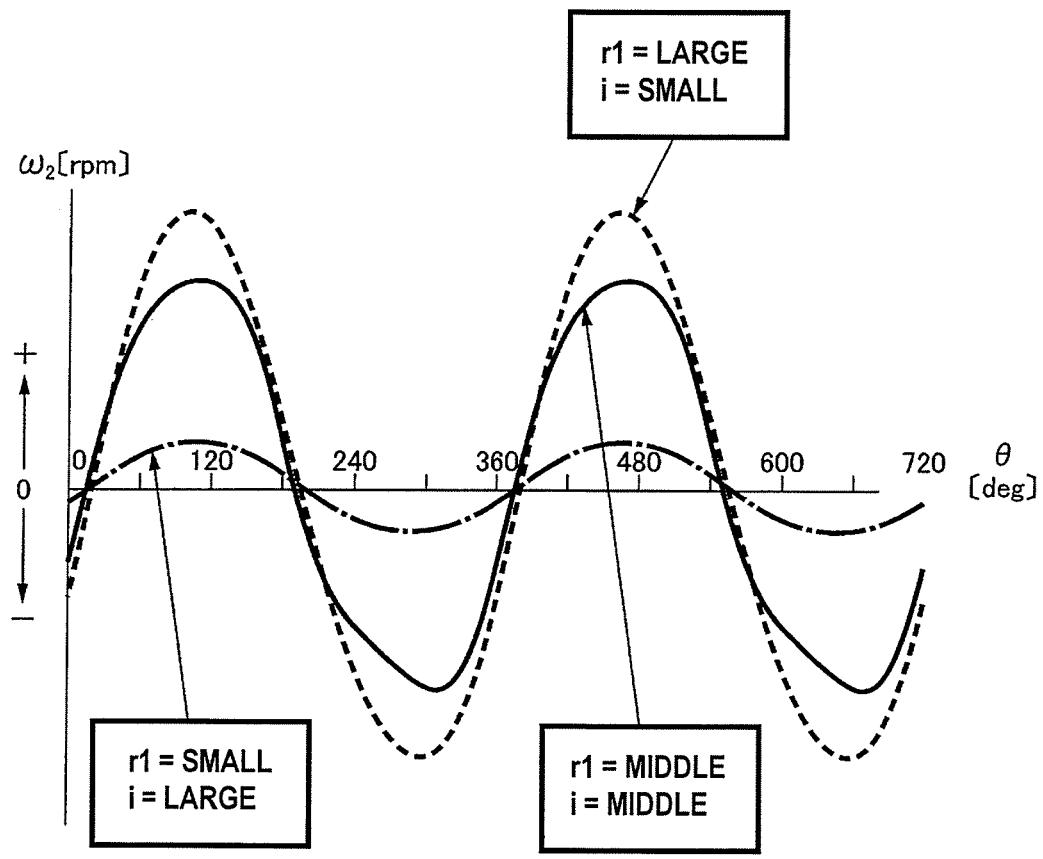
FIG. 7 shows a relationship between a rotation angle θ of an input shaft and a rotation angle ω2 of an input member of a one-way clutch when changing an eccentricity r1 (a transmission ratio i) of an eccentric disk, which rotates with an input shaft at a constant velocity, to "large", "middle", and "small" the infinite continuously variable transmission mechanism.
Figure 8:
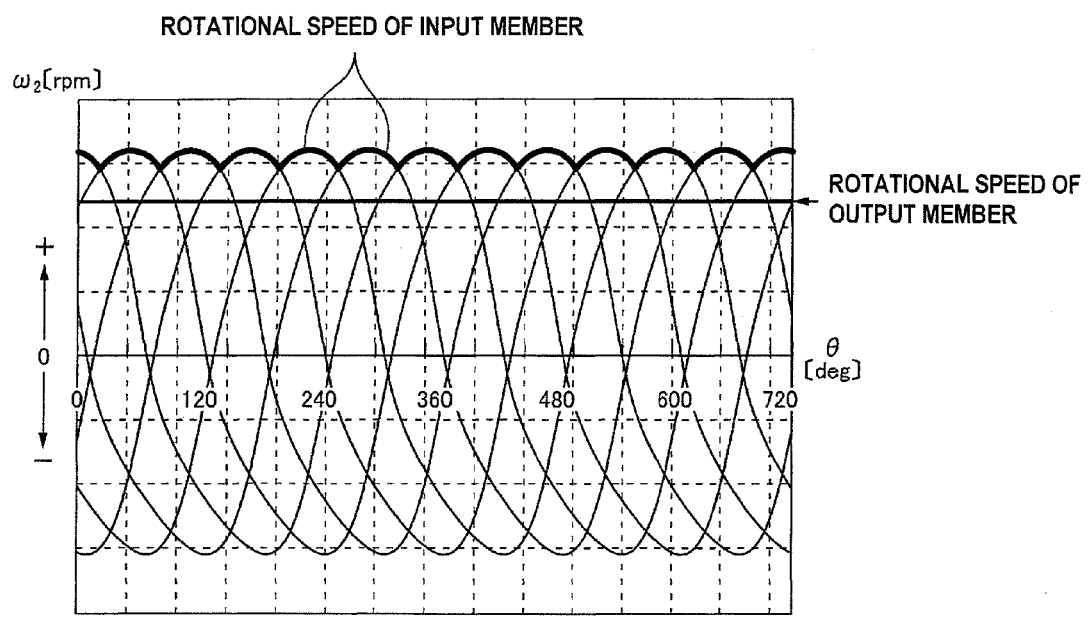
FIG. 8 shows an extraction principal of the output when power is transmitted from an input side (an input shaft or an eccentric disk) to an output side (an output member of a one-way clutch) by plural connection members in the infinite continuously variable transmission mechanism.

FIG. 6 shows a driving force transmission principal of the infinite continuously variable transmission mechanism BD (BD1 and BD2) configured as four bar linkage mechanism. FIG. 7 shows a relationship between a rotation angle (θ) of an input shaft 101 and a rotation angle ω2 of the input member 122 of the one-way clutch 120 when changing the eccentricity r1 (a transmission ratio i) of the eccentric disk 104, which rotates with the input shaft 101 at a constant velocity, to "large", "middle", and "small", in the infinite continuously variable transmission mechanism BD (BD1 and BD2). FIG. 8 shows an extraction principal of the output when power is transmitted from the input side (the input shaft 101 or the eccentric disk 104) to the output side (the output member 121 of the one-way clutch 120) by plural connection members 130 in the infinite continuously variable transmission mechanism BD (BD1 and BD2).

As shown in FIG. 6, the input member 122 of the one-way clutch 120 performs the oscillation movement by the power to be given from the eccentric disk 104 via the connection member 130. When the input shaft 101 rotating the eccentric disk 104 rotates once, the input member 122 of the one-way clutch 120 reciprocally oscillates once. As shown in FIG. 7, the oscillation period of the input member 122 of the one-way clutch 120 is always constant regardless of the value of the eccentricity r1 of the eccentric disk 104. The angular speed ω2 of the input member 122 is determined by the rotational angular speed ω1 and the eccentricity r1 of the eccentric disk 104 (the input shaft 101).

One end (the ring portion 131) of the connection members 130 connecting the input shaft 101 and the one-way clutch 120 is rotatably connected to the eccentric disk 104 provided around the input center axis O1 in the circumferential direction at equal distances. Thus, as shown in FIG. 8, the oscillation movement generated in the input member 122 of the one-way clutch 120 by the rotation movement of the eccentric disk 104 is sequentially generated in a certain phase.

At that time, the transfer of the power (torque) from the input member 122 to the output member 121 of the one-way clutch 120 is performed only by the condition in which the rotational speed of the positive direction (an arrow RD1 direction in FIG. 3) of the input member 122 exceeds the rotational speed of the positive direction of the output member 121. That is, in the one-way clutch 120, when the rotational speed of the input member 122 is higher than the rotational speed of the output member 121, an engagement (lock) is initially generated via the roller 123, and the power of the input member 122 is transmitted to the output member 121 by the connection member 130, whereby the driving force is generated.

After the driving due to the one connection member 130 is finished, the rotational speed of the input member 122 is lowered further than the rotational speed of the output member 121, and the locking due to the roller 123 is released by the driving force of the other connection member 130, thereby returning to the free state (the operation state). This is sequentially performed by a number of the connection members 130, the oscillation movement is converted to the rotational movement of the one direction. For that reason, only the power of the input member 122 of the timing exceeding the rotational speed of the output member 121 is sequentially transmitted to the output member 121, and the substantially and smoothly regular rotational power is given to the output member 121.

In the infinite continuously variable transmission mechanism BD (BD1 and BD2) of the four bar linkage mechanism type, by changing the eccentricity r1 of the eccentric disk 104, the transmission ratio (ratio=the driving target member rotates by one rotation of the crank shaft of the engine) can be determined. In this case, by setting the eccentricity r1 to zero, the transmission ratio i can be set to infinity, whereby the oscillation angle θ2 to be transferred to the input member 122 can be set to zero without being restricted even during rotation of the engine.

Main Operation of Controller

Next, a control content executed in the driving system 1 will be described.

As shown in FIG. 1, the controller 5 controls various running patterns (also referred to as operation patterns) by sending the control signal to the first and second engines ENG1, ENG2, the main motor/generator MG1, the sub motor/generator MG2, the actuator 180 of the infinite continuously variable transmission mechanisms BD1 and BD2 constituting the first and second transmissions TM1 and TM2, clutch mechanisms CL1 and CL2, the synchronization mechanism 20 or the like to control the elements. Hereinafter, contents of a typical control will be described.

The controller 5 has a function of selecting and executing an EV running control mode that controls the EV running only by the driving force of the main motor/generator MG1, an engine running control mode that controls the engine running only by the driving force of the first engine ENG1 and/or the second engine ENG2, and a series running control mode that drives the sub motor/generator MG2 as a generator by the first engine ENG1, and controls the series running performing the mode running by the driving force of the main motor/generator MG1, while supplying the created electric power to the main motor/generator MG1 and/or the battery 8. The controller 5 also has a function of executing a series running mode running by the use of both the driving force of the main motor/generator MG1 and the driving force of the first engine ENG1. The EV running, the series running, and the engine running are selected and executed depending on the residual capacity (SOC) of the required driving force and the battery 8.

Herein, the series running is executed between the EV running and the engine running when switching over the running mode from the EV running to the engine running. During series running, by controlling the rotation number of the first engine ENG1 and/or the transmission ratio of the first transmission TM1, the control is performed so that the rotational speed to be input into the input member 122 of the first one-way clutch OWC1 is lower than the rotational speed of the output member 121.

When switching over the running mode from the series running to the engine running, by controlling the rotation number of the first engine ENG1 and the transmission ratio of the first transmission TM1, the rotational speed to be input to the input member 122 of the first one-way clutch OWC1 is changed to the value exceeding the rotational speed of the output member 121, whereby the running mode is shifted from the series running to the engine running.

When the first engine ENG1 is started during EV running, in the state where the transmission ratio of the first transmission TM1 is set so that the input rotation number of the first one-way clutch OWC1 exceeds the output rotation number (in the state of mainly setting the transmission ratio to infinity so as to make the rotation load to a minimum), the first engine ENG1 is started using the driving force of the sub motor/generator MG2. After switching over the running mode from the series running to the engine running, the electricity generation by the sub motor/generator MG2 is stopped. However, after switching over the running mode from the series running mode to the engine running mode, when the residual capacity (SOC) of the battery 8 is equal to or less than a first predetermined value (a standard value: for example, standard SOCt=35%), the charge (the charging operation of the battery 8 by the electricity generation) by the sub motor/generator MG2 is maintained.

Next, when performing the starting of the second engine ENG2, for example, as one method, the transmission ratio of the second transmission TM2 is controlled to be transmitted to a limited value (a value closer to an objective value as much as possible) so that the power from the second engine ENG2 can be transmitted to the second one-way clutch OWC2 (i≠∞), and the rotational speed of the input member 122 of the second one-way clutch OWC2 is lower than the rotational speed of the output member 121. Otherwise, as another method, when starting the second engine ENG2, the control is performed so that the transmission ratio of the second transmission TM2 is set to infinity (∞) and the rotational speed of the input member 122 of the second one-way clutch OWC2 is lower than the rotational speed of the output member 121. After starting the second engine ENG2, by changing the transmission ratio of the second transmission TM2 to the limited value (the objective value), the rotational speed to be input to the second one-way clutch OWC2 is controlled.

Herein, in the state of running by the use of the driving force of the first engine ENG1 or the main motor/generator MG1, when starting the second engine ENG2 by the use of the power of the driving target member 11, by causing the synchronization mechanism 20 provided between the output shaft S2 of the second engine ENG2 and the driving target member 11 to enter the driving force transmittable connection state, the cranking (the start rotation) of the second engine ENG2 is performed by the use of the power of the driving target member 11, and the second engine ENG2 is started.

When the second engine ENG2 is started to switch over the driving source from the first engine ENG1 to the second engine ENG2, in the state where the generated power of the first engine ENG1 is input to the driving target member 11 via the first one-way clutch OWC1, the rotation number of the second engine ENG2 and/or the transmission ratio of the second transmission TM2 is changed so that the rotation number to be input to the input member 122 of the second one-way clutch OWC2 exceeds the rotation number of the output member 121. As a result, it is possible to smoothly switch over the engine used as the driving source from the first engine ENG1 to the second engine ENG2.

When both the driving forces of the first engine ENG1 and the second engine ENG2 are synthesized and are transmitted to the driving target member 11, a synchronization control is performed which controls the rotation number of the first and second engines ENG1 and ENG2 and/or the transmission ratio of the first and second transmissions TM1 and TM2 so that the rotational speeds to be input to both input members 122 of the first one-way clutch OWC1 and the second one-way clutch OWC2 are commonly synchronized to exceed the rotational speed of the output member 121.

In this case, during acceleration, both the engines ENG1 and ENG2 are not unconditionally moved but are adapted to depend on the output request by raising the output of the other engine (the second engine ENG2) in the state of fixing one engine (the first engine ENG1) in a high efficiency operation point.

Specifically, when controlling the rotation number of the first and second engines ENG1 and ENG2 and/or the transmission ratio of the first and second transmissions TM1 and TM2 so that the rotational speeds to be input to the input members 122 of the first one-way clutch OWC1 and the second one-way clutch OWC2 exceed the rotational speed of the output member 121, in the state of fixing the operation condition in a certain scope so that the rotation number and/or the torque of the first engine ENG1 enters the high efficiency operation region, the first engine ENG1 and/or the first transmission TM1 is controlled, and controlling the second engine ENG2 and the second transmission TM2 copes with the output request exceeding the output to be obtained by the fixed operation condition.

As a control method different from the above method, depending on the request output, the second engine ENG2 of a large displacement may be set in the fixing side of the operation condition, for example, when the request output is equal to or greater than a predetermined value, the first engine ENG1 is set to the fixing side of the operation condition, and when the request output is equal to or less than a predetermined value, the second engine ENG2 may be set in the fixing side of the operation condition.

During the backward movement of a vehicle, the clutch mechanisms CL1 and CL2 enter the disconnection state, whereby the state of not being able to make the backward movement through the locking of the first and second transmissions TM1 and TM2 is released. Meanwhile, during climbing departure, at least one of the clutch mechanisms CL1 and CL2 enters the connection state.

Operation Pattern

Next, an operation pattern of executing the driving system of the embodiment will be described.

FIGS. 9 to 23 enlargedly show the extraction of the operation patterns A to O. FIGS. 24 to 33 show a control operation that is executed depending on each operation state or a control operation during running mode switch-over. Reference numerals of A to O of a right upper portion of the frame showing each operation pattern of FIGS. 24 to 33 correspond to the reference numerals of the operation patterns A to O extracted and shown in FIGS. 9 to 23. In the drawings showing the operation patterns, the driving source during operation is distinguished and shown by the shading, and the transmission path of the power or the flow of the electric power are shown by arrows of solid lines, dashed lines or the like.

Figure 9:
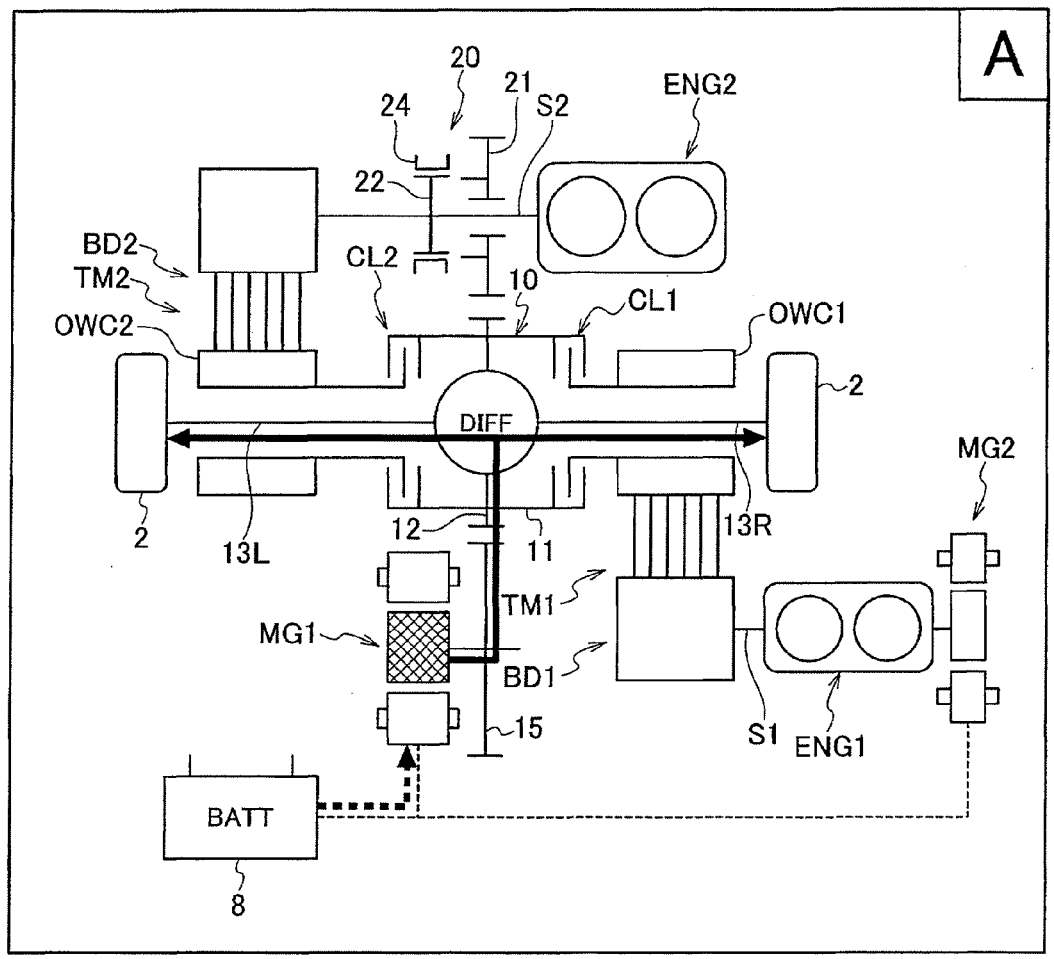
FIG. 9 shows an operation pattern A in the driving system.

In the operation pattern A shown in FIG. 9, the EV running is performed by the driving force of the main motor/generator MG1. That is, the main motor/generator MG1 is driven by conducting the electricity from the battery 8 to the main motor/generator MG1, the driving force of the main motor/generator MG1 is transmitted to the driving target member 11 via the drive gear 15 and the driven gear 12, and is transmitted to the driving wheel 2 via the differential device 10 and the left and right accelerator shafts 13L and 13R to perform the running. At this time, the clutch mechanisms CL1 and CL2 are in the disconnection state (OFF state).

Figure 10:
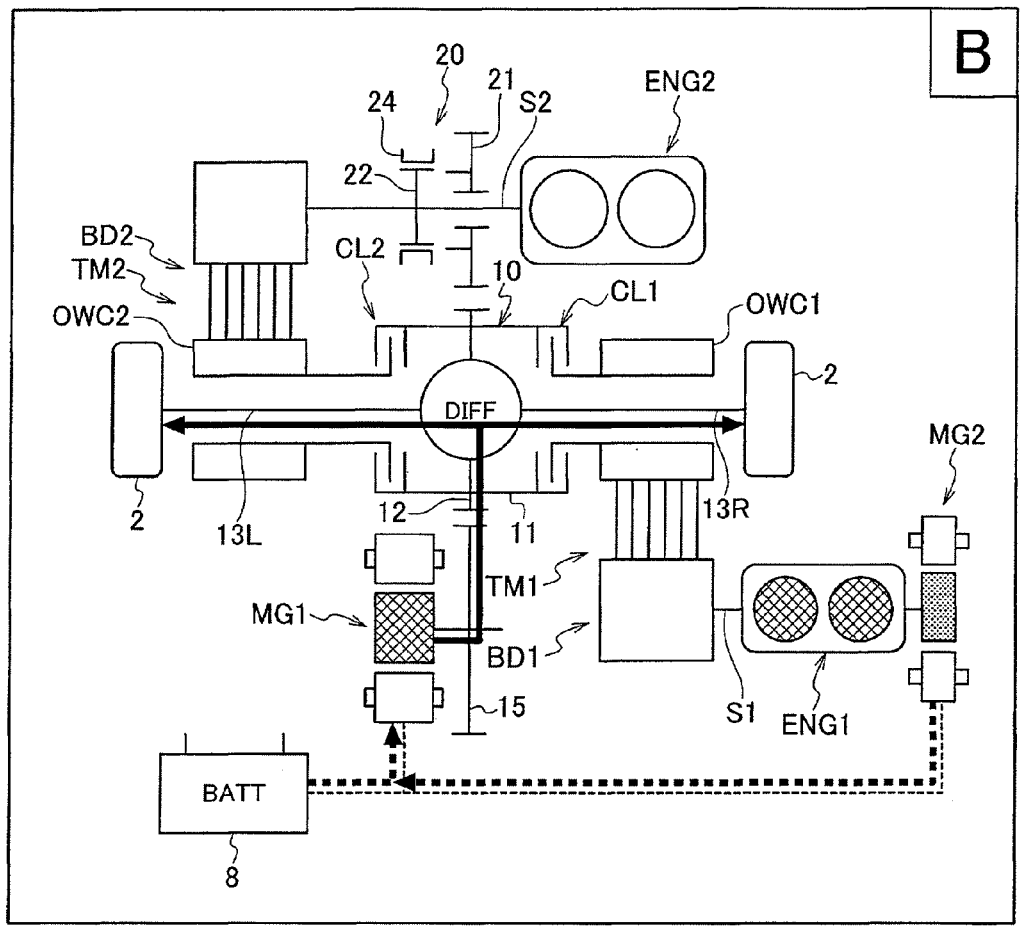
FIG. 10 shows an operation pattern B in the driving system.

In the operation pattern B shown in FIG. 10, the sub motor/generator MG generates the electricity using the driving force of the first engine ENG1, the generated electric power is supplied to the main motor/generator MG1 and the battery 8, thereby performing the series running. The starting of the first engine ENG1 is performed by the sub motor/generator MG2. At this time, the transmission ratio of the first transmission TM1 is set in infinity.

Figure 11:
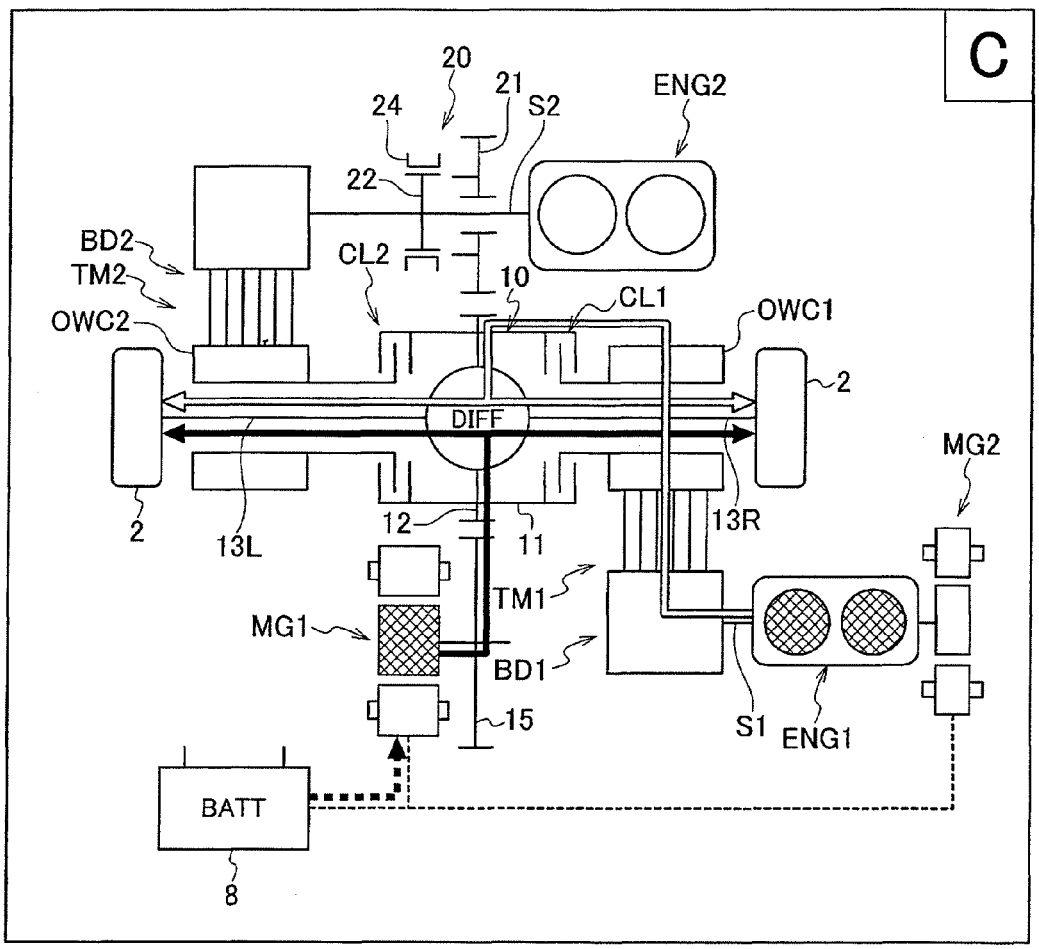
FIG. 11 shows an operation pattern C in the driving system.

In the operation pattern C shown in FIG. 11, the parallel running is performed by the use of the driving forces of both the main motor/generator MG1 and the first engine ENG1. In transmitting the driving force of the first engine ENG1 to the driving target member 11, the rotation number of the first engine ENG1 and/or the transmission ratio of the first transmission TM1 is controlled so that the input rotation number of the first one-way clutch OWC1 exceeds the output rotation number. As a result, the synthetic force of the driving force of the main motor/generator MG1 and the driving force of the first engine ENG1 can be transmitted to the driving target member 11. The operation pattern C is executed when the request driving force during acceleration or the like is great in the low speed running or the middle speed running. At this time, the clutch mechanism CL1 is maintained in the connection state, and the clutch mechanism CL2 is maintained in the disconnection state. As a result, the driving force of the first engine ENG1 is transmitted to the driving target member 11, and the dragging of the second one-way clutch OWC2 is prevented.

Figure 12:
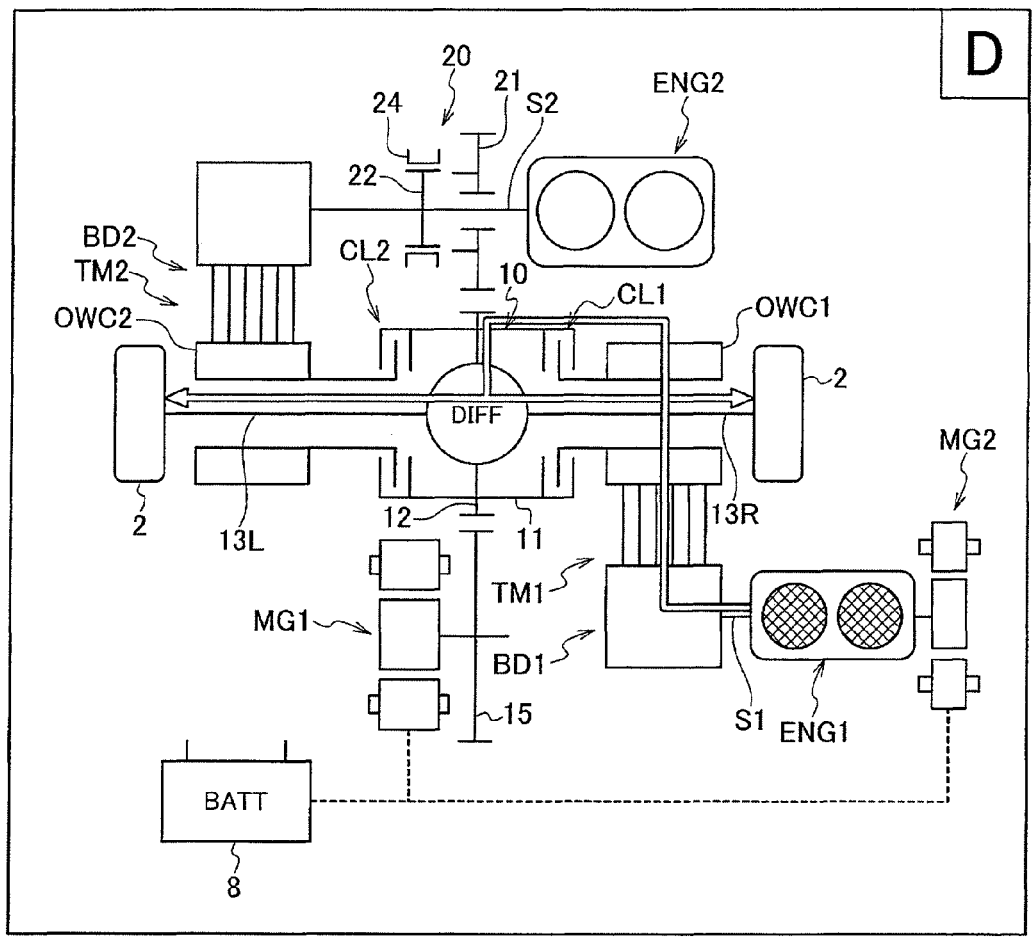
FIG. 12 shows an operation pattern D in the driving system.

The operation pattern D shown in FIG. 12 is a departure pattern when SOC is low, in the state of performing the engine running by the use of the driving force of the first engine ENG1.

Figure 13:
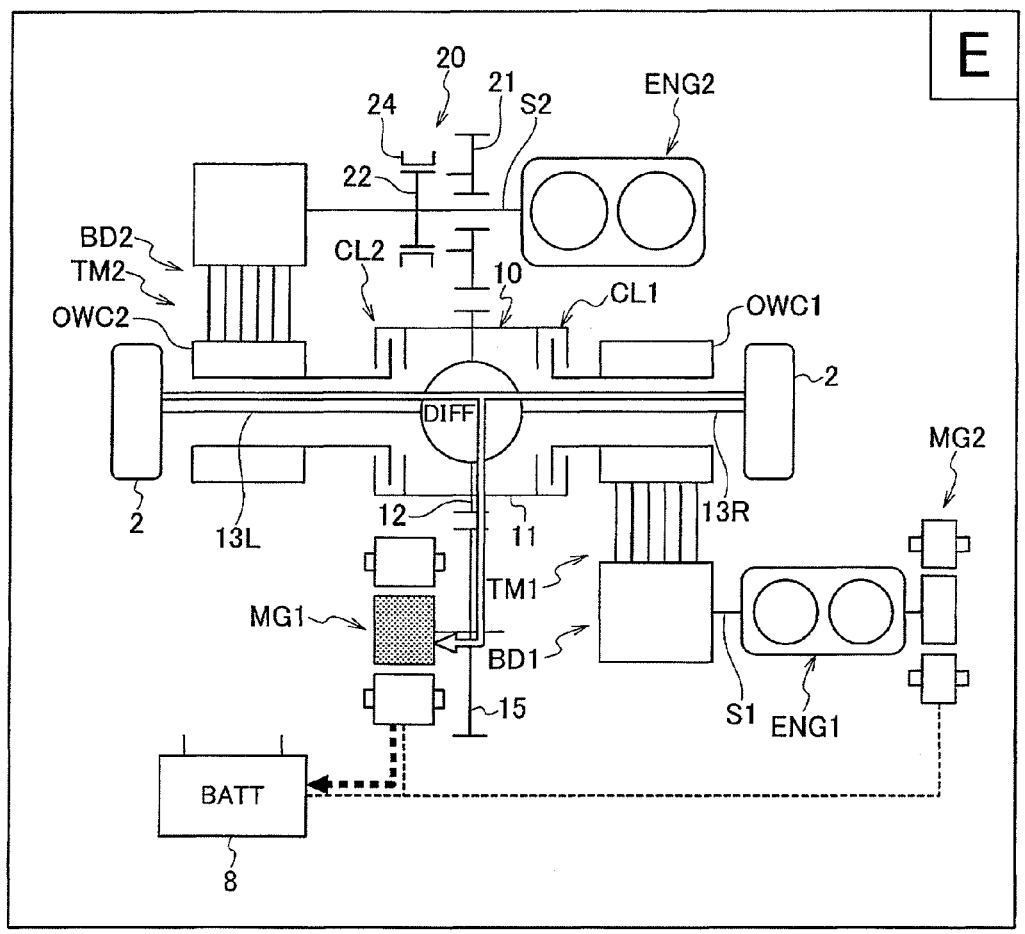
FIG. 13 shows an operation pattern E in the driving system.

In the operation pattern E shown in FIG. 13, by the regeneration operation of the main motor/generator MG1 that uses the power to be transmitted from the driving wheel 2 via the driving target member 11 during deceleration, the main motor/generator MG1 is acted as the generator, the mechanical energy to be input from the driving wheel 2 via the driving target member 11 is changed to the electric energy. The regeneration braking force is transmitted to the driving wheel 2, and the regeneration electric power is charged to the battery 8. At this time, the clutch mechanisms CL1 and CL2 are disconnected.

Figure 14:
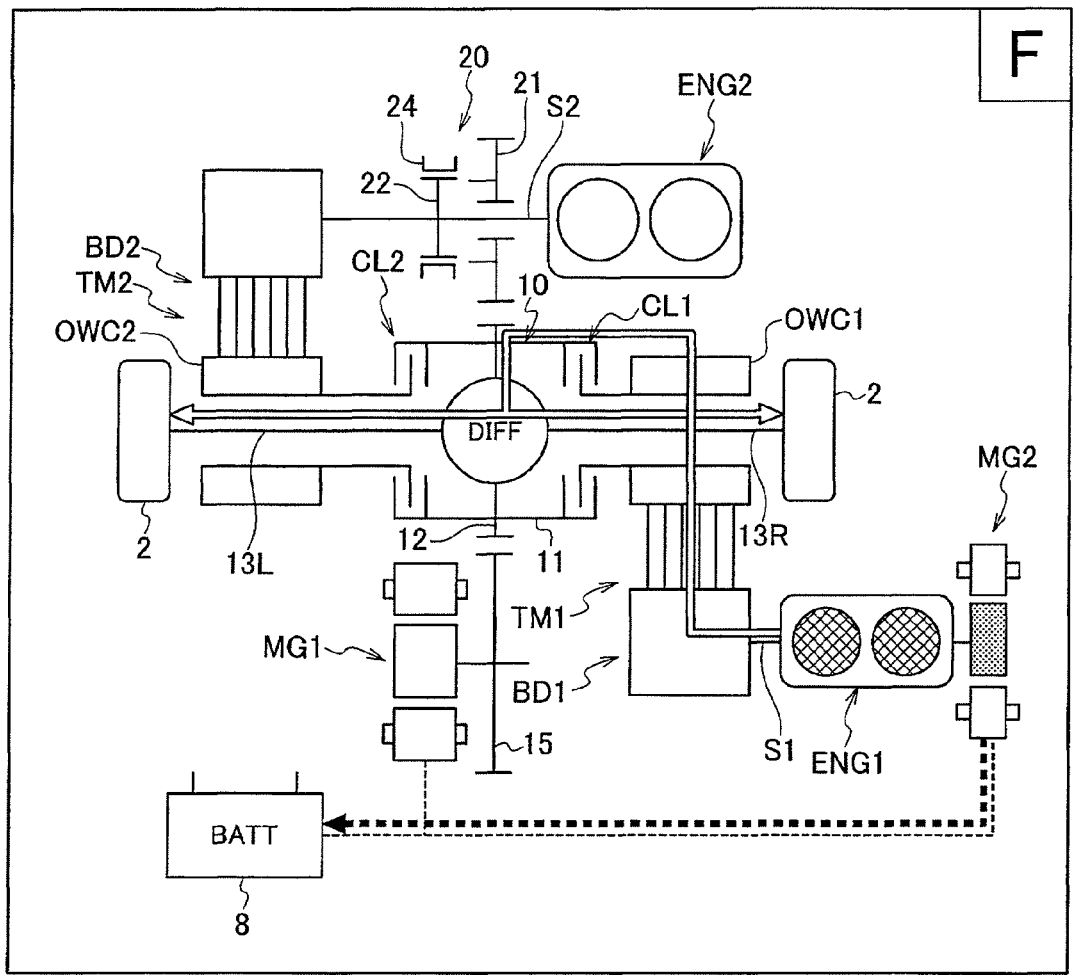
FIG. 14 shows an operation pattern F in the driving system.

In the operation pattern F shown in FIG. 14, the engine running is performed using only the driving force of the first engine ENG1, simultaneously, the sub motor/generator MG2 generates the electricity using the driving force of the first engine ENG1, and the created electric power is charged to the battery 8. The electricity generation of the sub motor/generator MG2 may be stopped depending on SOC.

Figure 15:
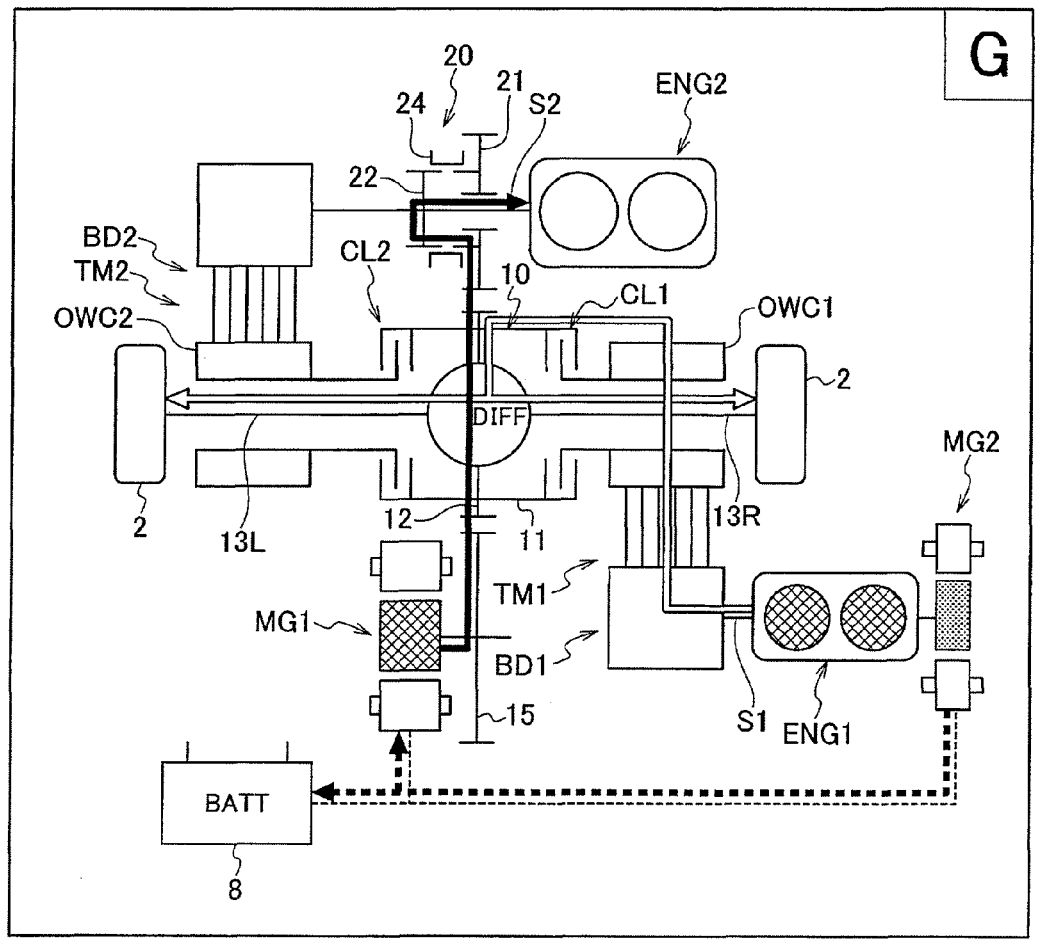
FIG. 15 shows an operation pattern G in the driving system.

In the operation pattern G shown in FIG. 15, the second engine ENG2 is started by the power introduced into the driving target member 11 (differential case) via the synchronization mechanism (starter clutch) 20 while running by the driving force of the first engine ENG1, and the insufficiency of the output to the driving wheel 2 due to the increase in load during starting is compensated by the driving force of the main motor/generator MG1. The sub motor/generator MG2 generates the electricity using the driving force of the first engine ENG1, and the created electric power is supplied to the main motor/generator MG1 or charged to the battery 8.

Figure 16:
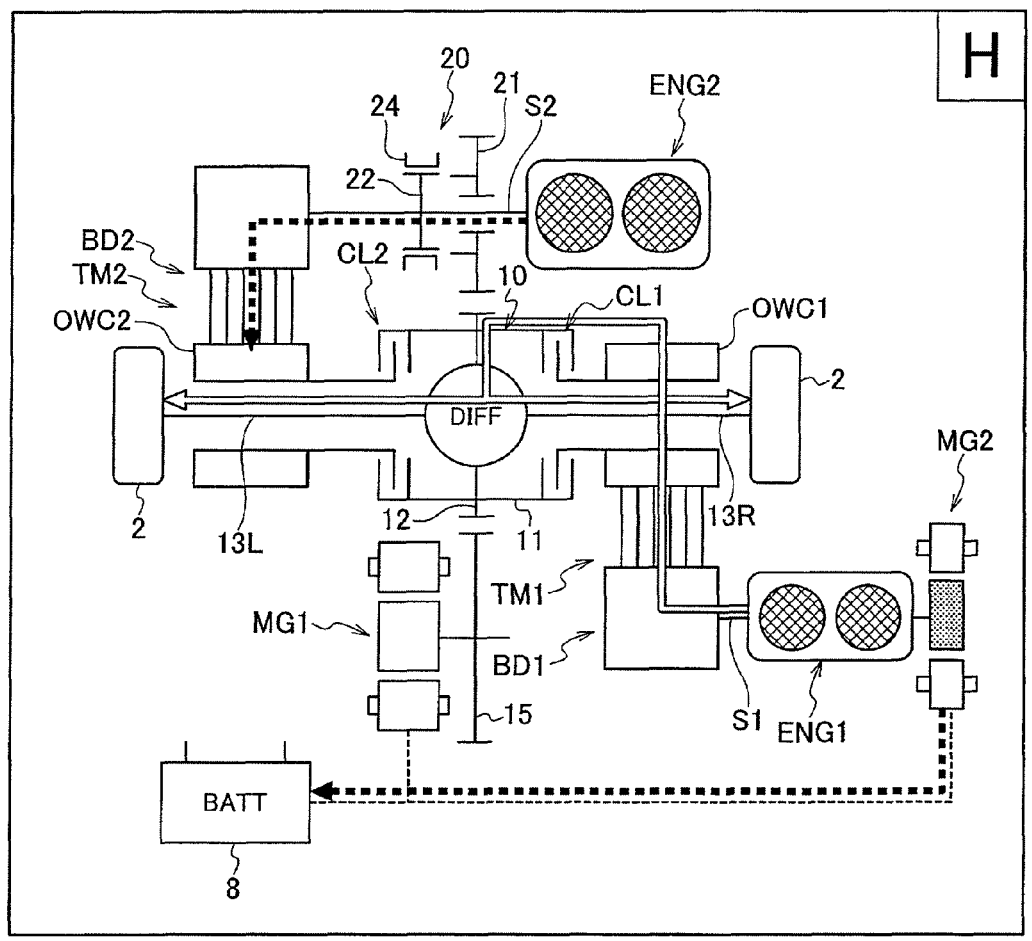
FIG. 16 shows an operation pattern H in the driving system.

In the operation pattern H shown in FIG. 16, the engine running is performed using the driving force of the first engine ENG1, and by disconnecting (or releasing the engagement state) the connected synchronization mechanism 20 in the operation pattern G, the driving target member 11 (differential case) and the output shaft S2 of the second engine ENG2 enter the separated state. In this state, the power of the second engine ENG2 after the starting is input to the second transmission TM2. However, in the step, the input rotation number of the second one-way clutch OWC2 does not exceed the output rotation number, and thus, the output of the second transmission TM2 is not input to the driving target member 11. The sub motor/generator MG2 generates the electricity using the driving force of the first engine ENG1, and charges the created electric power to the battery 8.

Figure 17:
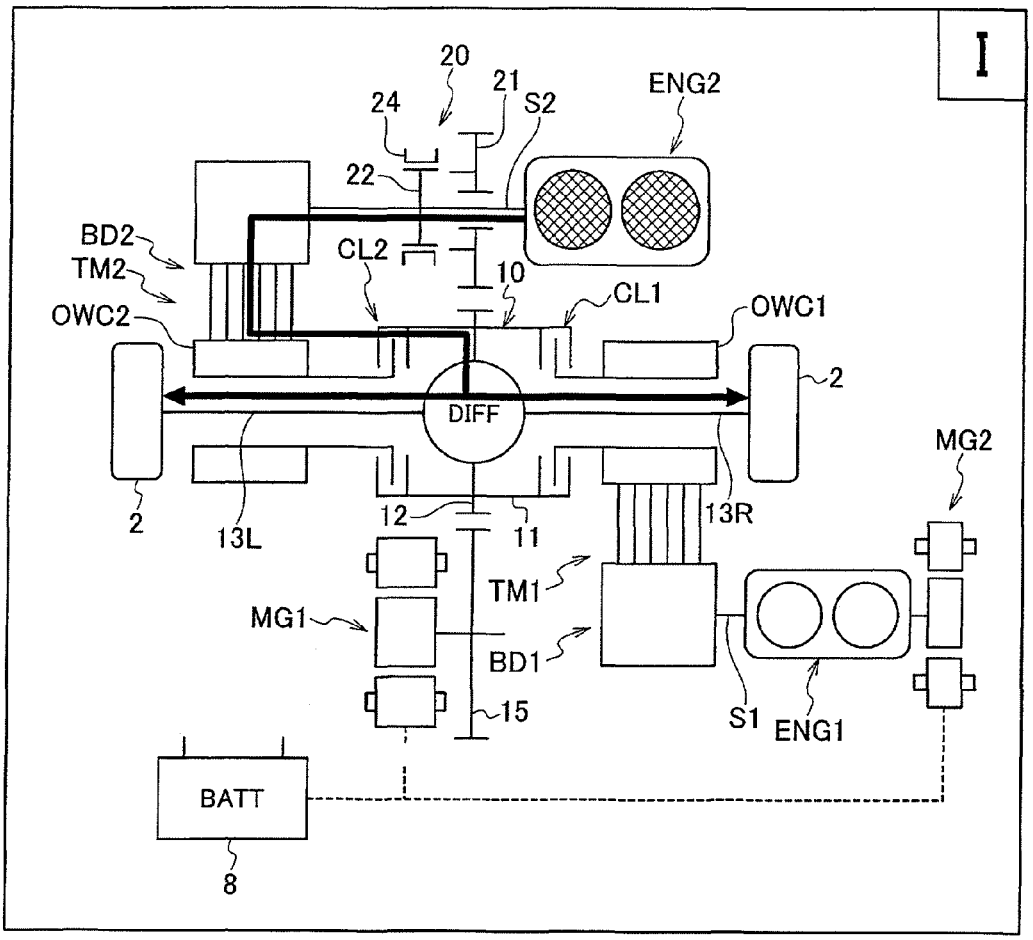
FIG. 17 shows an operation pattern I in the driving system.

In the operation pattern I shown in FIG. 17, the engine running due to the driving force of the second engine ENG2 is performed. The operation pattern I changes the transmission ratio of the second transmission TM2 from the state of the operation pattern H to the OD side (overdrive), performs the control so that the rotation number of the input member 122 of the second one-way clutch OWC2 exceeds the rotation number of the output member 121, whereby the power of the second engine ENG2 is transmitted to the driving target member 11 (differential case) via the second transmission TM2, thereby realizing the engine running due to the driving force of the second engine ENG2. In the operation pattern I, in the step in which the engagement by the second engine ENG2 is established (the power transmission to the driving target member 11 is established), the first engine ENG1 is stopped. At this time, the clutch mechanism CL2 is maintained in the connection state, and the clutch mechanism CL1 is maintained in the disconnection state. As a result, the driving force of the second engine ENG2 is transmitted to the driving target member 11, and the dragging of the one-way clutch OWC1 is prevented.

Figure 18:
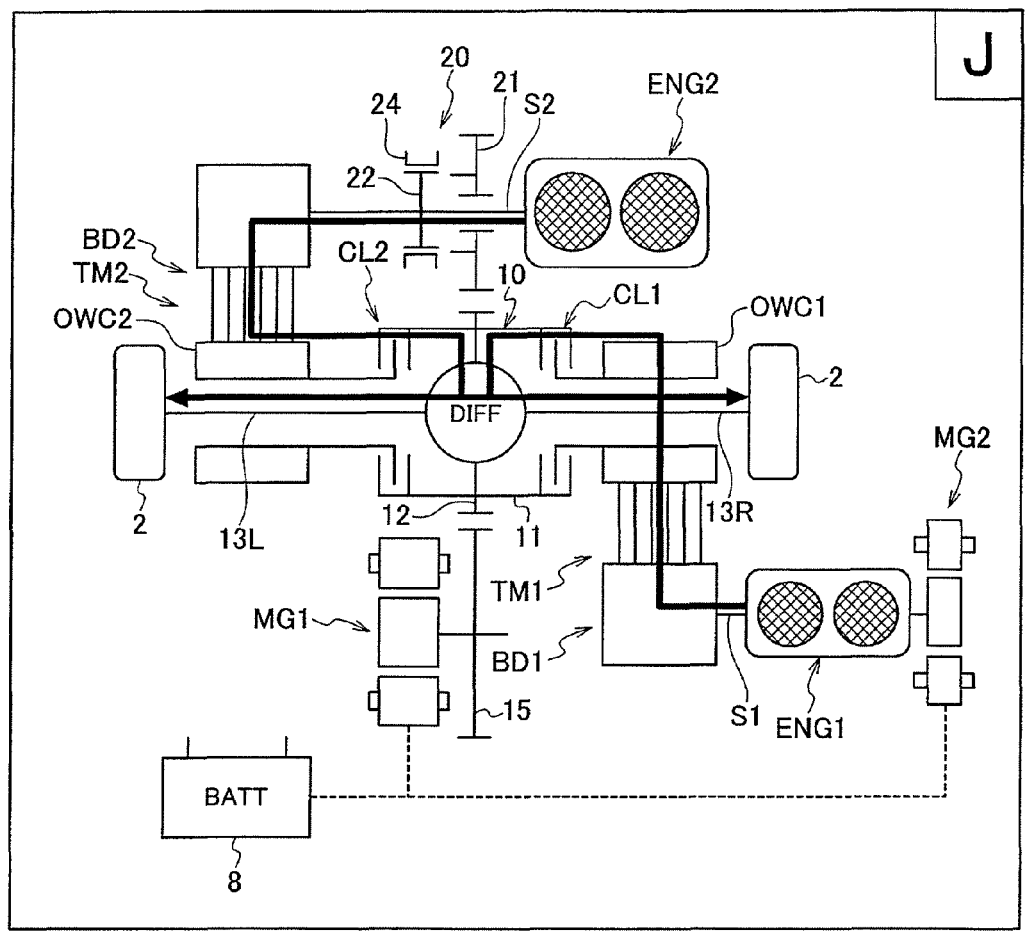
FIG. 18 shows an operation pattern J in the driving system.

The operation pattern J shown in FIG. 18 is an operation pattern when the request output is further increased in the state of performing the engine running using the driving force of the second engine ENG2. In the operation pattern J, in the running state by the second engine ENG2, the first engine ENG1 is started, the driving forces of both the first engine ENG1 and the second engine ENG2 are synthesized, and are transmitted to the driving target member 11 (the differential case). That is, the rotation number of the first and second engines ENG1 and ENG2 and/or the transmission ratios of the first and second transmissions TM1 and TM2 are controlled such that the rotation number of the input members 122 of the first and second one-way clutches OWC1 and OWC2 are synchronized to exceed the rotation number (the rotation number of the driving target member 11) of the output member 121.

Figure 19:
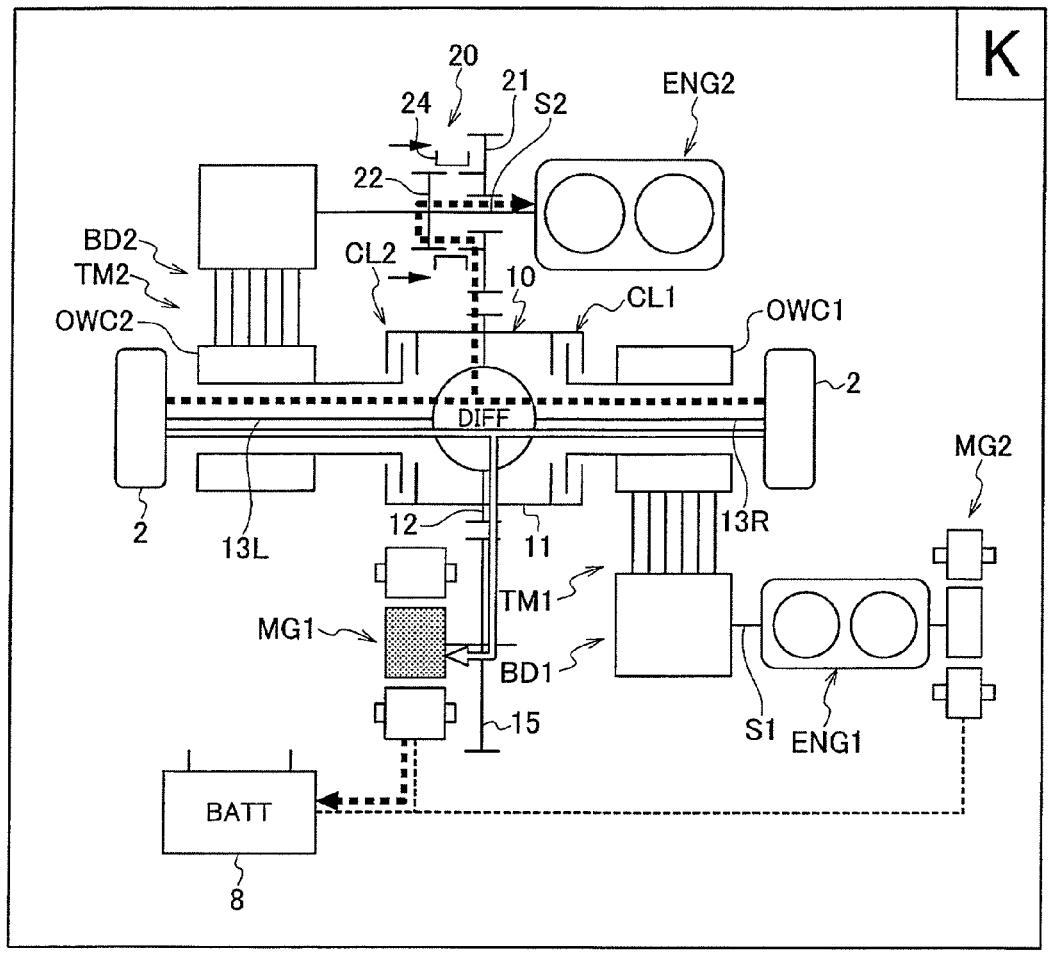
FIG. 19 shows an operation pattern K in the driving system.

The operation pattern K shown in FIG. 19 is, for example, an operation pattern when the deceleration request is generated during middle speed running. In the operation pattern K, the first engine ENG1 and the second engine ENG2 are stopped, the main motor/generator MG1 performs the electricity generation by the power to be transmitted from the driving wheel 2 via the driving target member 11 along with the deceleration, the regeneration electric power thus created is charged to the battery 8, and the regeneration power is caused to act on the driving wheel 2. Simultaneously, the synchronization mechanism 20 enters the connection state, and the engine brake of the second engine ENG2 is caused to act on the driving wheel 2 as the braking force.

Figure 20:
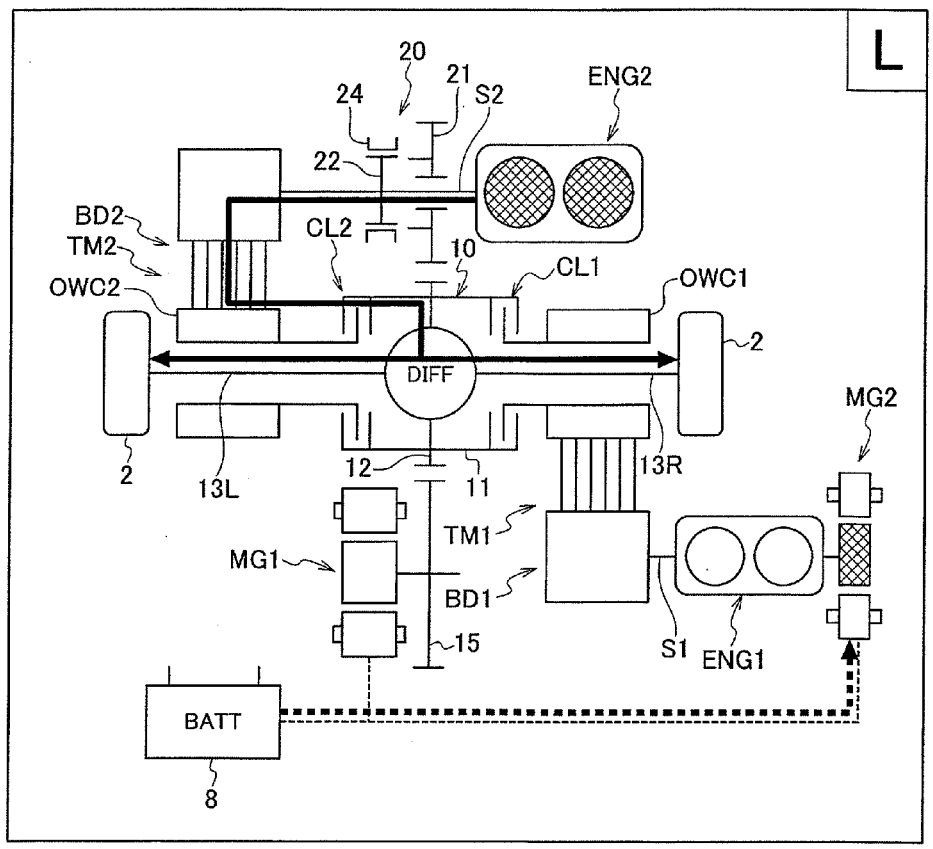
FIG. 20 shows an operation pattern L in the driving system.

The operation pattern L shown in FIG. 20 is an operation pattern during switch-over when the request output is increased in the state of running by the driving force of the second engine ENG2. In the operation pattern L, in order to start the first engine ENG1, the sub motor/generator MG2 is driven. At this time, the transmission ratio of the first transmission TM1 is set to infinity. After the first engine ENG1 is started by the operation pattern, the operation pattern J is performed in which the driving forces of both the first and second engines ENG1 and ENG2 are transmitted to the driving target member 11.

Figure 21:
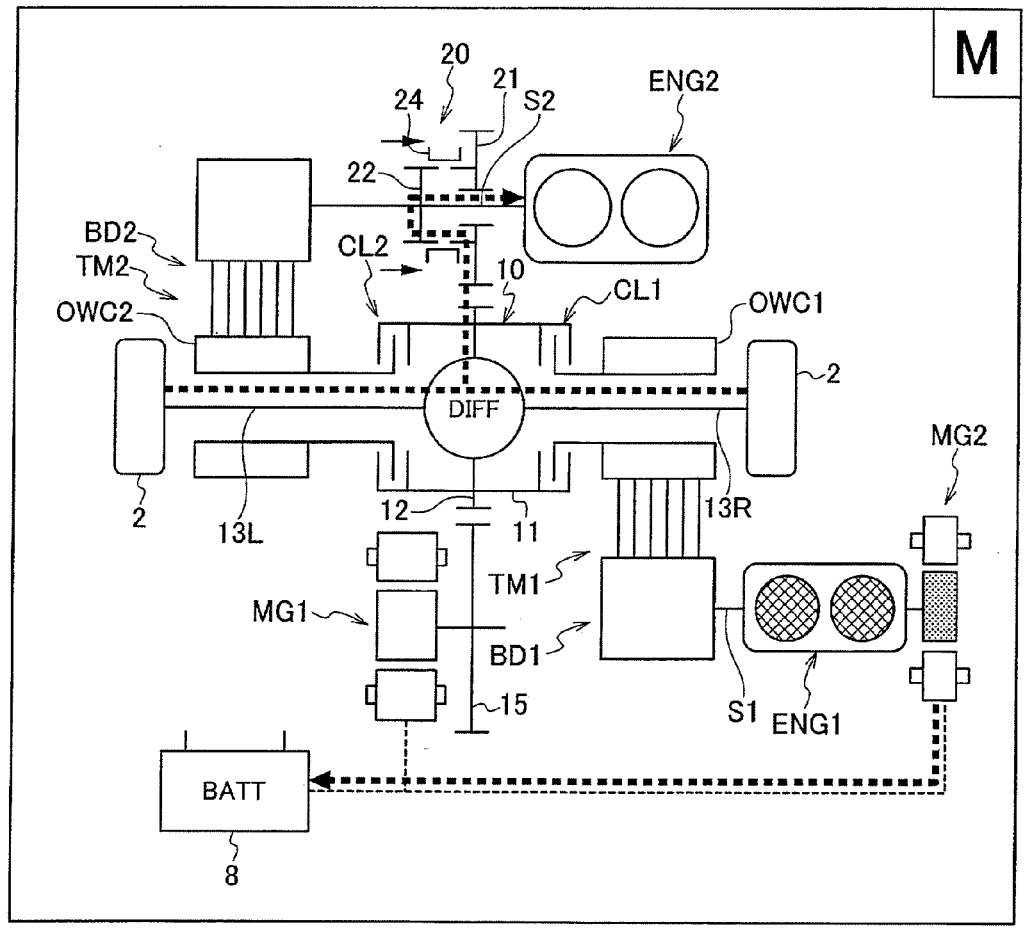
FIG. 21 shows an operation pattern M in the driving system.

In the operation pattern M shown in FIG. 21, the synchronization mechanism 20 enters the connection state and enters the state where the engine brake by the second engine ENG2 can be used, the sub motor/generator MG2 generates the electricity using the driving force of the first engine ENG1, and the crated electric power is charged to the battery 8.

Figure 22:
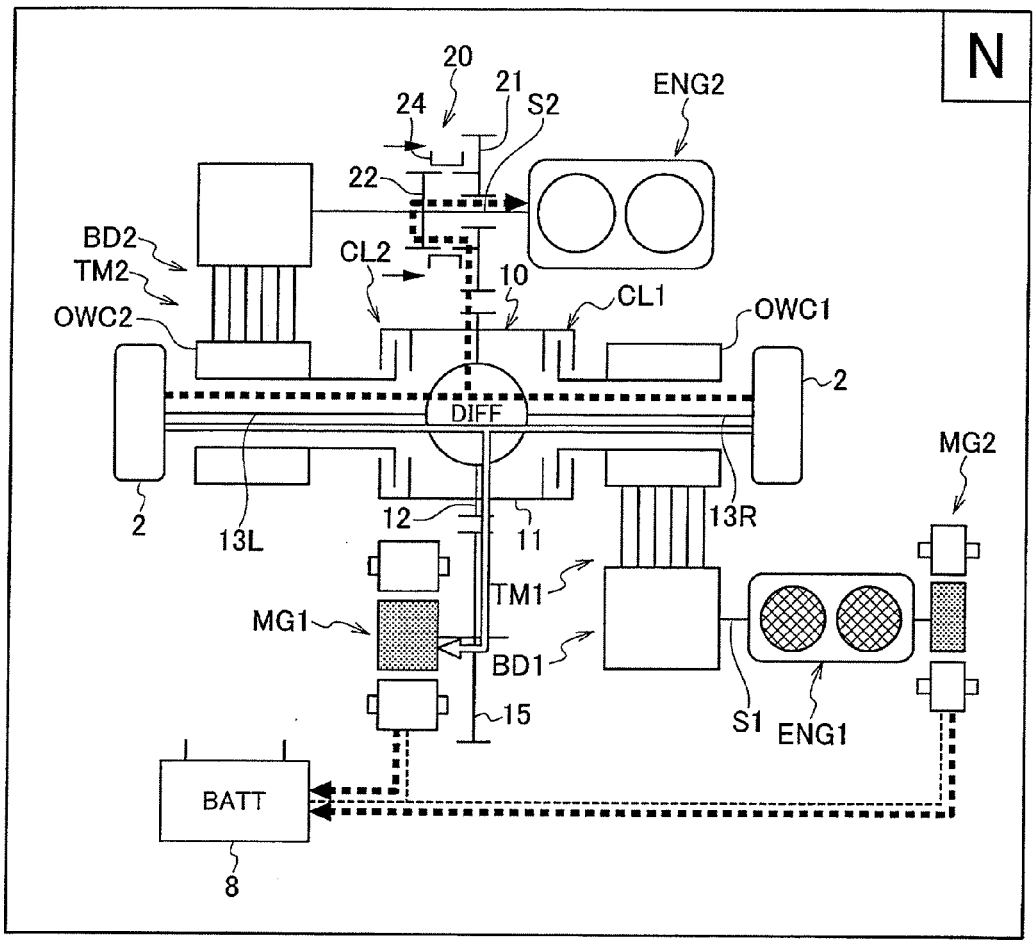
FIG. 22 shows an operation pattern N in the driving system.

In the operation pattern N shown in FIG. 22, the synchronization mechanism 20 enters the connection state and enters the state where the engine brake by the second engine ENG2 can be used, and the regeneration electric power is created in the main motor/generator MG1 and is charged to the battery 8. At the same time, the sub motor/generator MG2 generates the electricity using the driving force of the first engine ENG1, and the created electric power is charged to the battery 8. By maintaining the synchronization mechanism 20 in the connection state, the second engine ENG2 is in the state of the cranking standby.

Figure 23:
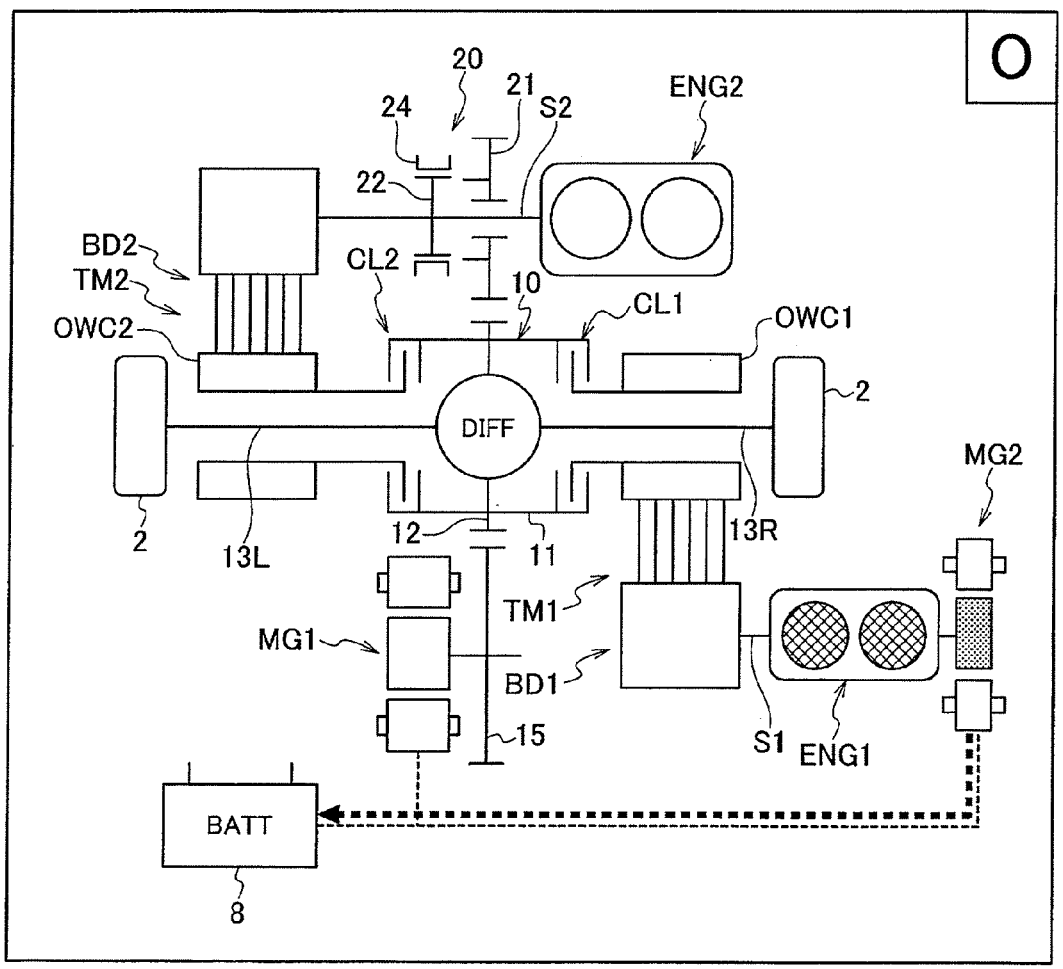
FIG. 23 shows an operation pattern O in the driving system.

The operation pattern O shown in FIG. 23 is an operation pattern during stop, and in the operation pattern O, the sub motor/generator MG2 generates the electricity using the driving force of the first engine ENG1, and the created electric power is charged to the battery 8. At this time, by setting the transmission ratios of the first and second transmissions TM1 and TM2 to infinity (∞) or disconnecting the clutches CL1 and CL2, the drag torque loss can be suppressed.

Control Operation Depending on Operation Situation

Next, control operations in various operation situations will be described using FIGS. 24 to 33. The various operation situations are shown in a table form, and in the left lower portion of each frame in the table, for convenience of the description, reference numerals corresponding to the numbers in parentheses are given. Reference numerals A to O of the right upper portion of each frame correspond to the enlarged views of FIGS. 9 to 23, and are referred to as necessary.

During Departure

Figure 24:
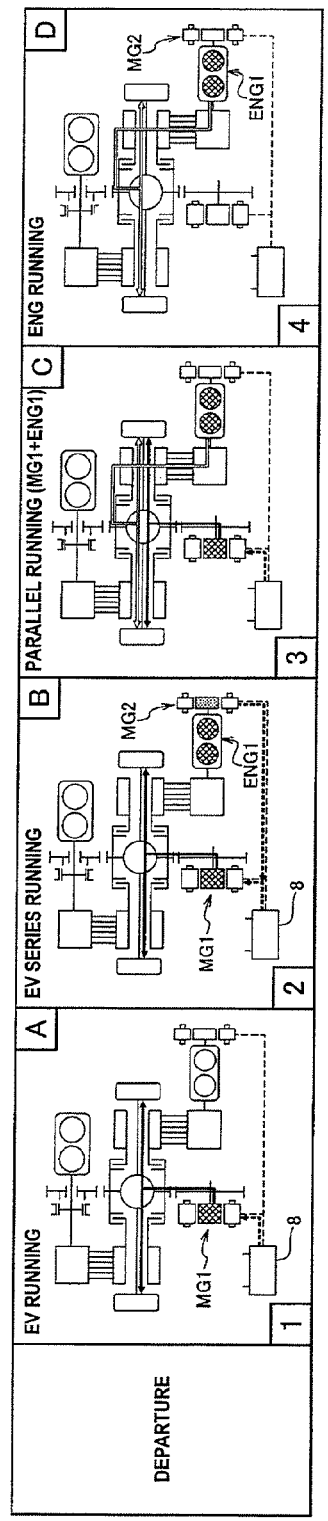
FIG. 24 shows a control operation depending on a running state to be executed in the driving system at the time of departure.

Firstly, the control operation during departure will be described with reference to FIG. 24.

(1) At the time of the gradual cruise acceleration during departure, the EV running by the basic operation pattern A is performed. In the EV running, the main motor/generator MG1 is driven by the electric power to be supplied from the battery 8, and the running is performed only by the driving force.

(2) During acceleration, the series running by the operation pattern B is performed. In the series running, firstly, the first engine ENG1 is started by the sub motor/generator MG2. When the second engine ENG2 is started, the sub motor/generator MG2 functions as the generator to generate the electricity, and the created electric power is supplied to the battery 8 and the main motor/generator MG1, whereby the electric power generated in the sub motor/generator MG2 by the power of the first engine ENG1 is effectively used while continuing the EV running. At this time, the rotation number of the first engine ENG1 and/or the transmission ratio of the first transmission TM1 are controlled so that the input rotation number of the first one-way clutch OWC1 is lower than the output rotation number.

(3) When the rotation number of the first engine ENG1 by the control is increased depending on the acceleration request, the transmission ratio of the first transmission TM1 is changed so that the input rotation number of the first one-way clutch OWC1 exceeds the output rotation number, and the parallel running is performed in which the driving forces of both the main motor/generator MG1 and the first engine ENG1 are synthesized. When SOC is low, the sub motor/generator MG2 may be used as the generator to perform the charging of the battery 8.

(4) When SOC is low, the departure is performed by the engine running by the first engine ENG1 shown in the operation pattern D. Even in this case, the sub motor/generator MG2 may be used as the generator to perform the charge of the battery 8.

In this manner, during vehicle departure, the EV running mode using the driving force of the main motor/generator MG1, the series running mode using the first engine ENG1, the sub motor/generator MG2 and the main motor/generator MG1, the parallel running mode using the driving forces of both the main motor/generator MG1 and the first engine ENG1, and the engine running mode by the first engine ENG1 are selected and executed depending on the operation situation.

During Low Speed Running (e.g., 0 to 30 km/h)

Figure 25:
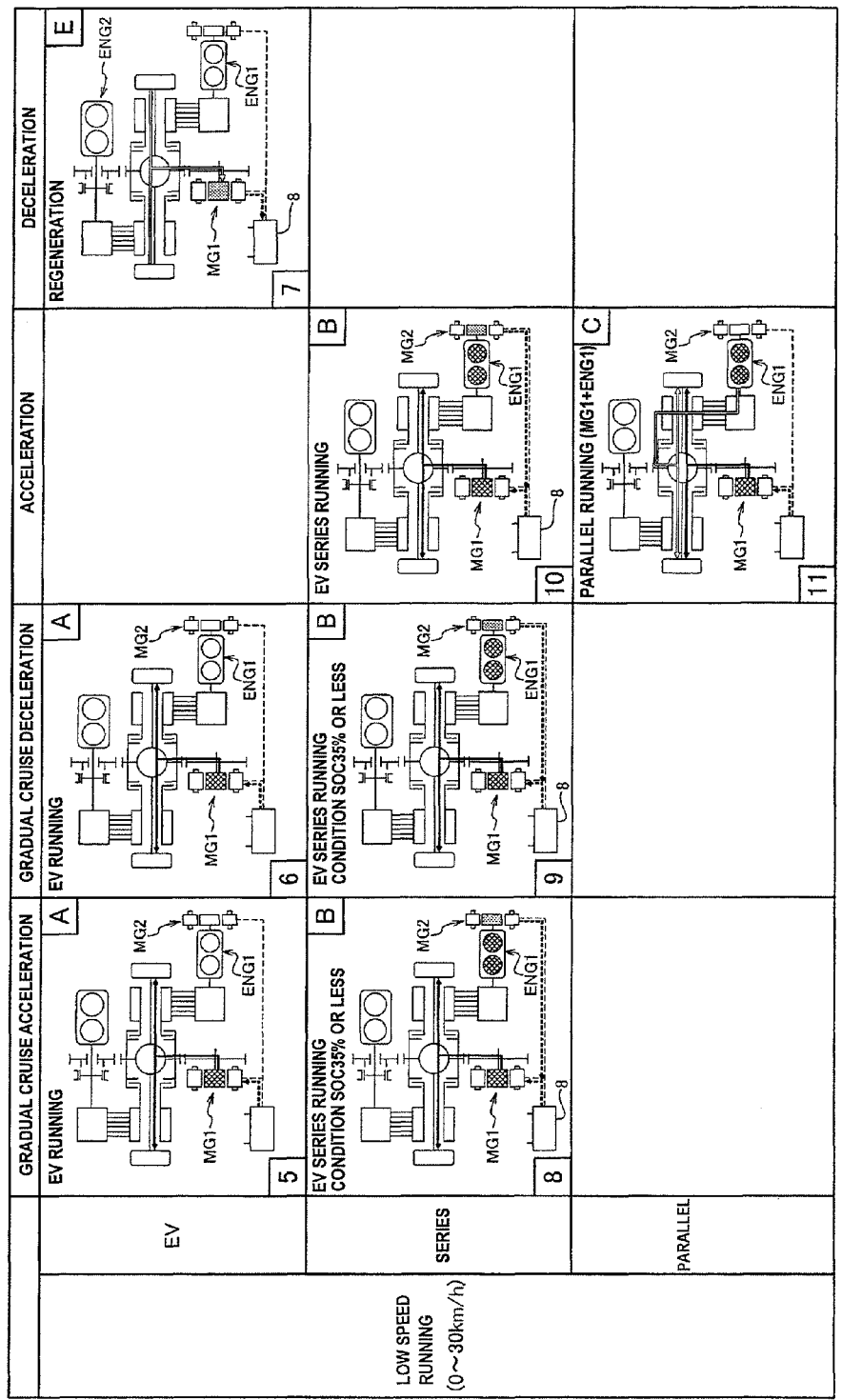
FIG. 25 shows a control operation depending on a running state to be executed in the driving system at the time of low speed running.

Next, the control operation during low speed running will be described with reference to FIG. 25.

(5), (6) During gradual cruise acceleration or during gradual cruise deceleration when, for example, the accelerator is separated, the EV running by the operation pattern A is performed.

(7) During deceleration when the brake is stepped, the regeneration operation by the operation pattern E is performed.

(8), (9) Even during gradual cruise deceleration and during gradual cruise acceleration, when the residual capacity (SOC) of the battery 8 is equal to or less than 35%, the series operation by the operation pattern B is performed.

(10) Even in the case of the acceleration, the series operation by the operation pattern B is performed.

(11) When the acceleration request is high, by the switch-over to the operation pattern C, the parallel running using the driving forces of the main motor/generator MG1 and the first engine ENG1 is performed.

Switch-Over of Driving Source from Main Motor/Generator MG1 to First Engine ENG1

Figure 26:
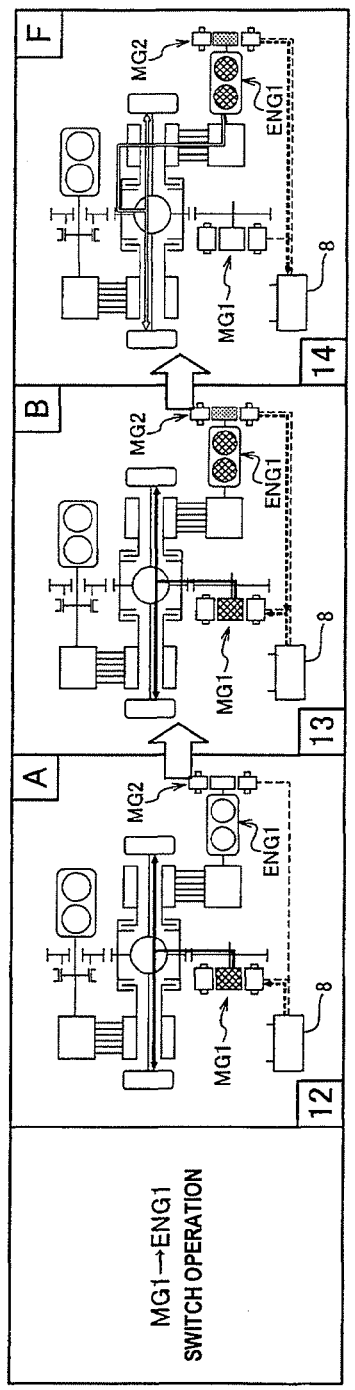
FIG. 26 shows a control operation to be executed in the driving system at the time of the switch-over (a switch operation) from an EV running to an engine running.

When the driving sources is switched over from the main motor/generator MG1 to the first engine ENG1, the operation is controlled as shown in FIG. 26.

(12), (13) Firstly, from the situation in which the EV running by the operation pattern A is performed, the first engine ENG1 is started by the sub motor/generator MG2. At that time, the transmission ratio of the first transmission TM1 is set to infinity, and the output of the first engine ENG1 does not enter the driving target member 11. After the starting, the switch-over to the operation pattern B is performed, and the series running by the electricity generation of the sub motor/generator MG2 is performed.

(14) Next, the transition to the operation pattern F is performed, the rotation number of the first one-way clutch OWC1 and/or the transmission ratio of the first transmission TM1 are controlled so that the input rotation number of the first one-way clutch OWC1 exceeds the output rotation number, and the power of the first engine ENG1 is transmitted to the driving target member 11. For example, after setting the transmission ratio to infinity to enter the charge mode once, the transmission ratio is moved to OD (over drive) side, and the transition from the EV running by the main motor/generator MG1 to the engine running by the first engine ENG1 via the series running is smoothly performed. At this time, the clutch mechanism CL1 is subjected to the connection control at a suitable time so that the delay is not generated.

When the power transmission (the switch-over of the driving source) to the driving target member 11 by the first engine ENG1 is established, the main motor/generator MG1 is stopped. However, when the battery residual capacity (SOC) is small, the electricity generation and the charging by the sub motor/generator MG2 are continue, and when the battery residual capacity (SOC) is sufficient, the sub motor/generator MG2 is stopped.

During Middle Speed Running (e.g., 20 to 70 km/h)

Figure 27:
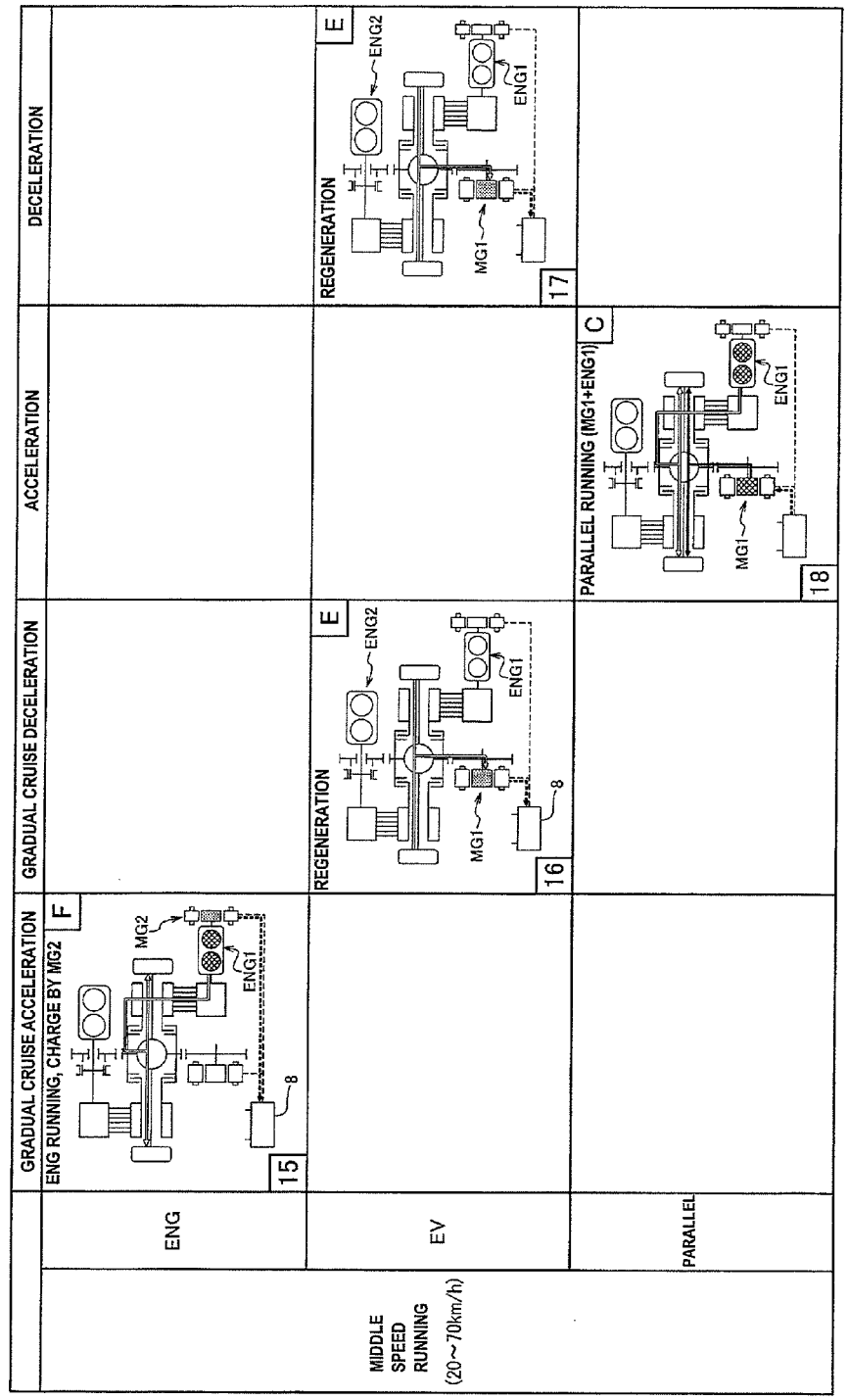
FIG. 27 shows a control operation depending on a running state to be executed in the driving system during middle speed running.

Next, the control operation during middle speed running will be described with reference to FIG. 27.

(15) During gradual cruise acceleration, by the operation pattern F, the single engine running is performed using only the driving force of the first engine ENG1. At that time, the battery 8 is charged by the electric power generated in the sub motor/generator MG2. The first engine ENG1 is operated in the high efficiency operation point, and the control of the transmission ratio of the first transmission TM1 copes with the operation situation.

(16), (17) During gradual deceleration and during deceleration, by the operation pattern E, the first engine ENG1 is stopped, the clutch mechanisms CL1 and CL2 are switched over, and the regeneration operation by the main motor/generator MG1 is performed.

(18) Meanwhile, during acceleration, the switch-over to the operation pattern C is performed, the parallel operation using the driving forces of both the first engine ENG1 and the main motor/generator MG1 is performed. At this time, basically, the engine running by the first engine ENG1 is performed, and the main motor/generator MG1 assists the acceleration request. The control operation is selected when the change in transmission ratio of the first transmission TM1 cannot cope with the acceleration request during middle speed running.

Switch-Over of Driving Source from First Engine ENG1 to Second Engine ENG2

Figure 28:
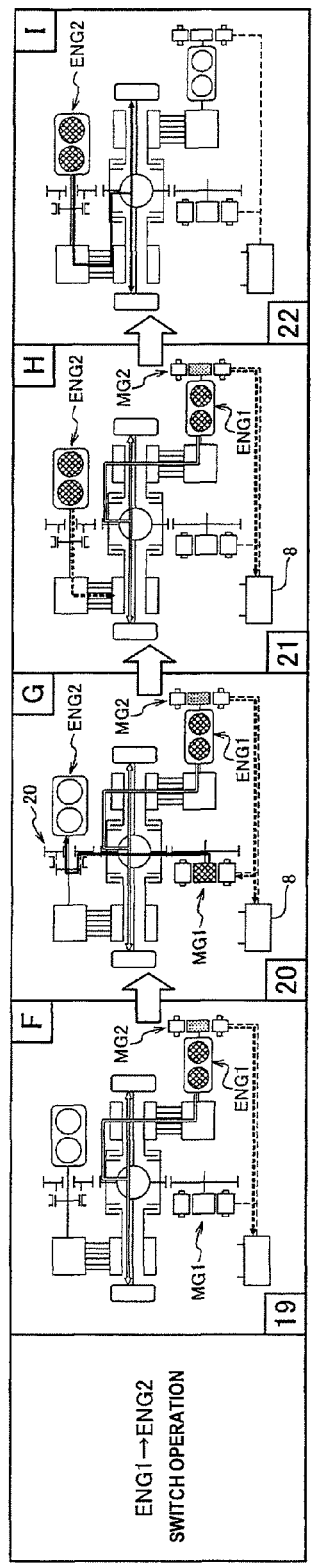
FIG. 28 shows a control operation to be executed in the driving system at the time of the switch-over (a switch operation) from an engine running mode by a first engine to an engine running mode by a second engine.

When performing the switch-over from the engine running using the driving force of the first engine ENG1 to engine running using the second engine ENG2, the operation control is performed as shown in FIG. 28.

(19), (20) Firstly, in the state where engine runs by the first engine ENG1 by the operation pattern F, the switch-over to the operation pattern G is performed, and the second engine ENG2 is started. In this case, the synchronization mechanism 20 is in the connection state, and the output shaft S2 of the second engine ENG2 is cranked by the power of the driving target member 11, whereby the second engine ENG2 is started. At that time, the rotation drop of the driving target member 11 by the starting shock is supplemented by the main motor/generator MG1. That is, the starting of the second engine ENG2 can be performed only by the driving from the first engine ENG1 introduced into the driving target member 11, but can be performed even by the use of the driving force of the main motor/generator MG1. At this time, the transmission ratio of the second transmission TM2 may be set so that the input rotation number of the one-way clutch is lower than the output rotation number, may be set to infinity, and may be set to a value slightly smaller than the objective transmission ratio. When the driving force of the first engine ENG1 is sufficient, the sub motor/generator MG2 may generate the electricity to charge the battery 8.

(21) After that, when the second engine ENG2 is started, the switch-over to the operation pattern H is performed, the synchronization mechanism 20 is in the disconnection state, and the main motor/generator MG1 is stopped. In this step, the power of the second engine ENG2 is in the state of not entering in the driving target member 11. Thus, the transmission ratio of the second transmission TM2 is gradually changed to the OD side. At this time, the sub motor/generator MG2 generates the electricity using the first engine ENG1 to charge the battery 8.

(22) The transmission ratio of the second transmission TM2 is changed to the OD side, and the input rotation number of the second one-way clutch OWC2 exceeds the output rotation number, whereby the switch-over to the operation pattern I is performed, and the driving force of the second engine ENG2 is transmitted to the driving target member 11 via the second one-way clutch OWC2.

During Middle High Speed Running (50 to 110 km/h)

Figure 29:
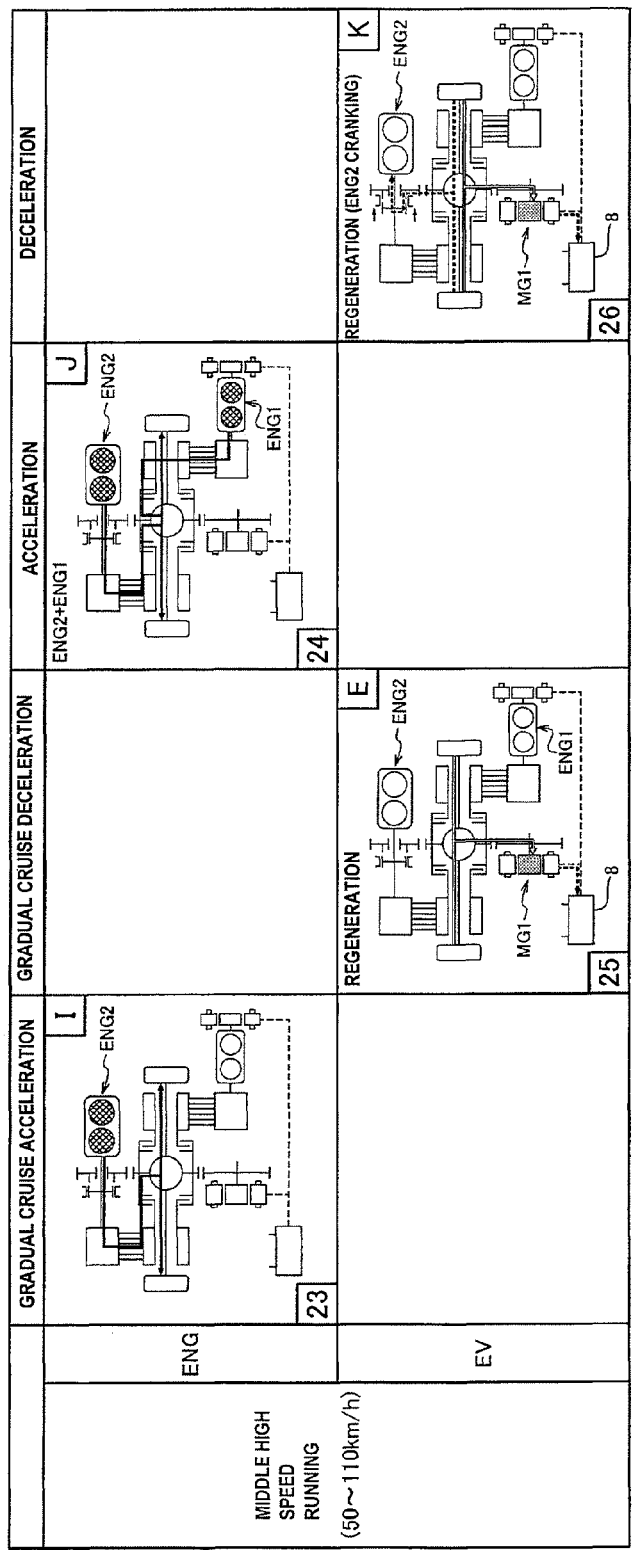
FIG. 29 shows a control operation depending on a running state to be executed in the driving system at the time of a middle high speed running.

Next, the control operation during middle high speed running will be described based on FIG. 29.

(23) During gradual cruise acceleration, by the operation pattern I, the single engine running using the driving force of the second engine ENG2 is executed.

(24) During acceleration, by the switch-over to an operation pattern J described later, the running using the driving force of both the second engine ENG2 and the first engine ENG1 is performed. When SOC is low, the sub motor/generator MG2 may be used as the generator to charge the battery 8.

(25) During gradual cruise deceleration, by the operation pattern E, the regeneration operation by the main motor/generator MG1 is performed, and both the engines ENG1 and ENG2 are stopped. When returning from (25) to (23), the synchronization mechanism 20 is in the connection state, and the second engine ENG2 is cranked.

(26) During deceleration, by the operation pattern K, the main motor/generator MG1 is subjected to the regeneration operation, and simultaneously, the synchronization mechanism 20 is in the connection state, whereby the engine brake by the second engine ENG2 is performed.

Switch-Over from Engine Running from Second Engine ENG2 to Engine Running by Second Engine ENG2 and First Engine ENG1

Figure 30:
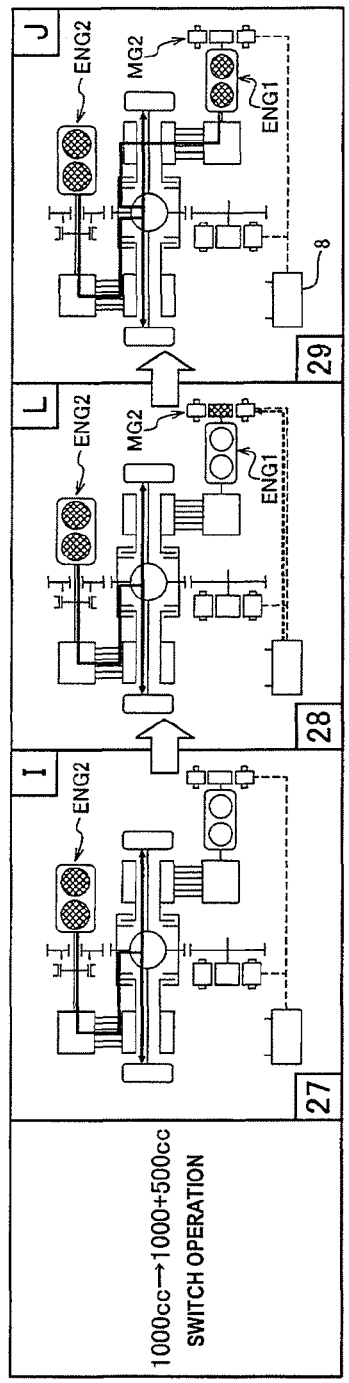
FIG. 30 shows a control operation to be executed in the driving system at the time of the switch-over (a switch operation) from an engine running mode by a second engine to a parallel engine running mode by the second engine and the first engine.

When the engine running using the driving force of the second engine ENG2 is shifted to the engine running using the both driving forces of the first engine ENG1 in addition to the second engine ENG2, the operation is controlled as shown in FIG. 30.

(27), (28) Firstly, by the operation pattern I, in the state where the single engine running is performed by the second engine ENG2, as shown in the operation pattern L, the first engine ENG1 is started using the sub motor/generator MG2.

(29) After that, a shown in the operation pattern J, the rotation number of the first and second engines ENG1 and ENG2 and/or the transmission ratios of the first and second transmissions TM1 and TM2 are controlled so that the rotation number of the input members 122 of the first and second one-way clutches OWC1 and OWC2 are synchronized and exceed the rotation number (the rotation number of the driving target member 11) of the output member 121, and the transition to the engine running is performed in which both driving forces of the second engine ENG2 and the first engine ENG1 are synthesized.

During High Speed Running (100 to Vmax km/h)

Figure 31:
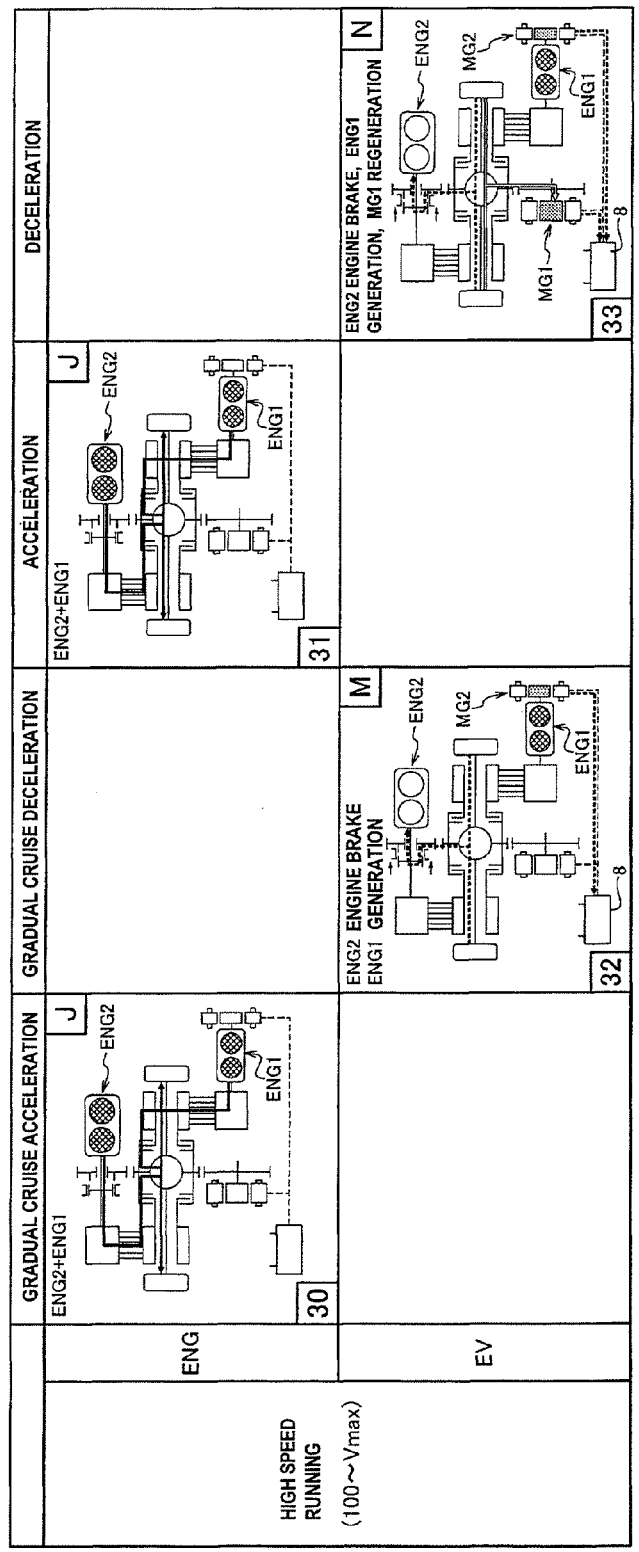
FIG. 31 shows a control operation depending on a running state to be executed in the driving system at the time of a high speed running.

Next, the control operation during high speed running will be described based on FIG. 31.

(30), (31) During gradual cruise acceleration and during acceleration, by the operation pattern J, the engine running using the synthetic force of the driving force of the second engine ENG2 and the driving force of the first engine ENG1 is performed. At this time, the first engine ENG1 of small displacement is operated in the fixed operation condition in which the first engine ENG1 and/or the first transmission TM1 are controlled so that the rotation number or the torque enters the high efficiency operation region, and in regard to a further request output, the second engine ENG2 of large displacement and/or the second transmission TM2 are controlled. When SOC is low, the sub motor/generator MG2 is used as the generator to charge the battery 8.

(32) During gradual cruise deceleration, by the operation pattern M, the synchronization mechanism 20 is in the connection state, the engine brake of the second engine ENG2 is performed. At this time, the first engine ENG1 not contributing to the deceleration is used in the electricity generation operation of the sub motor/generator MG2 to charge the battery 8.

(33) During deceleration when stepping on the brake, the switch-over to the operation pattern N is performed, the synchronization mechanism 20 is in the connection state, whereby the engine brake of the second engine ENG2 is performed. Simultaneously, by the regeneration operation of the main motor/generator MG1, a strong braking force is worked. The regeneration electric power created in the main motor/generator MG1 is charged to the battery 8. The first engine ENG1 not contributing the deceleration is used in the electricity generation operation of the sub motor/generator MG2 to charge the battery 8.

During Backward Movement

Figure 32:
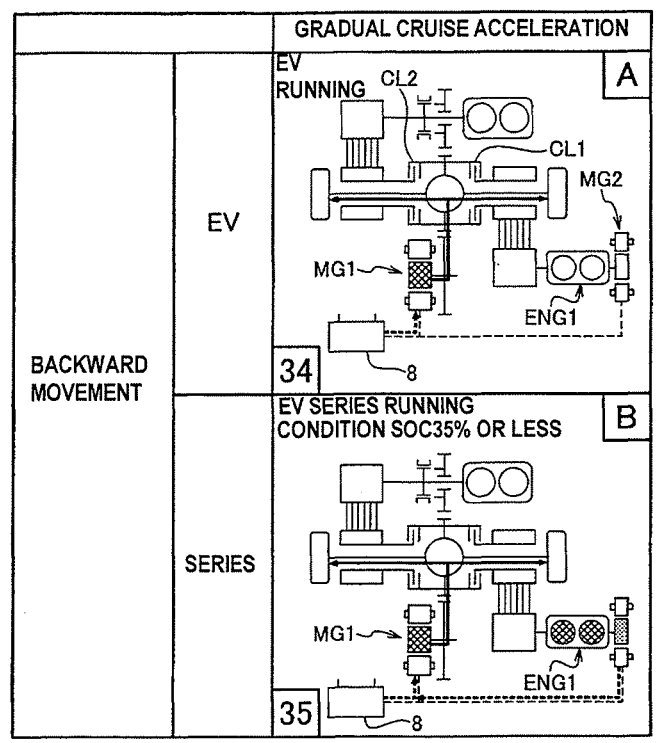
FIG. 32 shows a control operation to be executed in the driving system at the time of the vehicle backward movement.

Next, the control operation during the backward movement will be described based on FIG. 32.

Figure 34A:
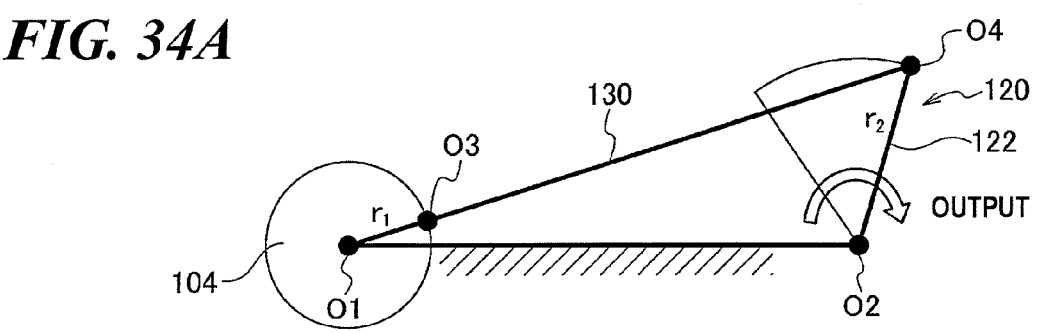
FIGS. 34A and 34B show a backward movement impossible state due to the locking of the transmission.
Figure 34B:
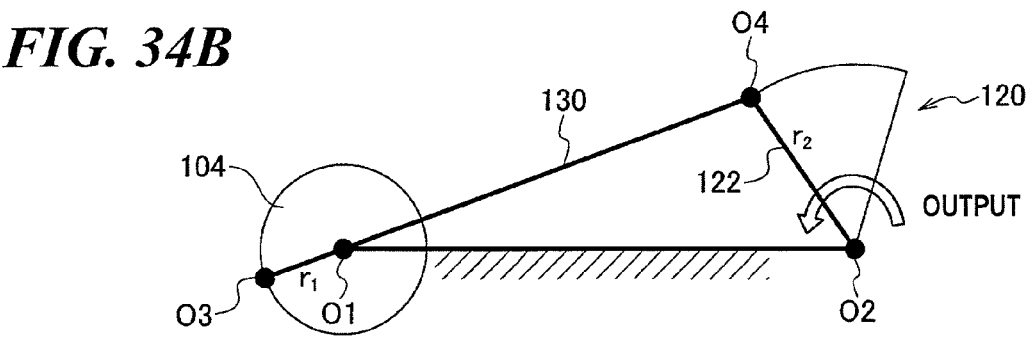

(34) During backward movement, as the gradual cruise acceleration, the EV running is performed by the operation pattern A. When the backward movement is performed, in the first and second one-way clutches OWC1 and OWC2, the output member 121 connected to the driving target member 11 rotates in an opposite direction (an arrow RD2 direction in FIG. 3) with respect to the positive direction, and thus the input member 122 and the output member 121 are engaged with each other via the roller 123. When the input member 122 is engaged with the output member 121, the rotational force of the opposite direction of the output member 121 acts on the input member 122. However, when the input center axis O1 is situated on the extension line of the connection member 130 shown in FIG. 34A and the input center axis O1 and the second fulcrum O4 reach the most separated position (or when the rotational direction of the opposite direction to the positive direction is the arrow RD1 direction in FIG. 3, a position where the connection member 130 shown in FIG. 34B passes through the input center axis O1 and the input center axis O1 and the second fulcrum O4 are closest to each other), the input member 122 is connected to the connection member 130, whereby the oscillation movement of the input member 122 is restricted. Thus, the transmission of the movement of the further opposite direction is locked. Accordingly, even if the output member 121 rotates reversely, the first and second transmissions TM1 and TM2 constituted by the infinite continuously variable transmission mechanisms BD1 and BD2 are locked, whereby the state, in which the backward movement is impossible (reverse impossible state), is generated. Thus, the clutch mechanisms CL1 and CL2 are in the release state in advance to avoid the lock, the main motor/generator MG1 rotates reversely in that state, whereby the vehicle is reversed.

(35) Even during the backward movement in the EV running, when the residual capacity SOC of the battery 8 is equal to or less than 35%, the switch-over to the series running of the operation pattern B is performed, and the main motor/generator MG1 rotates reversely while charging the battery 8.

During Stop

Figure 33:
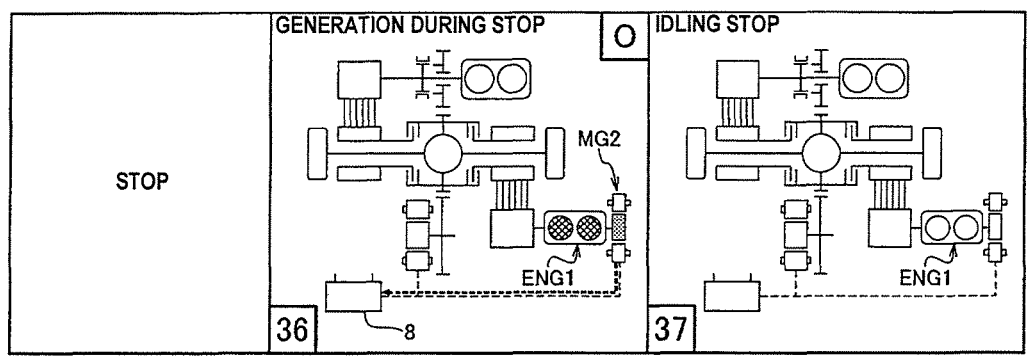
FIG. 33 shows a control operation to be executed in the driving system at the time of the vehicle stop.

Next, the control operation during stop will be described based on FIG. 33.

(36) When idling during vehicle stop, the switch-over to the operation pattern O is performed, only the first engine ENG1 is operated, for example, the transmission ratio of the first transmission TM1 is set to infinity so that the driving force is not transmitted to the driving target member 11, the sub motor/generator MG2 generates the electricity, and the generated electric power is charged to the battery 8.

(37) When the idling is stopped, the whole power source is stopped.

Although the control operation during normal running was described above, according to the driving system 1, the following method is also possible:

As described above, when a vehicle is reversed, the input member 121 reversely rotates to the input member 122, whereby the first and second transmissions TM1 and TM2 enter the locked state. Thus, the function of entering the locked state is used as a heel hold function (slip down prevention) during climbing departure. That is, when detecting the situation of performing the climbing departure by a member such as a sensor, at least one of the clutch mechanisms CL1 and CL2 is held in the connection state. Then, since any one of the transmissions TM1 and TM2 enter the locked state, the slip-down of the vehicle can be prevented (realizing the heel hold function). Thus, there is no need to perform another heel hold control.

Figure 35:
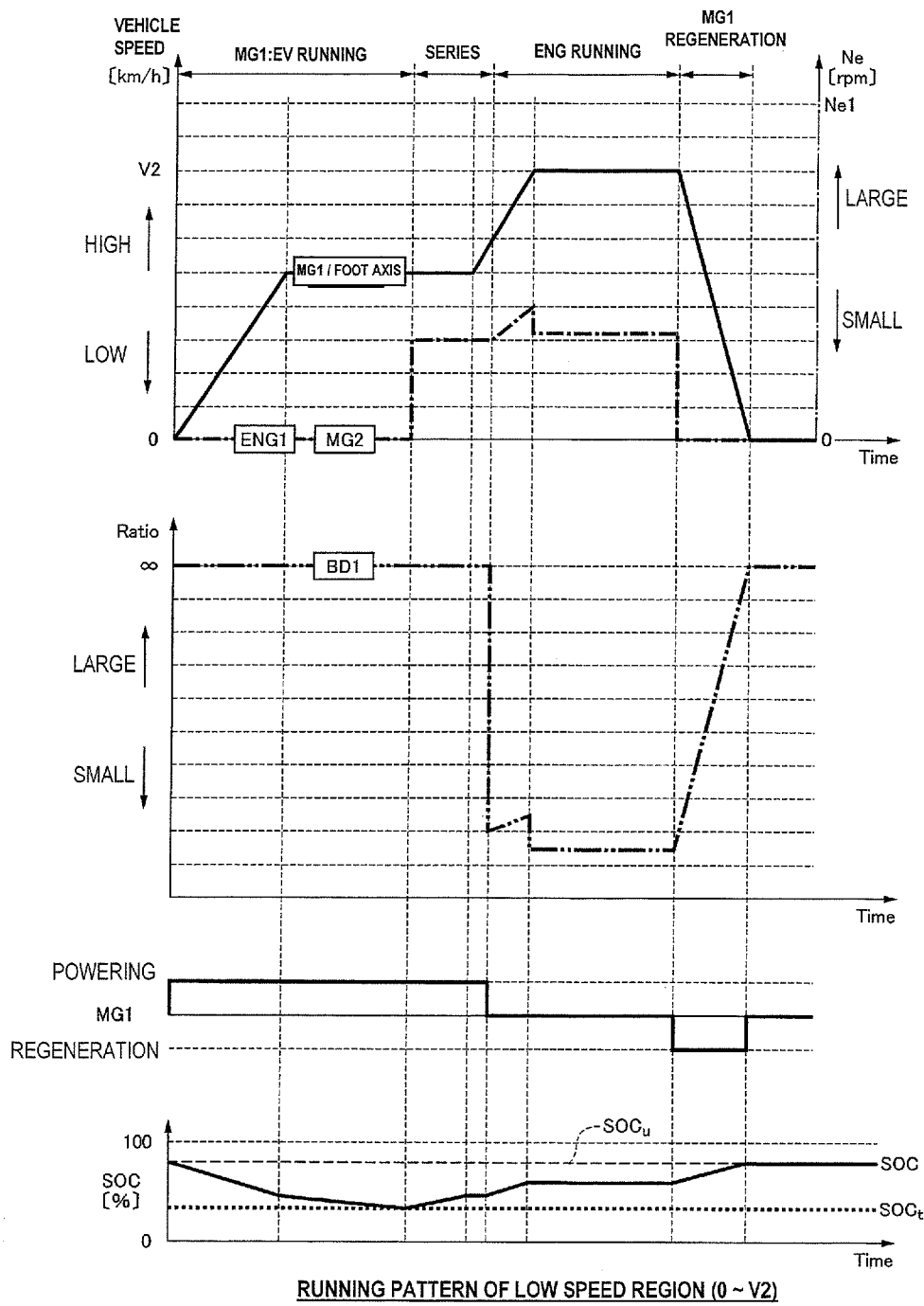
FIG. 35 shows an operation situation in a low speed region.
Figure 36:
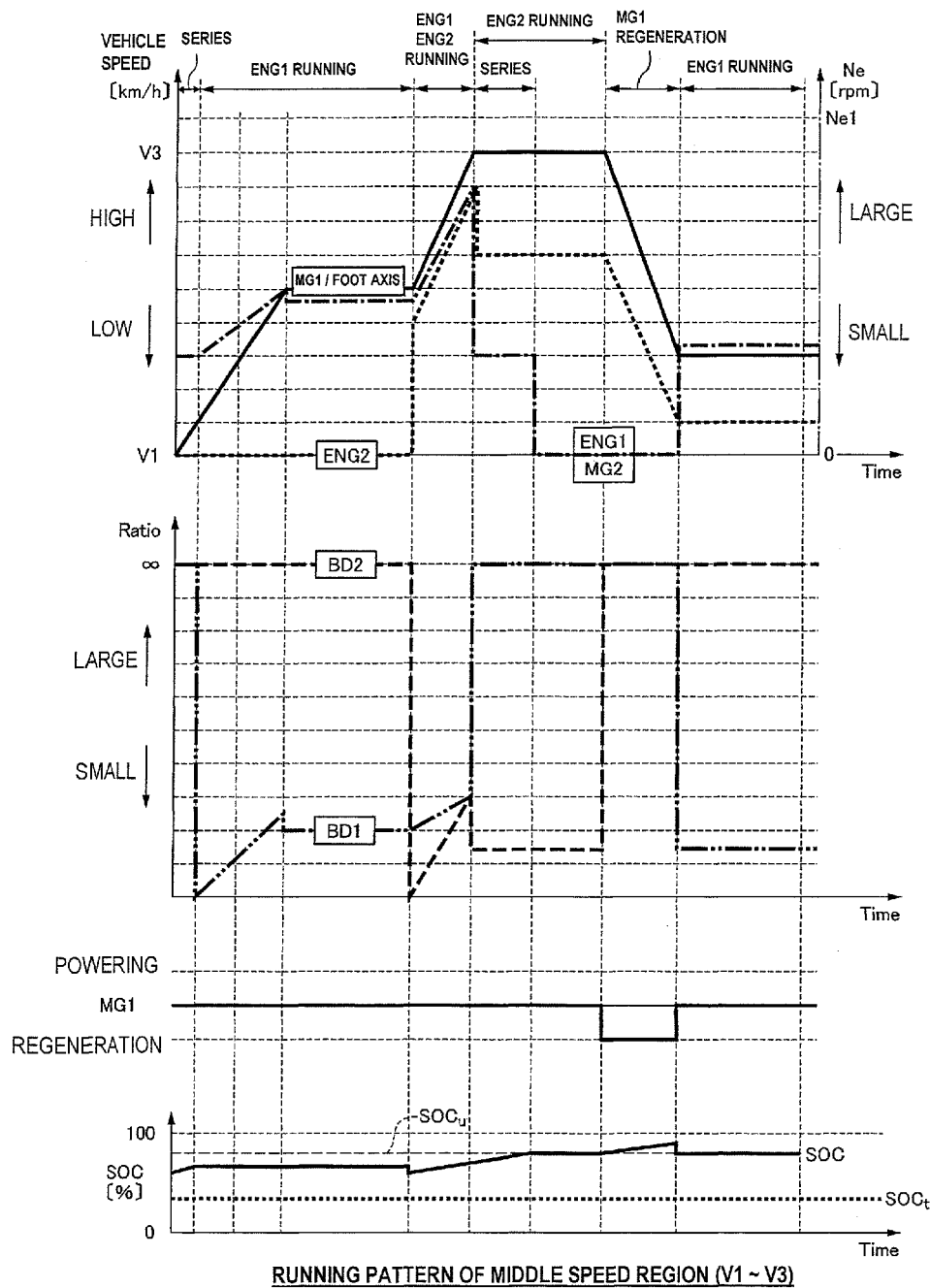
FIG. 36 shows an operation situation in a middle speed region.
Figure 37:
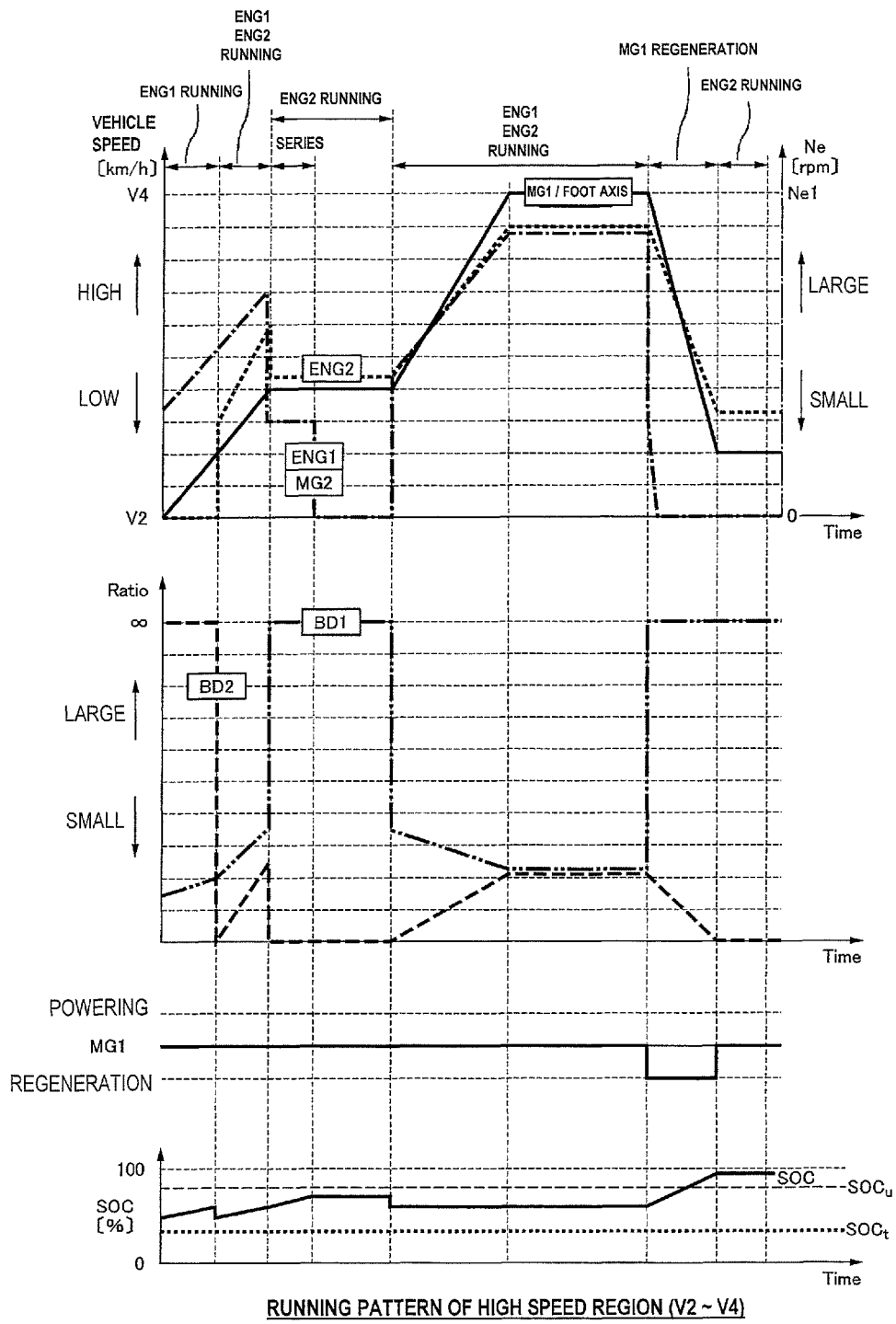
FIG. 37 shows an operation situation in a high speed region.

Next, relationship between the vehicle speed during actual running or the rotation number of the engine or the motor/generator, the transmission ratio of the transmission, and the battery residual capacity (SOC) will be described using FIGS. 35 to 37. In the drawings, the vehicle speed is proportional to the rotation number of the main motor/generator MG1. The rotation number of the first engine ENG1 and the second engine ENG2 coincide to each other.

Running Pattern of Low Speed Region (0 to V2 km/h)

The operation situation when running in the low speed region (0 to V2 km/h) will be described using FIG. 35. The value of V2 is, for example, 50 km/h.

Firstly, when departing, the EV running by the main motor/generator MG1 is performed. From the vehicle speed zero to a predetermined speed (<V2), the EV running is performed only by the main motor/generator MG1. At this time, the first engine ENG1 and the sub motor/generator MG2 are stopped.

The first infinite continuously variable transmission mechanism BD1 constituting the first transmission TM1 is set to infinity.

Next, during EV running, when the battery residual capacity (SOC) is decreased and lowered to a standard value (SOCt=for example, about 35%), the transition from the EV running to the series running is performed. In that step, firstly, the first engine ENG1 by the sub motor/generator MG2 is started, and the first engine ENG1 is operated by the rotation number entering the high efficiency operation region. At this time, the ratio of the first infinite continuously variable transmission mechanism BD1 is maintained in infinity.

Next, when the acceleration request is generated during series running, the rotation number of the main motor/generator MG1 begins to up, after further reducing the ratio of the first infinite continuously variable transmission mechanism BD1 in that situation, the engine rotation number is gradually raised, and the ratio is changed, whereby the driving force of the first engine ENG1 is transmitted to the driving target member 11, and the switch-over to the engine running by the first engine ENG1 is performed. In this step, the main motor/generator MG1 is stopped.

When the vehicle speed is V2 (maximum value of low speed region), the first engine ENG1 is operated at a high efficiency, the ratio of the first infinite continuously variable transmission mechanism BD1 is set to the value corresponding thereto, and the cruise running (stable running of a small load) by the first engine ENG1 is performed.

Next, when the deceleration request is generated by stepping on the brake or the like, the first engine ENG1 is stopped, the ratio of the first infinite continuously variable transmission mechanism BD1 is changed to infinity, and the main motor/generator MG1 is subjected to the regeneration operation until the vehicle is stopped.

Running Pattern of Middle Speed Region (V1 to V3 km/h)

The operation situation when running in the middle speed region (V1 to V3 km/h) will be described using FIG. 36. V1<V2<V3, the value of V1 is, for example, 20 km/h, and the value of V3 is, for example, 110 km/h.

Firstly, when there is an acceleration request from the vehicle speed V1, in an initial step, the rotation number of the main motor/generator MG1 is up, and next, the engine rotation number of the first engine ENG1 is raised and the ratio of the first infinite continuously variable transmission mechanism BD1 is changed. The driving force of the first engine ENG1 is transmitted to the driving target member 11, and the switch-over from the series running by the first engine ENG1 and the main motor/generator MG1 to the engine running by the first engine ENG1 is performed. In this step, the main motor/generator MG1 is stopped.

When the vehicle speed is stable, the first engine ENG1 is operated at a high efficiency, the ratio of the first infinite continuously variable transmission mechanism BD1 is maintained in the value corresponding thereof, and the cruise running by the first engine ENG1 is performed.

Next, when a further acceleration request is generated in the situation where the cruise running by the first engine ENG1 is performed, the rotation number of the first engine ENG1 is raised, and the ratio of the first infinite continuously variable transmission mechanism BD1 is increased. Consecutively, the driving force of the first engine ENG1 is transmitted to the driving target member 11, the second engine ENG2 is started in the state where the ratio of the second infinite continuously variable transmission mechanism BD2 is set to infinity, the rotation number of the second engine ENG2 is raised, the engagement is performed in the state where the ratio of the second infinite continuously variable transmission mechanism BD2 is reduced, the ratio is gradually increased, and the driving force of the second engine ENG2 is transmitted to the driving target member 11. The engine running only by the driving force of the first engine ENG1 is switched over to the engine running in which the driving forces of both the first engine ENG1 and the second engine ENG2 are synchronized, synthesized and transmitted to the driving target member 11.

When the vehicle speed is V3 (the maximum value of the middle speed region), the ratio of the first infinite continuously variable transmission mechanism BD1 is set to infinity, the driving force of the first engine ENG1 is not transmitted to the driving target member 11, and the switch-over to the engine running only by the driving force of the second engine ENG2 is performed. The second engine ENG2 is operated at a high efficiency, the ratio of the second infinite continuously variable transmission mechanism BD2 is set to the value corresponding thereto, and the cruise running by the second engine ENG2 is performed. In an initial period of the engine running only by the second engine ENG2, the sub motor/generator MG2 is driven by the first engine ENG1, and the generated electric power is charged to the battery 8. At this time, the first engine ENG1 is operated (series) in a high efficiency operation region, and then, when the battery 8 is charged up to a second predetermined value (e.g., SOCu=80%), the first engine ENG1 is stopped.

Next, when the deceleration request is generated by stepping on the brake or the like, the ratio of the second infinite continuously variable transmission mechanism BD2 is set to infinity, the main motor/generator MG1 is subjected to the regeneration operation, and the engine brake by the second engine ENG2 is performed. When the vehicle speed is dropped, the first engine ENG1 is started, the rotation number thereof is raised, and the ratio of the first infinite continuously variable transmission mechanism BD1 is changed, and the driving force of the first engine ENG1 is transmitted to the driving target member 11. The switch-over to the engine running using the driving force of the first engine ENG1 is performed.

Running Pattern of High Speed Region (V2 to V4 km/h)

The operation situation when running in the high speed region (V2 to V4 km/h) will be described using FIG. 37. V2<V3<V4, and the value of V4 is, for example, 150 km/h.

Firstly, in the situation when the engine runs only by the driving force of the first engine ENG1, when there is an acceleration request, the engine rotation number of the first engine ENG1 is raised, the ratio of the first infinite continuously variable transmission mechanism BD1 is changed. Consecutively, the driving force of the first engine ENG1 is transmitted to the driving target member 11, the second engine ENG2 is started in the state where the ratio of the second infinite continuously variable transmission mechanism BD2 is set to infinity, the rotation number of the second engine ENG2 is raised, the ratio of the second infinite continuously variable transmission mechanism BD2 is gradually increased from the small state, and the driving force of the second engine ENG2 is transmitted to the driving target member 11. The engine running only by the driving force of the first engine ENG1 is switched over to the engine running in which the driving forces of both the first engine ENG1 and the second engine ENG2 are synchronized, synthesized and transmitted to the driving target member 11.

When the vehicle speed is stable, the ratio of the first infinite continuously variable transmission mechanism BD1 is set to infinity, the driving force of the first engine ENG1 is not transmitted to the driving target member 11, and the switch-over to the engine running only by the driving force of the second engine ENG2 is performed. The second engine ENG2 is operated at a high efficiency, the ratio of the second infinite continuously variable transmission mechanism BD2 is set to the value corresponding thereto, and the cruise running by the second engine ENG2 is performed. In an initial period of the engine running only by the second engine ENG2, the sub motor/generator MG2 is driven by the first engine ENG1, and the generated electric power is charged to the battery 8. At this time, the first engine ENG1 is operated at a high efficiency operation (series), and then, the first engine ENG1 is stopped.

Next, when a further acceleration request is generated in the situation where the cruise by the second engine ENG2 is performed, the rotation number of the second engine ENG2 is raised, the ratio of the second infinite continuously variable transmission mechanism BD2 is changed. Simultaneously, the first engine ENG1 is started, the rotation number thereof is raised, the ratio of the first infinite continuously variable transmission mechanism BD1 is changed, the driving force of the first engine ENG1 and the driving force of the second engine ENG2 are transmitted to the driving target member 11, and the engine running only by the driving force of the second engine ENG2 is switched over to the engine running in which the driving force of both the second engine ENG2 and the first engine ENG1 are synchronized, synthesized and transmitted to the driving target member 11.

When the vehicle speed is V4 (the maximum value of high speed region), preferentially, the first engine ENG1 is operated at a high efficiency, the ratio of the first infinite continuously variable transmission mechanism BD1 is set to the value corresponding thereto, the second engine ENG2 and the first infinite continuously variable transmission mechanism BD1 are set to the value suitable for the cruise running, and the cruise running (stable running of a small load) by the first and second engines ENG1 and ENG2 is performed.

Next, when the deceleration request is generated by stepping on the brake or the like, the ratio of the first infinite continuously variable transmission mechanism BD1 is set to infinity, the first engine ENG1 is stopped, and the main motor/generator MG1 is subjected to the regeneration operation. Simultaneously, the engine brake by the second engine ENG2 is performed. When the vehicle speed is dropped, the rotation number of the second engine ENG2 and the ratio of the second infinite continuously variable transmission mechanism BD2 are changed, the driving force of the second engine ENG2 is transmitted to the driving target member 11, and the switch-over to the engine running using only the driving force of the second engine ENG2 is performed.

Figure 38:
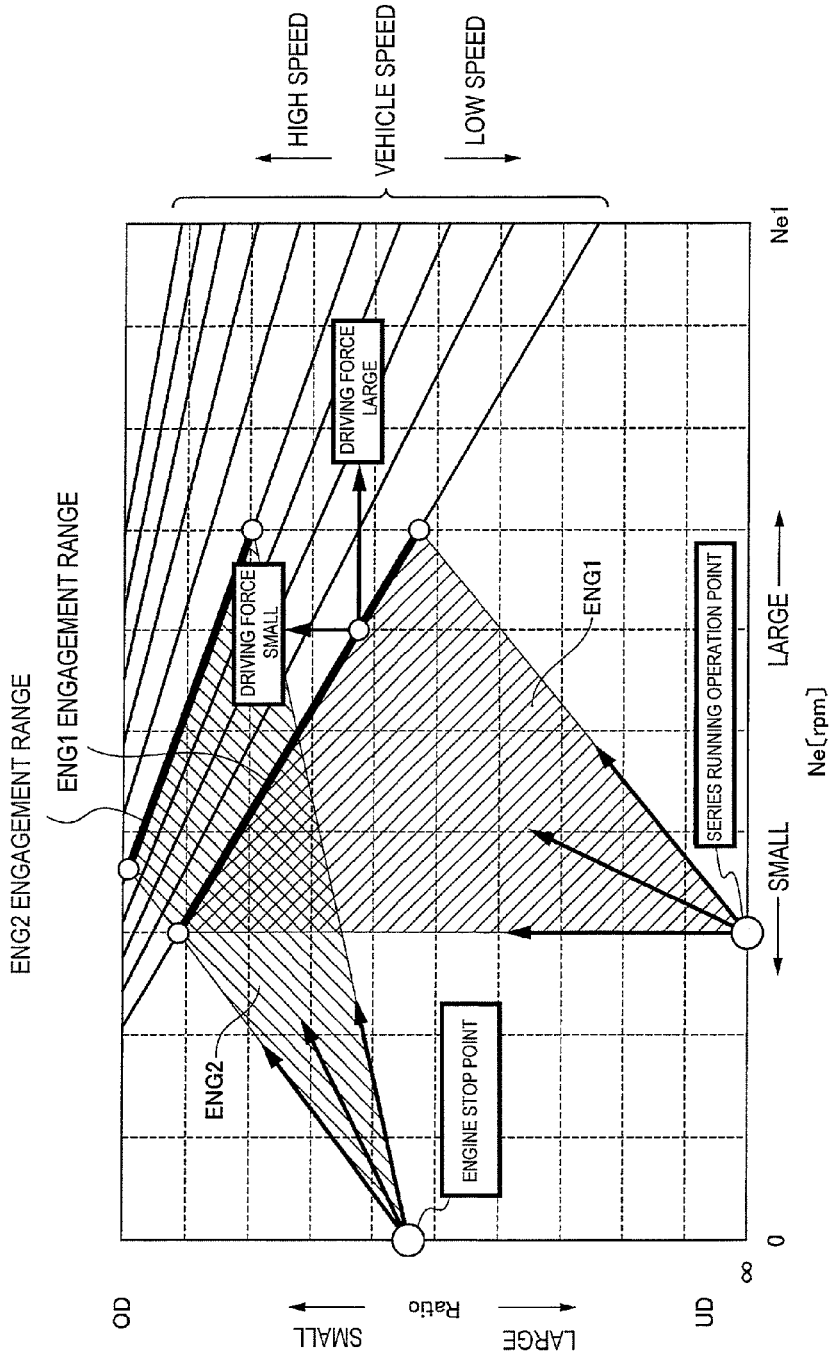
FIG. 38 shows an engagement setting range for an engine in the driving system.

FIG. 38 shows engagement setting ranges for the first and second engines ENG1 and ENG2. The transverse axis thereof shows an engine rotation number, and the longitudinal axis thereof shows the ratio of the transmission mechanism.

For example, when starting the first engine ENG1 in the state where the ratio is infinity ($\infty$), the engine rotation number is raised to a predetermined value, the ratio is reduced from infinity ($\infty$) in this state, otherwise, when the engine rotation number is increased, it reaches a vehicle speed line, and the engine output is transmitted to the driving target member 11 (the engagement is established). Even when the second engine ENG2 is operated, the ratio is gradually decreased from infinity ($\infty$) of a limited value slightly larger than an objective ratio to be engaged. Otherwise, the engine rotation number is increased. Then, by reaching the vehicle speed line, the engine output is transmitted to the driving target member 11 (the engagement is established). For this reason, it is possible to suitably set the rotation number of the respective engines ENG1 and ENG2 and the ratio of the transmission mechanism in the engage scope depending on the vehicle speed, whereby the high efficiency operation of the engine is possible. Thus, the first engine ENG1 is operated in the high efficiency operation point, when a high request driving force is generated, the second engine ENG2 can be operated while selecting the engine rotation number and the ratio, whereby it is also possible to use both engines EBG1 and ENG2 in the operation point of a satisfactory efficiency.

Next, advantages of the above-described driving system 1 will be described. The driving system 1 of the embodiment provides the below advantages.

Since the respective first and second engines ENG1 and ENG2 are individually equipped with the transmissions TM1 and TM2 as the transmission mechanisms, by the combination of the setting of the rotation number of the engines ENG1 and ENG2 and the transmission ratios of the transmissions TM1 and TM2, it is possible to control the output rotation number (the input rotation number of the input members 122 of the first and second one-way clutches OWC1 and OWC2) from the transmissions TM1 and TM2. Thus, depending on the setting of the transmission ratios of the transmissions TM1 and TM2, the rotation number of each engine ENG1 and ENG2 can be independently controlled, and each engine ENG1 and ENG2 can be operated in the operation point of the satisfactory efficiency, respectively, which can greatly contribute to improved fuel efficiency.

When a group of "the first engine ENG1 and the first transmission TM1" and a group of "the second engine ENG2 and the second transmission TM2" are referred to as "power mechanisms", the power mechanisms of two groups are connected to the same the driving target member 11 via one-way clutches OWC1 and OWC2, respectively. Thus, the selective switch-over of the power mechanism to be used as the power source or the synthesis of the driving forces from two power mechanisms can be executed only by controlling the input rotation number (the rotation number to be output from the power mechanism) with respect to the respective one-way clutches OWC1 and OWC2.

As the first and second transmissions TM1 and TM2, the infinite continuously variable transmission mechanisms BD1 and BD2 transmittable in a non-step manner, respectively are used. Thus, only by changing the transmission ratios of the infinite continuously variable transmission mechanisms BD1 and BD2 in a non-step manner, it is possible to smoothly control ON/OFF of the power transmission from each power mechanism to the driving target member 11 while maintaining the operation state in the high efficiency operation point, without changing the rotation number of the first and second engines ENG1 and ENG2.

In this regard, in the case of a step transmission mechanism, in order to smoothly control ON/OFF of the one-way clutches OWC1 and OWC2 by changing the output rotation number of the power mechanism, there is a need to adjust the rotation number of the engines ENG1 and ENG2 to meet the transmission gear step. Meanwhile, in the case of the infinite continuously variable transmission mechanisms BD1 and BD2, since the output rotation number of the power mechanism can be smoothly changed only by adjusting the transmission ratios of the infinite continuously variable transmission mechanisms BD1 and BD2 in a non-step manner without changing the rotation number of the engines ENG1 and ENG2, it is possible to smoothly perform the switch-over of the driving source (the engines ENG1 and ENG2) due to ON/OFF of the power transmission between the power mechanism and the driving target member 11 via the one-way clutches OWC1 and OWC2. Thus, it is possible to keep the operation of the engines ENG1 and ENG2 in an operation state having a satisfactory BSFC (Brake Specific Fuel Consumption).

Especially, by adopting the infinite continuously variable transmission mechanisms BD1 and BD2 of the embodiment, the transmission ratio can be set to infinity only by changing the eccentricity r1 of the eccentric disk 104. Thus, by setting the transmission ratio to infinity, when the engines ENG1 and ENG2 are started or the like, the inertial mass portion of the downstream side can be substantially separated from the engines ENG1 and the ENG2. For that reason, the inertial mass portion of the downstream side (the output side) does not amount to resistance of the starting of the engines ENG1 and ENG2, but the starting of the engines ENG1 and ENG2 can be smoothly performed. In the case of this type of infinite continuously variable transmission mechanisms BD1 and BD2, since the number of gears used can be reduced, energy loss due to engagement abrasion of the gears can be reduced.

Since the main motor/generator MG1 is connected to the driving target member 11 as the power source different from the engines ENG1 and ENG2, it is possible to perform the EV running using only the driving force of the main motor/generator MG1. During EV running, since the rotational speed of the positive direction of the output member 121 exceeds the rotational speed of the positive direction of the input member 122 in the first and second one-way clutches OWC1 and OWC2, the state of clutch OFF (unlocked state) is generated, the power mechanism is separated from the driving target member 11, and the rotational load can be reduced.

When shifting from the EV running to the engine running using the driving force of the first engine ENG1, the control is performed so that the input rotation number of the first one-way clutch OWC1 annexed to the first engine ENG1 using the driving force exceeds the rotation number of the driving target member 11 that is driven by the main motor/generator MG1. As a result, it is possible to easily switch over the running mode from the EV running to the engine running.

By synchronizing the rotation number to be input from the first engine ENG1 to the first one-way clutch OWC1 with the rotation number to be given from the main motor/generator MG1 to the driving target member 11, it is also possible to perform a parallel running which uses both the driving force of the first engine ENG1 and the driving force of the main motor/generator MG1. Since it is also possible to start the second engine ENG2 by the use of the driving force of the main motor/generator MG1, a separate starter device (e.g., a starter motor or the like) for the second engine ENG2 can be omitted. By causing the main motor/generator MG1 to function as a generator when a vehicle is decelerated, since it is possible to cause a regeneration braking force to act on the driving wheel 2 and charge the regeneration electric power to the battery 8, an improvement in energy efficiency is also promoted.

Since the sub motor/generator MG2 is connected to the output shaft S1 of the first engine ENG1, the sub motor/generator MG2 can be used as the starter of the first engine ENG1, and there is no need to provide a separate starter device for the first engine ENG1. By using the sub motor/generator MG2 as a generator that generates electricity by the driving force of the first engine ENG1 and supplying the generated electric power to the main motor/generator MG1, the series running can also be performed.

In this manner, as the power source different from the engines ENG1 and ENG2, by equipping the main motor/generator MG1 and the sub motor/generator MG2, besides the engine running using only the driving forces of the engines ENG1 and ENG2, it is possible to select and execute various running modes such as the EV running that uses only the driving force of the main motor/generator MG1, the parallel running that uses the driving forces of both the engines ENG1 and ENG2 and the main motor/generator MG1, and the series running which supplies the electric power generated in the sub motor/generator MG2 to the main motor/generator MG1 using the driving force of the first engine ENG1 and performs the running by the driving force of the main motor/generator MG1. By selecting an optimal running mode depending on the condition, it is possible to contribute to improved fuel efficiency.

During switch-over of the running modes, by using the infinite continuously variable transmission mechanisms BD1 and BD2 in the transmissions TM1 and TM2, it is possible to smoothly switch-over the running mode from the EV running or the series running using the driving force of the main motor/generator MG1 to the engine running using the driving force of the first engine ENG1 without shock.

Herein, during series running executed between the EV running and the engine running, the rotation number of the first engine ENG1 and/or the transmission ratio of the first transmission TM1 are adjusted (that is, the power by the first engine ENG1 is directly used as the running driving force) so that the input rotation number of the first one-way clutch OWC1 exceeds output rotation number thereof, and the series running is realized. After that, in the step of the transition from the series running to the engine running, the rotation number of the first engine ENG1 and/or the transmission ratio of the first transmission TM1 are controlled so that the input rotation number of the first one-way clutch OWC1 is lower than the output rotation number thereof, and the driving force of the first engine ENG1 is input to the driving target member 11. Thus, it is possible to promote the efficient utilization of the engine energy while shifting from the starting of the first engine ENG1 to the engine running. That is, while the driving force is transmitted to the driving target member 11 after the engine is started, the engine energy is supplied to the main motor/generator MG1 or the battery 8 as the electric power and used effectively by performing the series running. Thus, the generated energy can be used without waste, which can contribute to improved fuel efficiency.

Especially, when shifting from the EV running using only the driving force of the main motor/generator MG1 to the series running, there is a need for the starting of the first engine ENG1 in the EV running state. However, since the resistance during starting can be reduced by the adaptation of the first one-way clutch OWC1 and by setting the transmission ratio of the first transmission TM1 to infinity, it is possible to smoothly perform the transition from the EV running to the series running without shock. By substantially disconnecting the first engine ENG1 from the inertial mass portion of the downstream side thereof by setting the transmission ratio of the first transmission TM1 to infinity, the rotation resistance when executing the series running can be reduced, and thus, the energy loss during series running is greatly reduced, which can contribute to improved fuel efficiency.

The transmission ratio is set to infinity, even if the rotation number of the first engine ENG1 is increased anyway, the power of the first engine ENG1 is not transmitted to the driving target member 11 via the first one-way clutch OWC1, and thus, the series running can be stably maintained.

During series running, only by controlling the input rotation number of the first one-way clutch OWC1, even if the clutch is provided or a special control is performed, the power of the first engine ENG1 is disconnected from the driving target member 11, and the first engine ENG1 can function as the power source of the exclusive purpose of the generator.

Thus, the engine ENG1 can be stably operated in the high efficiency point without requiring the control of the engine rotation number or the like depending on the running load, which can greatly contribute to improved fuel efficiency.

When shifting from the series running to the engine running, since the electricity generation by the sub motor/generator MG2 is stopped, the burden of the first engine ENG1 can be reduced. Even in the case of shifting from the series running to the engine running, when the battery residual capacity is small, the electricity generation by the sub motor/generator MG2 is continued to perform the charging, whereby it is possible to promote the burden reduction of the first engine ENG1 while suitably holding the charging state of the battery 8.

Since the clutch mechanisms CL1 and CL2 are provided between the output member 121 of first and second one-way clutches OWC1 and OWC2 and the driving target member 11, by causing the clutch mechanisms CL1 and CL2 to enter the disconnection state, it is possible to separate the power transmission path (from the engines ENG1 and ENG2 to one-way clutches OWC1 and OWC2) of the upstream side from the clutch mechanisms CL1 and CL2 from the power transmission path (from the driving target member 11 to the driving wheel 2) of the downstream side. Thus, when driving the driving target member 11 by one of the first and second engines ENG1 and ENG2 via one of the first and second one-way clutches OWC1 and OWC2, by disconnecting one of the clutch mechanisms CL1 and CL2 provided between the other of the clutches OWC1 and OWC2 and the driving target member 11, it is possible to prevent the dragging of the one-way clutches OWC1 and OWC2 not used in the wheel driving, whereby the unnecessary energy loss can be reduced.

When the input member 122 and the output member 121 of the one-way clutches OWC1 and OWC2 rotate in the opposite direction (a rotational direction during backward movement) with respect to the positive direction (the rotational direction when a normal vehicle is moved forward), the first and second transmissions TM1 and TM2 constituted by the above-described infinite continuously variable transmission mechanisms BD1 and BD2 functions to lock and prevent the reverse rotation of the driving target member 11. For this reason, by maintaining the clutch mechanisms CL1 and CL2 in the release state, the upstream side of the clutch mechanisms CL1 and CL2 can be separated from the driving target member 11, whereby it is possible to avoid the locking effect (also called backward movement prevention effect) by the transmissions M1 and M2. Thus, it is possible to perform the backward movement rotation of the driving target member 11 by the reverse rotation operation of the main motor/generator MG1, whereby the vehicle can be moved reversing.

When departing in a climbing road, by maintaining the clutch mechanisms CL1 and CL2 in the connection state, it is possible to obtain the heel hold function (a function of not slipping down in a hill road) using the backward movement prevention effect by the locking of the transmissions TM1 and TM2, and thus, another heel hold control is not necessary.

By setting the sizes of the displacements of the first and second engines ENG1 and ENG2 to be different from each other, the high efficiency operation points of both engines ENG1 and ENG2 can be different from each other. Thus, by selecting the engines ENG1 and ENG2 of the high efficiency side as the driving source depending on the running state, an overall improvement in energy efficiency can be promoted.

By the method of the setting of the input rotation number of two one-way clutches OWC1 and OWC2, a smooth and easy switch-over from the running by one engine to the running by the other engine can be performed. For example, during engine control operation shown in FIG. 28 (when switching over from the middle speed running to the middle high speed running), in the state of performing the engine running by inputting the driving force of the first engine ENG1 to the driving target member 11 via the first one-way clutch OWC1, the rotation number of the second engine ENG2 and/or the transmission ratio of the second transmission TM2 are changed so that the rotation number to be input to the input member 122 of the second one-way clutch OWC2 exceeds the rotation number of the output member 121, whereby it is possible to easily switch over the driving source extracting the power to the driving target member 11 from the first engine ENG1 to the second engine ENG2. The switch-over operation is only to control the rotation number, which is input to the first and second one-way clutches OWC1 and OWC2 via the infinite continuously variable transmission mechanisms BD1 and BD2, and can be smoothly performed without shock.

As in the control operation shown in FIG. 28, by setting the transmission ratio of the second transmission TM2 during starting of the second engine ENG2 to infinity, the inertial mass portion of the downstream side of the second transmission TM2 can be separated from the second engine ENG2. Thus, the resistance due to the inertial mass during starting of the second engine ENG2 can be reduced, and the starting energy can be reduced. When the second engine ENG2 is started while the driving force is switched over from the first engine ENG1 to the second engine ENG2, the power cannot be transmitted from the second transmission TM2 to the downstream side. Thus, even when the rotation number of the driving target member 11 is reduced by a certain cause (e.g., suddenly stepping on the brake or the like) during starting, the starting shock can be reduced. After the starting of the second engine ENG2, by changing the transmission ratio of the second transmission TM2 to a limited value, the rotational speed to be input to the second one-way clutch OWC2 is controlled. Thus, by raising the input rotational speed thereof until exceeding the rotational speed of the output member 121, the power of the second engine ENG2 can be reliably transmitted to the driving target member 11.

As a method of the control during starting of the second engine ENG2, another control operation can also be adopted. That is, when the second engine ENG2 is started, in the state of setting the second transmission TM2 in the suitable transmission ratio (the transmission ratio when being larger than an objective transmission ratio, a limited value in which the rotational speed of the input member 122 of the second one-way clutch OWC2 is lower than the rotational speed of the output member 121) in advance, the second engine ENG2 is started. In that case, it is possible to reduce the time from the starting to the setting of the objective transmission ratio (the transmission ratio in which the rotational speed of the input member 122 of the second one-way clutch OWC2 exceeds the rotational speed of the output member 121), and thus, an improvement in response depending on the request is promoted.

As in the control operation shown in FIG. 30 in the control operation, by controlling the rotation number of the first and second engines ENG1 and ENG2 and/or the transmission ratios of the first and second transmissions TM1 and TM2 so that the rotational speed to be input to both input members 122 of the first one-way clutch OWC1 and the second one-way clutch OWC2 exceeds the rotational speed of the output member 121, the great driving force, in which the outputs of two engines ENG1 and ENG2 are synthesized, can be easily input to the driving target member 11, and it is possible to perform the engine running using the driving force of both the first engine ENG1 and the second ENG2. At that time, in the transmissions TM1 and TM2, by using the infinite continuously variable transmission mechanisms BD1 and BD2, it is possible to smoothly perform the switch-over from the running using the driving force of one engine ENG2 to the running using the synthetic driving force of two engines ENG1 and ENG2 without shock.

When starting the first engine ENG1 during EV running, the first engine ENG1 is started in the state of setting the transmission ratio of the first transmission TM1 so that the input rotation number of the first one-way clutch OWC1 does not exceed the output rotation number, that is, so that the driving force of the first engine ENG1 is not transmitted to the driving target member 11 of the downstream side of the first transmission TM1. Thus, it is possible to prevent shock of engine starting from being transmitted to the driving wheel 2. The load can also be reduced during engine starting, and the smooth starting is possible.

Since the first engine ENG1 is started by the sub motor/generator MG2, there is no need to separately provide a starter device of the exclusive purpose of the first engine ENG1.

Since the driving target member 11 and the output shaft S2 of the second engine ENG2 are connected to each other via the synchronization mechanism 20, by causing the synchronization mechanism 20 to enter the connection state in the state where the power is introduced into the driving target member 11, it is possible to perform the start rotation of the output shaft S2 of the second engine ENG2 by the power of the driving target member 11. Thus, there is no need to provide a starter device of the exclusive purpose of the second engine ENG2. During starting, the power necessary for the starting of the second engine ENG2 may not be introduced into the driving target member 11. Mainly, in many cases, since the power from the first engine ENG1 as the driving source is input to the driving target member 11, the power can be used. Like an operation called a so-called "pressing", the power due to the coasting introduced from the driving wheel 2 side into the driving target member 11.

Basically, the starting of the second engine ENG2 is performed when supplying the power to the driving target member 11 by the first engine ENG1. However, even when the power is supplied to the driving target member 11 by the main motor/generator MG1, by causing the synchronization mechanism 20 to enter the connection state, it is possible to perform the cranking (giving the starter rotation to the engine also called motoring) of the second engine ENG2 by the power to be transmitted from the main motor/generator MG1 to the driving target member 11. In the state of supplying the power to the driving target member 11 by the first engine ENG1, when starting the second engine ENG2, there is a possibility that the power of the driving target member 11 is insufficient (the rotation number is dropped) due to the division of the power into the cranking of the second engine ENG2, but the insufficiency can be supplemented by the driving force of the main motor/generator MG1. By doing so, fluctuation of the power of the driving target member 11 can be suppressed, it is possible to promote the reduction in shock to the driving wheel when the second engine ENG2 is started. That is, it is possible to smoothly start the second engine ENG2 without shock.

Immediately after the second engine ENG2 is started, when the driving power of the second engine ENG2 is immediately transmitted to the driving target member 11 via the second transmission TM2 and the second one-way clutch OWC2, shock may be generated in the driving wheel 2. However, when the second engine ENG2 is cranked, by setting the transmission ratio so that the rotational speed of the input member 122 of the second one-way clutch OWC2 is lower than the rotational speed of the output member 121, immediately after the starting, the power from the second engine ENG2 is not transmitted to the driving target member 11, and thus shock generated in the driving wheel 2 can be suppressed. Especially, by setting the transmission ratio to infinity in the second infinite continuously variable transmission mechanism BD2, it is possible to separate the inertial mass of the inner portion or the downstream side thereof of the transmission mechanism BD2 from the output shaft S2 of the second engine ENG2 as much as possible. Thus, the starting resistance of the second engine ENG2 can be reduced, and the starting is easily performed.

When the driving forces of two engines ENG1 and ENG2 during high speed running or the like are synthesized to drive the driving target member 11, at least one of the first engine ENG1 is operated in the high efficiency operation region, which can contribute to improved fuel efficiency. That is, in the state of fixing the operation condition in a certain scope so that the rotation number of the first engine ENG1 and/or the torque enter the high efficiency operation region, the first engine ENG1 and/or the first transmission TM1 are controlled, and controlling the second engine ENG2 and the second transmission TM2 can cope with the output request exceeding the output to be obtained by the fixed operation condition, which can contribute to improved fuel efficiency.

Particularly, even when the displacement of the first engine ENG1, to which the operation condition is fixed, is smaller than the displacement of the second engine ENG2, and the fluctuation in the request output is great, the engine of the large displacement copes with the request fluctuation, and thus, the delay to the request can be reduced. When the displacement of the first engine ENG1, to which the operation condition is fixed, is larger than the displacement of the second engine ENG2, the engine of the large displacement is operated in the high efficiency operation range, which can further contribute to improved fuel efficiency.

The control can be performed so that, when the request output is equal to or greater than a predetermined value, the engine of the small displacement is set in the operation condition fixing side, and when the request output is equal to or less than a predetermined value, the engine of the large displacement is set in the operation condition fixing. In that case, the delay to the request can be reduced, and improved fuel efficiency can be promoted.

The present invention is not limited to the above embodiment, but can be suitably modified or improved. Materials, shapes, sizes, numbers, disposition places or the like of the respective components in the above embodiments are arbitrary and not limited as long as they can accomplish the present invention.

Figure 39:
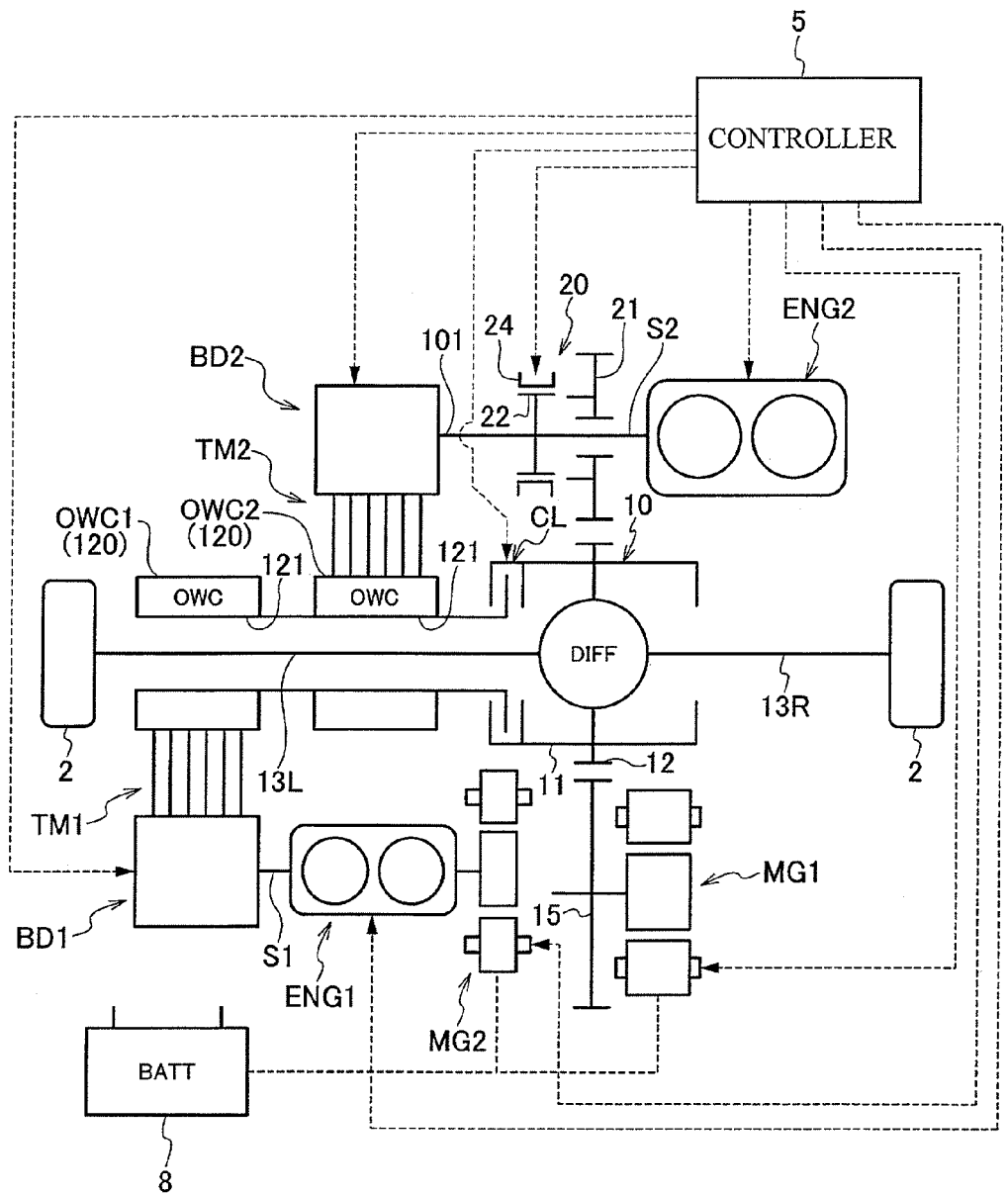
FIG. 39 shows a vehicle driving system of another embodiment of the present invention in a skeleton manner.

For example, in the above embodiment, in the left and right sides of the differential device 10, the first one-way clutch OWC1 and the second one-way clutch OWC2 are disposed, respectively, and the output members 121 of the respective first and second one-way clutches OWC1 and OWC2 are connected to the driving target member 11 via the clutch mechanisms CL1 and CL2. However, as in another embodiment shown in FIG. 39, the first and second one-way clutches OWC1 and OWC2 may be disposed on one side of the differential device 10, and the one-way clutches may be connected to the driving target member 11 via one clutch mechanism CL after connecting the output members of the both one-way clutches OWC1 and OWC2.

In the above embodiment, the first and second transmissions TM1 and TM2 are configured by the type using the eccentric disk 104 or the connection member 130 and the one-way clutch 120. However, other CVT or the like may be used as the transmission mechanism. When using the transmission mechanism of other type, the one-way clutches OWC1 and OWC2 may be provided in the outside (the downstream side) of the transmission mechanism.

In the above embodiment, a case was described where the state running by the driving force of the first engine ENG1 is switched over to the state running by the driving force of the second engine ENG2. However, contrary to this, the state running by the driving force of the second engine ENG2 is switched over to the state running by the driving force of the first engine ENG1. In that case, in the state where the generated power of the second engine ENG2 via the second one-way clutch OWC2 is input to the driving target member 11, by changing the rotation number of the first engine ENG1 and/or the transmission ratio of the first transmission TM1 so that the rotation number to be input to the input member 122 of the first one-way clutch OWC1 exceeds the rotation number of the output member 121, the switch-over can be smoothly performed.

In the above embodiment, a configuration was described which has two engines and two transmissions, but a configuration having three or more engines and three or more transmissions may be used. The engine may be used by combining a diesel engine or a hydrogen engine and a gasoline engine.

Figure 40:
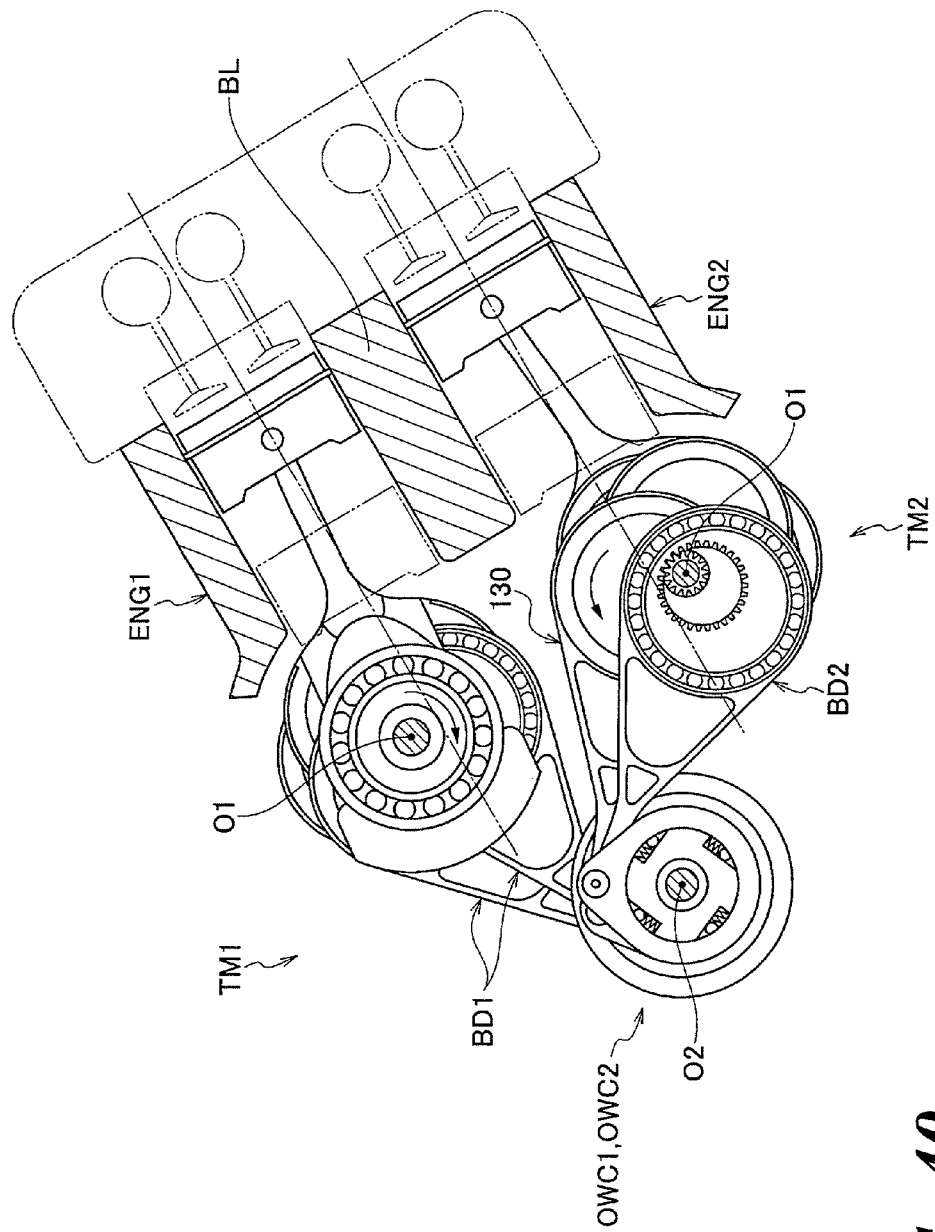
FIG. 40 cross-sectionally shows a modified example of a vehicle driving system of the present invention.

The first engine ENG1 and the second engine ENG2 of the above embodiment may be configured as a separated body or may be configured as one body. For example, as shown in FIG. 40, the first engine ENG1 and the second engine ENG2 may be disposed in the common block BL as the first internal combustion engine section and the second internal combustion engine section, respectively of the present invention.

The present invention is based on Japanese Patent Application No. 2010-136542 filed on Jun. 15, 2010, Japanese Patent Application No. 2010-136544 filed on Jun. 15, 2010, and Japanese Patent Application No. 2010-136549 filed on Jun. 15, 2010, and the contents thereof are incorporated herein by reference.

DESCRIPTION OF REFERENCE NUMERALS AND CHARACTERS

1 driving system
2 driving wheel
5 controller
8 battery (storage)
11 driving target member (differential case)
12 driven gear
13L left accelerator shaft
13R right accelerator shaft
15 driven gear
20 synchronization mechanism (clutch)
101 input shaft
104 eccentric disk
112 transmission variable mechanism
120 one-way clutch
121 output member
122 input member
123 roller (engagement member)
130 connection member
131 one end portion (ring portion)
132 the other end portion
133 circular opening
140 bearing
180 actuator
BD1 first infinite continuously variable transmission mechanism
BD2 second infinite continuously variable transmission mechanism
CL1 clutch mechanism
CL2L clutch mechanism
ENG1 first engine (first internal combustion engine section)
ENG2 second engine (second internal combustion engine section)
MG1 main motor/generator
MG2 sub motor/generator
OWC1 first one-way clutch
OWC2 second one-way clutch
S1 output shaft
S2 output shaft
TM1 first transmission (first transmission mechanism)
TM2 second transmission (second transmission mechanism)
O1 input center axis
O2 output center axis
O3 first fulcrum
O4 second fulcrum
RD1 positive rotation direction
RD2 reverse rotation direction
r1 eccentricity
θ2 oscillation angle
ω1 rotation angular speed of input shaft
ω2 angular speed of output member

The invention claimed is:

1. A vehicle driving system including:
a first internal combustion engine section and a second internal combustion engine section that generate rotational powers, respectively;
a first transmission mechanism and a second transmission mechanism that output the generated rotational powers of the first internal combustion engine section and the second internal combustion engine section while changing speeds thereof, respectively;
a first one-way clutch and a second one-way clutch that are provided in the output portions of the first transmission mechanism and the second transmission mechanism, respectively, each one-way clutch having:
an input member that receives the rotational powers from the first transmission mechanism and the second transmission mechanism;
an output member; and
an engagement member that makes the input member and the output member enter a locked state or an unlocked state with each other, so that the input member and the output member enter the locked state when a rotational speed of a positive direction of the input member exceeds a rotational speed of a positive direction of the output member, thereby transmitting the rotational power from the input member to the output member; and
a driving target member that is commonly connected to the output members of the first one-way clutch and the second one-way clutch and transmits the rotational power to be transmitted to the output members of each one-way clutch to a driving wheel,
wherein the generated rotational powers of the first internal combustion engine section and the second internal combustion engine section are input to the first one-way clutch and the second one-way clutch via the first transmission mechanism and the second transmission mechanism, respectively, and the rotational powers are input to the driving target member via the first one-way clutch and the second one-way clutch, respectively.

2. The system of claim 1,
wherein the first transmission mechanism and the second transmission mechanism are constituted by continuously variable transmission mechanisms that can be changed in a non-step manner.

3. The system of claim 2,
wherein the continuously variable transmission mechanism includes:
an input shaft that rotates around an input center axis by receiving the rotational power;
plural first fulcrums that are provided in a circumferential direction of the input shaft at equal intervals, are able to change an eccentricity with respect to the input center axis, respectively, and rotate together with the input shaft around the input center axis while maintaining the eccentricity;
plural eccentric disks that hold the first fulcrums as the centers, respectively, and rotate around the input center axis;
a one-way clutch that has an output member that rotates around an output center axis separated from the input center axis, an input member that is oscillated around the output center axis by receiving the power of a rotational direction from the outside, and an engagement member that makes the input member and the output member enter a locked state or an unlocked state with each other, and when the rotational speed of the positive direction of the input member exceeds the rotational speed of the positive direction of the output member, the one-way clutch transmits the rotational power, which was input into the input member, to the output member, thereby converting an oscillation movement of the input member to a rotational movement of the output member;
a second fulcrum that is positioned separately from the output center axis of the input member;
plural connection members that have one ends connected to the outer peripheries of the eccentric disks so as to be rotatable around the first fulcrum and the other ends connected to the second fulcrum provided on the input member of the one-way clutch so as to be rotatable, thereby transmitting the rotational movement, which is given from the input shaft to the eccentric disk, to the input member of the one-way clutch as an oscillation movement of the input member; and
a transmission ratio variable mechanism that changes an oscillation angle of the oscillation movement to be transmitted from the eccentric disk to the input member of the one-way clutch by adjusting the eccentricity of the first fulcrum with respect to the input center axis, thereby changing the transmission ratio when the rotational power to be input into the input shaft is transmitted to the output member of the one-way clutch via the eccentric disk and the connection member as the rotational power, and
wherein the continuously variable transmission mechanism is configured as a four bar linkage mechanism of continuously variable transmission mechanism that can set the transmission ratio to infinity by setting the eccentricity to be zero, the output shaft of the internal combustion engine section is connected to the input shaft of the continuously variable transmission mechanism, and the one-way clutch which is a component of the continuously variable transmission mechanism also serves as the first one-way clutch and the second one-way clutch provided between the first transmission mechanism, the second transmission mechanism, and the driving target member, respectively.

4. The system of claim 3, further including:
clutch mechanisms that can transmit/disconnect the power between the output members of the first one-way clutch and the second one-way clutch and the driving target member.

5. The system of claim 1, further including: a main motor/generator connected to the driving target member.

6. The system of claim 1, further including:
a sub motor/generator connected to the output shaft of the first internal combustion engine section.

7. The system of claim 1, further including:
a main motor/generator connected to the driving target member; and
a sub motor/generator connected to the output shaft of the first internal combustion engine section.

8. The system of claim 1, further including:
clutch mechanisms that can transmit/disconnect the power between the output members of the first one-way clutch and the second one-way clutch and the driving target member.

9. The system of claim 1,
wherein the first and second internal combustion engine sections have high efficiency operation points different from each other.

10. The system of claim 1, further including:
a controller configured to perform a synchronization control which controls the rotation number of the first and second internal combustion engine sections and/or the transmission ratios of the first and second transmission mechanisms so that the rotational speed to be input into both input members of the first one-way clutch and the second one-way clutch exceeds the rotational speed of the output member,
wherein the controller controls the first internal combustion engine section and/or the first transmission mechanism in the state of fixing an operation condition to a certain range so that the rotation number and/or the torque of the first internal combustion engine section enters a high efficiency operation region when performing the synchronization control, and controls the second internal combustion engine section and the second transmission mechanism depending on an output request exceeding an output to be obtained by the fixed operation condition.

11. The system of claim 10,
wherein a displacement of the first internal combustion engine section, to which the operation condition is fixed, is smaller than a displacement of the second internal combustion engine section.

12. The system of claim 10,
wherein a displacement of the first internal combustion engine section, to which the operation condition is fixed, is greater than a displacement of the second internal combustion engine section.

13. The system of claim 10,
wherein one of the first internal combustion engine section and the second internal combustion engine section is set to have a large displacement, and the other thereof is set to have a small displacement, and
wherein the controller performs the control so that, when the output request is equal to or greater than a predetermined value, the internal combustion engine section of the small displacement is set in the operation condition fixing side, and when the output request is equal to or less than a predetermined value, the internal combustion engine section of the large displacement is set in the operation condition fixing side.

14. The system of claim 10,
wherein the continuously variable transmission mechanism includes:
an input shaft that rotates around the input center axis by receiving the rotational power;
plural first fulcrums that are provided in a circumferential direction of the input shaft at equal intervals, are able to change an eccentricity with respect to the input center axis, respectively, and rotate together with the input shaft around the input center axis while maintaining the eccentricity;
plural eccentric disks that hold the first fulcrums as the centers, respectively, and rotate around the input center axis;
a one-way clutch that has an output member that rotates around an output center axis separated from the input center axis, an input member that is oscillated around the output center axis by receiving the power of a rotational direction from the outside, and an engagement member that makes the input member and the output member enter a locked state or an unlocked state with each other, and when the rotational speed of the positive direction of the input member exceeds the rotational speed of the positive direction of the output member, the one-way clutch transmits the rotational power, which was input into the input member, to the output member, thereby converting an oscillation movement of the input member to a rotational movement of the output member;
a second fulcrum that is positioned separately from the output center axis on the input member;
plural connection members that have one ends connected to the outer peripheries of the eccentric disks so as to be rotatable around the first fulcrum, and the other ends connected to the second fulcrum provided on the input member of the one-way clutch so as to be rotatable, thereby transmitting the rotational movement, which is given from the input shaft to the eccentric disk, to the input member of the one-way clutch as an oscillation movement of the input member; and
a transmission ratio variable mechanism that changes an oscillation angle of the oscillation movement to be transmitted from the eccentric disk to the input member of the one-way clutch by adjusting the eccentricity of the first fulcrum with respect to the input center axis, thereby changing the transmission ratio when the rotational power to be input into the input shaft is transmitted to the output member of the one-way clutch via the eccentric disk and the connection member as the rotational power, and
wherein the continuously variable transmission mechanism is configured as a four bar linkage mechanism of continuously variable transmission mechanism that can set the transmission ratio to infinity by setting the eccentricity to be zero, the output shaft of the internal combustion engine section is connected to the input shaft of the continuously variable transmission mechanism, and the one-way clutch which is a component of the continuously variable transmission mechanism also serves as the first one-way clutch mechanism and the second one-way clutch mechanism provided between the first transmission, the second transmission, and the driving target member, respectively.

15. The system of claim 1, further including: a controller configured to perform a synchronization control which controls the rotation number of the first and second internal combustion engine sections and/or the transmission ratios of the first and second transmission mechanisms so that the rotational speed to be input into both input members of the first one-way clutch and the second one-way clutch exceeds the rotational speed of the output member.

16. The system of claim 15,
wherein the first transmission mechanism and the second transmission mechanism are constituted by continuously variable transmission mechanisms capable of changing the transmission ratio in a non-step manner.

17. The system of claim 16,
wherein the continuously variable transmission mechanism includes:
an input shaft that rotates around the input center axis by receiving the rotational power;
plural first fulcrums that are provided in a circumferential direction of the input shaft at equal intervals, are able to change an eccentricity with respect to the input center axis, respectively, and rotate together with the input shaft around the input center axis while maintaining the eccentricity;
plural eccentric disks that hold the first fulcrums as the centers, respectively, and rotate around the input center axis;
a one-way clutch that has an output member that rotates around an output center axis separated from the input center axis, an input member that is oscillated around the output center axis by receiving the power of a rotational direction from the outside, and an engagement member that makes the input member and the output member enter a locked state or an unlocked state with each other, and when the rotational speed of the positive direction of the input member exceeds the rotational speed of the positive direction of the output member, the one-way clutch transmits the rotational power, which was input into the input member, to the output member, thereby converting an oscillation movement of the input member to a rotational movement of the output member;
a second fulcrum that is positioned separately from the output center axis on the input member;
plural connection members that have one ends connected to the outer peripheries of the eccentric disks so as to be rotatable around the first fulcrum, and the other ends connected to the second fulcrum provided on the input member of the one-way clutch so as to be rotatable, thereby transmitting the rotational movement, which is given from the input shaft to the eccentric disk, to the input member of the one-way clutch as an oscillation movement of the input member; and
a transmission ratio variable mechanism that changes an oscillation angle of the oscillation movement to be transmitted from the eccentric disk to the input member of the one-way clutch by adjusting the eccentricity of the first fulcrum with respect to the input center axis, thereby changing the transmission ratio when the rotational power to be input into the input shaft is transmitted to the output member of the one-way clutch mechanism via the eccentric disk and the connection member as the rotational power, and
wherein the continuously variable transmission mechanism is configured as a four bar linkage mechanism of continuously variable transmission mechanism that can set the transmission ratio to infinity by setting the eccentricity to be zero, the output shaft of the internal combustion engine section is connected to the input shaft of the continuously variable transmission mechanism, and the one-way clutch which is a component of the continuously variable transmission mechanism also serves as the first one-way clutch and the second one-way clutch provided between the first transmission mechanism, the second transmission mechanism, and the driving target member, respectively.

* * * * *